US009434403B2

(12) United States Patent
Johta et al.

(10) Patent No.: US 9,434,403 B2
(45) Date of Patent: Sep. 6, 2016

(54) STEERING DEVICE
(71) Applicant: NSK LTD., Tokyo (JP)
(72) Inventors: Masaya Johta, Gunma (JP); Hideki Kojima, Gunma (JP); Wataru Hagiwara, Gunma (JP); Daiki Orihara, Gunma (JP); Hiroshi Kakita, Gunma (JP); Osamu Kurihara, Gunma (JP)
(73) Assignee: NSK LTD., Tokyo (JP)
( * ) Notice: Subject to any disclaimer, the term of this patent is extended or adjusted under 35 U.S.C. 154(b) by 0 days.
(21) Appl. No.: 14/649,772
(22) PCT Filed: Oct. 17, 2014
(86) PCT No.: PCT/JP2014/077724
§ 371 (c)(1),
(2) Date: Jun. 4, 2015
(87) PCT Pub. No.: WO2015/064392
PCT Pub. Date: May 7, 2015
(65) Prior Publication Data
US 2016/0016604 A1 Jan. 21, 2016
(30) Foreign Application Priority Data

| Oct. 30, 2013 | (JP) | 2013-225851 |
| Apr. 8, 2014 | (JP) | 2014-079580 |
| Jul. 18, 2014 | (JP) | 2014-147905 |
| Sep. 16, 2014 | (JP) | 2014-188184 |
| Sep. 16, 2014 | (JP) | 2014-188185 |

(51) Int. Cl.
*B62D 1/19* (2006.01)
*B62D 1/184* (2006.01)
*F16B 19/10* (2006.01)
(52) U.S. Cl.
CPC ............... *B62D 1/195* (2013.01); *B62D 1/184* (2013.01); *F16B 19/1081* (2013.01)

(58) Field of Classification Search
CPC .... B62D 1/195; B62D 1/184; F16B 19/1081
See application file for complete search history.

(56) References Cited

U.S. PATENT DOCUMENTS 6,467,807 B2 10/2002 Ikeda et al.
2009/0249916 A1 10/2009 Ridgway et al.
(Continued)

FOREIGN PATENT DOCUMENTS

JP 2002-120731 A 4/2002
JP 2002-160646 A 6/2002
(Continued)

OTHER PUBLICATIONS

International Search Report for PCT/JP2014/077724 dated Jan. 20, 2014.
(Continued)

*Primary Examiner* — Faye M Fleming
(74) *Attorney, Agent, or Firm* — Sughrue Mion, PLLC

(57) ABSTRACT

A steering device which contracts by an impulse load. The steering device includes a cylindrical inner column having a first hole opened therein, an outer column having a cylindrical shape into which at least a part of the inner column is inserted and having a slit at one insertion side end of the inner column, an outer column bracket fixed to a vehicle body side member to support the outer column and to tighten the outer column along with a telescopic friction plate, an inner column bracket having a second hole opened therein and supported by the telescopic friction plate, and a shear pin provided at a position straddling the first hole and the second hole and detachably connecting the inner column and the inner column bracket to each other.

15 Claims, 45 Drawing Sheets

(56) References Cited

U.S. PATENT DOCUMENTS

| | | | | |
|---|---|---|---|---|
| 2012/0080873 A1* | 4/2012 | Narita | B62D 1/184 | 280/777 |
| 2015/0239490 A1* | 8/2015 | Sakata | B62D 1/195 | 74/493 |
| 2015/0266495 A1* | 9/2015 | Yoshihara | B62D 1/195 | 74/493 |
| 2015/0266496 A1* | 9/2015 | Yoshihara | B62D 1/195 | 74/493 |
| 2015/0266497 A1* | 9/2015 | Yoshihara | B62D 1/184 | 74/493 |

FOREIGN PATENT DOCUMENTS

| | | |
|---|---|---|
| JP | 2005-138758 A | 6/2005 |
| JP | 2008-195180 A | 2/2007 |
| JP | 2007-69800 A | 3/2007 |
| JP | 2009-29152 A | 2/2009 |

OTHER PUBLICATIONS

Written Opinion for PCT/JP2014/077724 dated Jan. 20, 2014.

* cited by examiner

FIG.20
(a) 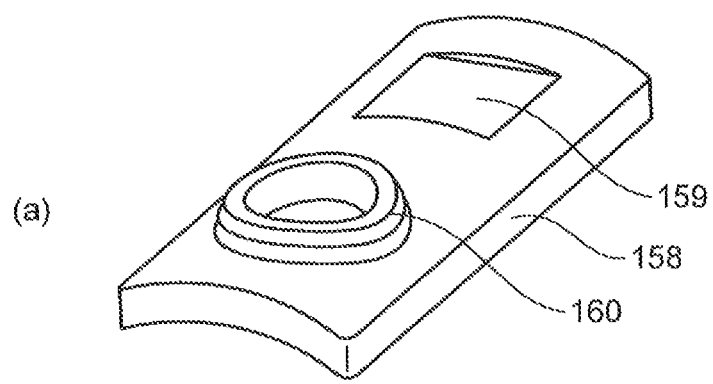
(b) 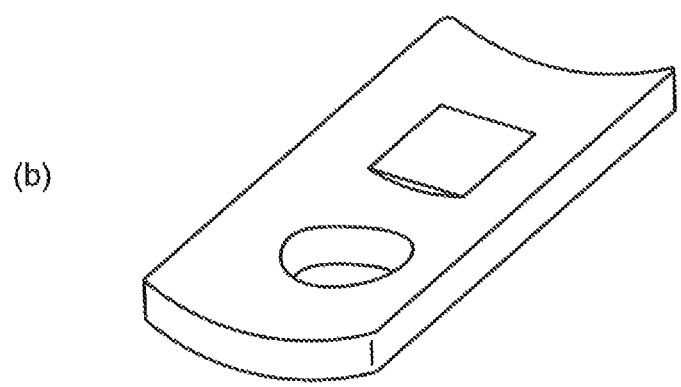

FIG.21
(a) 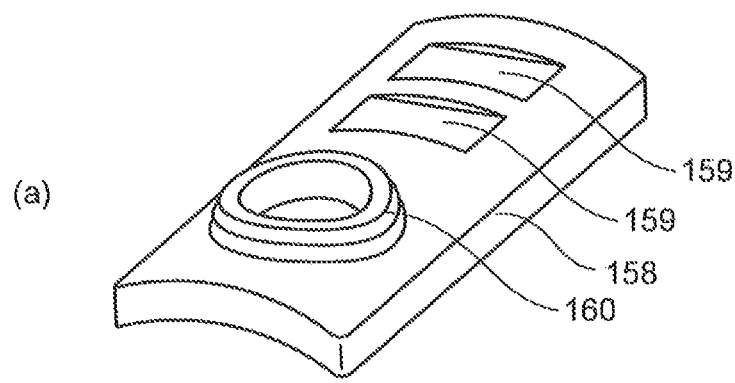
(b) 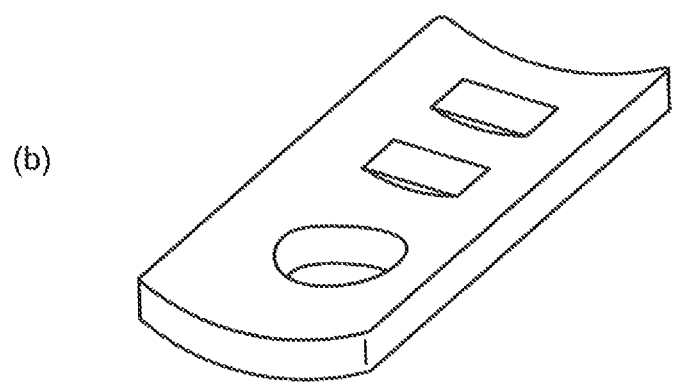

STEERING DEVICE

CROSS REFERENCE TO RELATED APPLICATIONS

This application is a National Stage of International Application No. PCT/JP2014/077724 filed Oct. 17, 2014, claiming priority based on Japanese Patent Application Nos. 2013-225851 filed Oct. 30, 2013, 2014-079580 filed Apr. 8, 2014, 2014-147905 filed Jul. 18, 2014, 2014-188184 filed Sep. 16, 2014 and 2014-188185 filed Sep. 16, 2014, the contents of all of which are incorporated herein by reference in their entirety.

BACKGROUND OF THE INVENTION

1. Field of the Invention

The present invention relates to a steering device.

2. Description of the Related Art

As a structure for supporting a steering device that gives a rudder angle to a vehicle wheel with the rotation of a steering wheel, a technique using a capsule is widely known. For example, in a technique disclosed in Prior Art 1, when an excessive load is applied to a steering column attached to a vehicle body through a capsule so that the steering column is pressed toward the front side of the vehicle body, a part of the capsule is cut so that the steering column moves toward the front side of the vehicle body, and hence a driver (an operator) is protected from the upthrust (secondary collision) of the steering wheel. Meanwhile, Prior Art 2 discloses a structure in which a telescopic fixed member slides due to an impact load. In this structure, since the fixed member is inserted into a groove, there is a need to lengthen the groove in order to take a large stroke amount. As a result, there is a tendency that the column increases in size.

PRIOR ART

Prior Art 1: Japanese Laid-open Patent Publication No. 2007-69800

Prior Art 2: Japanese Laid-open Patent Publication No. 2009-29152

As in the technique disclosed in Prior Art 1 in which the steering column is attached to the vehicle body through the capsule, the steering column is dropped when the capsule is cut. For this reason, when a setting value for a separation load in which the steering column moves toward the front side of the vehicle body is decreased in order to protect an operator having a light weight from the secondary collision, the steering column is easily dropped due to an erroneous operation. When the steering column is dropped due to the erroneous operation, it is difficult to perform the steering operation later. For this reason, it is difficult to decrease the setting value for the separation load.

The invention is made in view of the above-described circumstances, and an object of the invention is to provide a steering device capable of suppressing a problem where a steering column is dropped by an erroneous operation is decreased even when a setting value of a separation load in which the steering column moves toward the front side of a vehicle body.

SUMMARY OF THE INVENTION

It is an object of the present invention to at least partially solve the problems in the conventional technology. According to an aspect of the invention, a steering device comprises, a cylindrical inner column having a first hole opened therein, the cylindrical inner column rotatably supporting an input shaft connected to a steering wheel; an outer column having a cylindrical shape into which at least a part of the inner column is inserted and having a slit at one insertion side end of the inner column; an outer column bracket fixed to a vehicle body side member to support the outer column and to tighten the outer column along with a telescopic friction plate having a plate shape; an inner column bracket having a second hole opened therein, the inner column supported by the telescopic friction plate; and a shear pin provided at a position straddling the first hole and the second hole, and the shear pin detachably connecting the inner column and the inner column bracket to each other.

Accordingly, in the steering device according to the invention, when an excessive load is applied to the steering wheel, the load is transmitted to the inner column through the input shaft so as to move the inner column forward. Meanwhile, the inner column bracket which is supported by the telescopic friction plate does not move. For this reason, since a shear force is applied to the shear pin, the shear pin is cut when the load exceeds the allowable shear force of the shear pin. When the shear pin is cut, the connection between the inner column and the inner column bracket is released. When the connection between the inner column and the inner column bracket is released, the inner column is supported in the axial direction by a friction force generated between the inner column and the outer column. For this reason, the inner column of the steering column may move toward the front side of the vehicle. Further, even when the shear pin is cut, the outer column is supported by the outer column bracket fixed to the vehicle body side member. Further, the inner column is supported by the outer column. For this reason, the steering column is not dropped even when the shear pin is cut. Thus, the steering device according to the invention may suppress a problem in which the steering column is dropped by an erroneous operation even when a setting value for a separation load in which the steering column moves toward the front side of the vehicle is decreased.

As a desirable aspect of the invention, the shear pin includes an outer pin and an inner pin, the outer pin is a cylindrical member having a guide hole penetrating an area from one end to the other end thereof and is inserted through the first hole and the second hole, and the inner pin is inserted through the guide hole and biases an inner wall of the guide hole outward in the radial direction of the guide hole. Accordingly, since the steering device may be assembled by inserting the inner pin after positioning the first hole and the second hole by the outer pin, the steering device may be easily assembled.

As a desirable aspect of the invention, the outer pin includes a cylindrical main body portion that is inserted through the first hole and the second hole, a separation preventing portion that is provided at one end of the main body portion and has an outer periphery larger than an inner periphery of the first hole and an inner periphery of the second hole, and a notch that is formed from the separation preventing portion toward the other end of the main body portion. Accordingly, when the separation preventing portion is inserted into the first hole or the second hole, the width of the notch in the circumferential direction of the outer pin decreases, and hence the outer periphery of the separation preventing portion decreases. Accordingly, the separation preventing portion may be easily inserted through the first hole and the second hole. For this reason, the outer pin may be easily attached to the first hole and the second hole.

As a desirable aspect of the invention, the outer pin includes a flange portion that is provided at the other end of the main body portion and has an outer periphery larger than the inner periphery of the first hole and the inner periphery of the second hole, and a distance from the flange portion to the front end of the notch is larger than a distance from the flange portion to an outer wall of the inner column. Accordingly, the notch is not included in the cut surface used for cutting the shear pin. For this reason, a loss portion corresponding to the notch disappears in the cross-section of the main body portion of the cut surface. Thus, the steering device may easily suppress unevenness in the allowable shear force of the shear pin.

As a desirable aspect of the invention, the outer pin includes an elastically deformable protrusion that is provided in an outer wall of the main body portion so as to be projected outward in the radial direction of the guide hole. Accordingly, the protrusion may fill a gap between the main body portion and the inner wall of the first hole or a gap between the main body portion and the inner wall of the second hole. For this reason, the steering device may suppress the play of the shear pin.

As a desirable aspect of the invention, the inner periphery of the first hole is larger than the inner periphery of the second hole, and the outer pin includes a convex portion that is provided in an inner wall of the separation preventing portion so as to be projected inward in the radial direction of the guide hole. Accordingly, since the inner pin presses the convex portion outward in the radial direction of the guide hole, the width of the notch in the circumferential direction of the outer pin is widened. Accordingly, at least a part of the main body portion of the outer pin contacts the inner wall of the first hole. For this reason, the play of the shear pin in the radial direction of the guide hole is suppressed. Further, since the inner periphery of the first hole is larger than the inner periphery of the second hole, the outer periphery of the main body portion of the outer pin is widened toward the separation preventing portion by using a boundary between the first hole and the second hole as an origin. Accordingly, the main body portion of the outer pin is caught by the edge of the first hole and the edge of the second hole. For this reason, the play of the shear pin in the axial direction of the guide hole is also suppressed. Thus, the steering device may suppress both the play of the shear pin in the radial direction of the guide hole and the play of the shear pin in the axial direction of the guide hole.

As a desirable aspect of the invention, the outer pin includes a flange portion that is provided at the other end of the main body portion and has an outer periphery larger than the inner periphery of the first hole and the inner periphery of the second hole, and a distance from the flange portion to the front end of the notch is smaller than a distance from the flange portion to an inner wall of the inner column. Accordingly, since the width of the notch in the circumferential direction of the outer pin is more easily widened, the outer periphery of the main body portion of the outer pin is easily widened. For this reason, the play of the shear pin in the radial direction of the guide hole and the play of the shear pin in the axial direction of the guide hole are more suppressed.

As a desirable aspect of the invention, the inner pin includes a columnar body portion that biases the inner wall of the guide hole outward in the radial direction of the guide hole and a large diameter portion that is provided at both ends of the body portion and has an outer periphery larger than an inner periphery of the guide hole. Accordingly, since the large diameter portion contacts the edges of both ends of the guide hole, it is possible to suppress the inner pin from coming off from the outer pin.

As a desirable aspect of the invention, the inner column bracket includes a concave portion that is provided in a surface opposite to the surface facing the inner column, the second hole is opened in a part of a bottom surface of the concave portion, and the depth of the concave portion is equal to or larger than the depth of a portion projected from the second hole in the shear pin. Accordingly, the shear pin is not projected from the surface of the inner column bracket. For this reason, the breakage of the shear pin caused by an external force is suppressed.

As a desirable aspect of the invention, the telescopic friction plate is disposed at both sides of the outer column. Accordingly, when an axial load is applied to the inner column bracket, a tightening force is applied from both sides of the outer column to the inner column bracket. Thus, it is possible to stabilize the posture of the inner column bracket when the shear pin is cut. Therefore, the posture in which the inner column starts to move is easily maintained so as to be straight in the axial direction. Thus, since the inner column moves easily straightly in the axial direction, it is possible to prevent a problem in which the movement of the inner column is disturbed or a problem in which a friction force generated between the inner column and the outer column becomes larger than a predetermined value.

As a desirable aspect of the invention, the telescopic friction plates disposed at both sides of the outer column face each other with the inner column bracket interposed therebetween, and the first hole and the second hole are disposed at a position where the distance values from the telescopic friction plates facing each other with the inner column bracket interposed therebetween are equal to each other. Accordingly, when an axial load is applied to the inner column bracket, a more stable tightening force is applied from both sides of the outer column to the inner column bracket. Therefore, it is possible to stabilize the posture of the inner column bracket when the shear pin is cut. Thus, it is possible to easily maintain the posture in which the inner column starts to move so as to be straighter in the axial direction. Thus, since the inner column moves easily straightly in the axial direction, it is possible to suppress a problem in which the movement of the inner column is disturbed or a problem in which a friction force generated between the inner column and the outer column becomes larger than a predetermined value.

As a desirable aspect of the invention, the outer column is located at the front side of a vehicle body, includes a pivot bracket, and is formed so that the separated inner column is inserted thereinto. Accordingly, the axial direction of the outer column may be aligned to the axial direction of the inner column. For this reason, the outer column may easily guide the inner column when the inner column moves in the axial direction. Thus, since the inner column moves easily straightly in the axial direction, it is possible to suppress a problem in which the movement of the inner column is disturbed or a problem in which a friction force generated between the inner column and the outer column becomes larger than a predetermined value.

As a desirable aspect of the invention, the shear pin includes an outer pin that is a cylindrical member having a guide hole penetrating an area from one end to the other end thereof and is inserted through the first hole and the second hole and an inner pin that is inserted into the guide hole, the inner pin includes a body portion that is inserted through the guide hole, and the body portion includes a first large diameter portion that presses an inner wall of the guide hole outward in the radial direction of the guide hole and a first small diameter portion that is disposed at a position straddling the first hole and the second hole and has an outer periphery smaller than an outer periphery of the first large diameter portion. The allowable shear force of the shear pin depends on the cross-sectional area of the cut surface. Since the outer periphery of the first small diameter portion is smaller than the outer periphery of the first large diameter portion, a crack easily occurs in the first small diameter portion when a shear force is applied to the inner pin. Accordingly, the inner pin is easily cut at the first small diameter portion. That is, since stress concentration occurs when the first small diameter portion is sheared, the cut surface of the inner pin is easily included in the first small diameter portion. For this reason, since unevenness in the position and the area of the cut surface in the inner pin hardly occurs, the allowable shear force of the shear pin is stabilized. Thus, the steering device according to the invention may improve the precision of the setting value (the allowable shear force of the shear pin) of the separation load.

As a desirable aspect of the invention, the inner pin may be formed so that a protrusion portion having an outer periphery larger than the inner periphery of the guide hole is provided at both ends of the body portion. Accordingly, since the inner pin is positioned, the first small diameter portion is not easily deviated from the first hole and the second hole. For this reason, the allowable shear force of the shear pin is more stabilized compared to the case where the inner pin does not include the protrusion portion.

As a desirable aspect of the invention, the inner pin may be formed so that a protrusion portion having an outer periphery larger than the inner periphery of the guide hole is provided at one end of the body portion and an inner flange portion having an outer periphery larger than the outer periphery of the protrusion portion is provided at the other end of the body portion. Accordingly, the inner pin may be inserted into the guide hole from the protrusion portion which is easily press-inserted. In a direction in which the inner pin is press-inserted into the guide hole, an area in which the inner flange portion overlaps the outer pin is larger than an area in which the protrusion portion overlaps the outer pin. Accordingly, even when a force for press-inserting the protrusion portion into the guide hole is applied to the inner pin, the entrance of the inner pin into the guide hole is suppressed when the inner flange portion and the outer pin contact each other. That is, it is possible to easily suppress the inner pin from being excessively press-inserted into the guide hole compared to the case where the protrusion portion is provided at both ends of the body portion in the inner pin. Accordingly, the first small diameter portion is not easily deviated from a position straddling the first hole and the second hole. For this reason, the allowable shear force of the shear pin is easily stabilized.

As a desirable aspect of the invention, the outer pin includes a main body portion that is inserted through the first hole and the second hole, and the main body portion includes a second large diameter portion that presses inner walls of the first hole and the second hole and a second small diameter portion that is disposed at a position straddling the first hole and the second hole and has an outer periphery smaller than an outer periphery of the second large diameter portion. Since the outer periphery of the second small diameter portion is smaller than the outer periphery of the second large diameter portion, a crack easily occurs in the second small diameter portion when a shear force is applied to the outer pin. Accordingly, the outer pin is easily cut at the second small diameter portion. That is, since stress concentration occurs in a sheared state due to the second small diameter portion, the cut surface of the outer pin is easily included in the second small diameter portion. For this reason, since unevenness in the position and the area of the cut surface in the outer pin hardly occurs, the allowable shear force of the shear pin is stabilized. Thus, the steering device may improve the precision of the setting value (the allowable shear force of the shear pin) of the separation load.

As a desirable aspect of the invention, the outer pin may include a separation preventing portion that is provided at one end of the main body portion and has an outer periphery larger than the inner periphery of the first hole and the inner periphery of the second hole, an outer flange portion that is provided at the other end of the main body portion and has an outer periphery larger than the outer periphery of the separation preventing portion, and a notch that is formed from the separation preventing portion toward the outer flange portion. Accordingly, when the separation preventing portion is inserted into the first hole or the second hole, the width of the notch in the circumferential direction of the outer pin decreases, and hence the outer periphery of the separation preventing portion decreases. Accordingly, the separation preventing portion is easily inserted through the first hole and the second hole. For this reason, the outer pin may be easily attached to the first hole and the second hole. Further, since the outer pin is positioned by the separation preventing portion and the outer flange portion, the second small diameter portion is not easily deviated from a position straddling the first hole and the second hole. For this reason, the allowable shear force of the shear pin is more stabilized.

As a desirable aspect of the invention, the front end of the notch may be located near the separation preventing portion in relation to the second small diameter portion. Accordingly, since the notch and the second small diameter portion do not overlap each other, the notch is not included in the cut surface used for cutting the outer pin. For this reason, since a loss portion corresponding to the notch in the cut surface of the outer pin disappears, unevenness in the allowable shear force of the shear pin is suppressed.

As a desirable aspect of the invention, the shear pin includes an outer pin that is a cylindrical member having a guide hole penetrating an area from one end to the other end thereof and is inserted through the first hole and the second hole and an inner pin that is inserted into the guide hole, and the inner pin includes a body portion that is inserted through the guide hole and presses an inner wall of the guide hole outward in the radial direction of the guide hole and a guide portion that is provided at one end of the body portion and has an outer periphery smaller than an outer periphery of the body portion. When the inner column and the inner column bracket are connected to each other by the shear pin, the inner pin is inserted into the guide hole while the first hole and the second hole are positioned by the outer pin. Since the outer periphery of the guide portion is smaller than the outer periphery of the body portion, a gap is formed between the guide portion and the inner wall of the guide hole. Accordingly, the guide portion may easily enter the guide hole. For this reason, the inner pin is press-inserted into the guide hole while the guide portion is inserted into the guide hole in advance. Even when the inner pin falls when the inner pin is press-inserted into the guide hole, the edge of the guide portion contacts the inner wall of the guide hole. Accordingly, an angle in which the inner pin falls is regulated at a predetermined angle or less. Accordingly, it is possible to easily stabilize the posture of the inner pin when the inner pin is press-inserted into the guide hole. Thus, the steering device according to the invention may easily assemble a connection portion between the inner column and the inner column bracket which are detachably connected to each other.

As a desirable aspect of the invention, the inner pin may be formed so that an inner flange portion having an outer periphery larger than the inner periphery of the guide hole is provided at the other end of the body portion. Accordingly, since the inner flange portion contacts the edge of the guide hole, the inner pin does not easily come off from the outer pin. Further, since the inner pin includes the inner flange portion, an area in which a pressing force is applied to the inner pin increases. For this reason, the inner pin may be more easily press-inserted into the guide hole.

As a desirable aspect of the invention, the inner pin may be formed so that a large diameter portion having an outer periphery larger than the inner periphery of the guide hole is provided between the body portion and the guide portion. Accordingly, since the large diameter portion contacts the edge of the guide hole, the inner pin does not easily come off from the outer pin.

According to the invention, even when a setting value of a separation load, in which the steering column moves toward the front side of a vehicle body, is decreased, it is possible to provide a steering device capable of suppressing a problem where a steering column is dropped by an erroneous operation.

BRIEF DESCRIPTION OF THE DRAWINGS

FIG. 20 is a diagram illustrating an inner plate according to the third embodiment.

FIG. 21 is a diagram illustrating an inner plate according to a modified example of the third embodiment.

DETAILED DESCRIPTION OF THE PREFERRED EMBODIMENT

Figure 1:
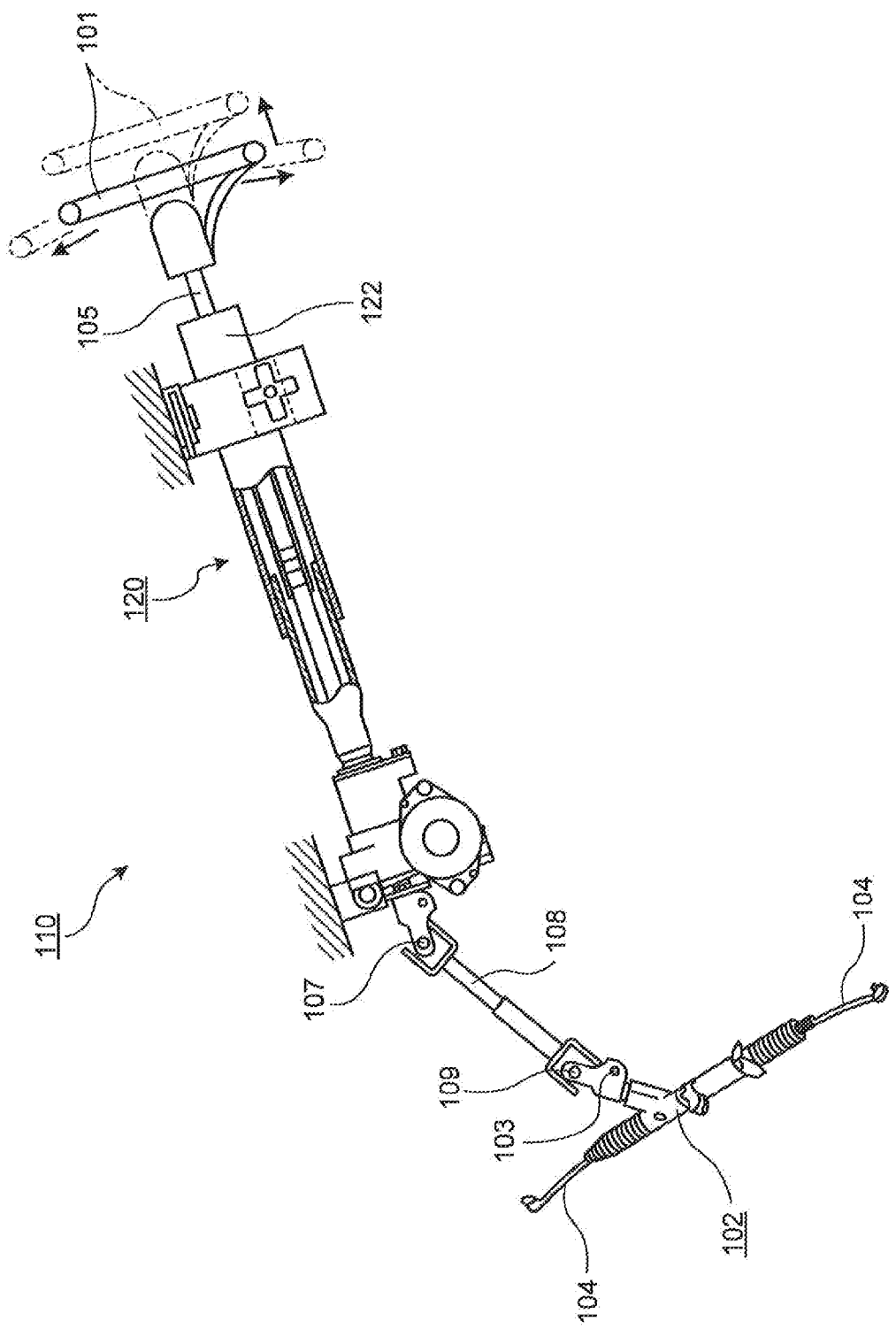
FIG. 1 is a schematic diagram of an entire steering device of first to fourth embodiments.

A mode (an embodiment) for carrying out the invention will be described in detail with reference to the drawings. The invention is not limited to the content described in the embodiments below. Further, components described below include a component which is easily supposed by the person skilled in the art and a component which has substantially the same configuration. Further, the components described below may be appropriately combined with one another.

First to Fourth Embodiments

First to fourth embodiments relate to a steering device, and specifically, to a steering column apparatus. Particularly, the embodiments relate to a steering column for a steering device capable of absorbing impact energy while being tilted and moved in a telescopic manner.

Hitherto, a steering device has been used which is able to adjust a steering position by a tilting operation and a telescopic operation and has a function of absorbing impact energy generated in the event of a collision. However, there has been a demand for a steering device capable of more stably absorbing impact without degrading the attachment strength or the stability of the steering device in a vehicle.

As the related art, in a structure disclosed in Patent Literature 1 (Japanese Laid-open Patent Publication No. 2007-69800), a stroke mechanism includes an outer column and an inner column, and a hook portion of a front end of a telescopic multiplate is provided so as to be separable from the outer column while coming off from a fixed portion of the outer column. In this case, since the left and right telescopic multiplates are individually fixed, there is a possibility that the column may be twisted due to an uneven separation load in the left and right direction.

Meanwhile, in a structure disclosed in Patent Literature 2 (Japanese Laid-open Patent Publication No. 2009-29152), a fixed portion of a telescopic fixed member slides due to an impact load. In this structure, since the fixed member is inserted into a groove, there is a need to lengthen the groove in order to take a large stroke amount. Thus, there is a tendency that the column increases in size.

As described above, there has been a demand for a steering device capable of absorbing more impact energy and having attachment stability thereof while not causing an increase in size.

A first structure for solving the above-described problem is as below.

That is, in a telescopic fitting structure including an inner column and an outer column, a T-shaped fixed bracket fixing a friction plate (a so-called telescopic multiplate) of a fastener portion is detachably fixed to an inner column in a slit of the outer structure. Since the fixed portion is separated from the inner column, it is possible to absorb impact and separate the inner column at a low load while preventing the separation of the column. The fixed bracket and the inner column are provided with a hole, and a pin is inserted and fixed thereinto. When a secondary collision load is input to a steering shaft, the secondary collision load is transmitted to the inner column, and the pin fixing the fixed bracket is sheared, and then a stroke equal to or larger than a telescopic stroke is allowed while the fixed surface of the fixed bracket relatively displaces with respect to the inner column.

Desirably, a configuration is desirable in which a multiplate for stabilizing a separation load is disposed at the left and right sides and a fixed surface at the center thereof is separated (in a so-called T-shape). When the impact load is received while the same fixing force is generated at the left and right fixed portions, the impact load is held. Thus, the fixed surface at the center thereof is straightly separated. Further, even when a load balance between the left and right fixed portions is broken, the fixed surface is relatively straightly separated due to the guide in the slit of the outer column, and hence a stroke movement is allowed. Further, the column fixing strength is also improved.

Desirably, when a shear pin is formed by an injection method, where a resin is flown into a space at which it is solidified, the play of the fixed portion may be suppressed by overflowing the resin into the space. A resinous pin, a rivet, a bolt, or the like may be used in that the separation load is calculated from the material strength and the area of the shear portion.

A second structure for solving the above-described problem is as below. That is, in a telescopic fitting structure including an inner column and an outer column, a fixed gear lock of the fastener portion is detachably fixed to the inner column in a slot of the outer column. Since the fixed gear lock is separated from the inner column, it is possible to absorb impact and separate the inner column at a low load while preventing the separation of the column. The fixed bracket and the inner column are provided with a hole, and a pin is inserted and fixed thereinto. When a secondary collision load is input to a steering shaft, the secondary collision load is transmitted to the inner column, and the pin fixing the fixed bracket is sheared. Then the fixed surface of the fixed bracket and the inner column relatively displaces and allows a stroke equal to or larger than a telescopic stroke.

This fixed structure has the following characteristics. (1) Since a gear is pressed in a direction from the downside toward the upside, the inner column is pressed against the upper inner surface of the outer column. (2) A distance bracket extends toward the side surface of the outer column. (3) The inner column is pressed in the lateral direction by the distance bracket with the slit of the outer column interposed therebetween. By these characteristics, the column fixing strength is improved.

Desirably, when the shear pin is formed by the injection method, where the resin is flown into the space at which it is solidified, the play of the fixed portion may be suppressed by overflowing the resin into the space. A resinous pin, a rivet, a bolt, or the like may be used in that the separation load is calculated from the material strength and the area of the shear portion.

Further, the lock mechanism such as the cam attachment tilt bolt, the gear lock, and the fixed gear lock of the present application may be replaced with a known cam (for example, see JP 2001-322552 A) and a flat plate which is not included in a gear of a fixed gear lock to separate the flat plate.

A third structure for solving the above-described problem is as below. That is, in a telescopic fitting structure including the inner column and the outer column, a T-shaped fixed bracket fixing a friction plate (a telescopic multiplate) of a fastener portion is detachably fixed to the inner column in the slit of the outer column. Since a fixed portion is separated from the inner column, it is possible to absorb impact and separate the inner column at a low load while preventing the separation of the column. The fixed bracket and the inner column are provided with a hole, and a pin is inserted and fixed thereinto. When a secondary collision load is input to a steering shaft, the secondary collision load is transmitted to the inner column, and the pin fixing the fixed bracket is sheared. Then, the fixed surface of the fixed bracket and the inner column relatively displaces and allows a stroke equal to or larger than a telescopic stroke.

Desirably, it is desirable to configure such that multiplates for stabilizing a separation load are disposed at the left and right sides, and a fixed surface at the center thereof is separated from the inner column (in a so-called T-shape). When the impact load is received while the same fixing force is generated at the left and right fixed portions, the impact load is held. Thus, the fixed surface at the center thereof is straightly separated. Further, even when a load balance between the left and right fixed portions is broken, the fixed surface is relatively straightly separated due to the guide in the slit of the outer column, and hence a stroke movement is allowed. Further, the column fixing strength is also improved.

Desirably, the shear pin is formed by the injection method, where the resin is flown into the space at which it is solidified. At that time, the fixed bracket temporarily closes a hole formed in the inner column so that the shear pin is inserted therethrough by swaging the inner plate to the inner column from the inside thereof. Then, a hole, where the shear pin is inserted therethrough, formed in the fixed bracket is aligned thereto in an overlapping state, and a resin is injected from the hole in the fixed bracket side and is solidified to integrally fix the components. Since the separation load may be calculated from the area of the sheared portion, this method may be used for the stable separation.

Desirably, a resin is provided in the inner plate, and hence the separation of a resin from a resin charging hole may be prevented. When the resin is excessively charged, the play of the fixed portion may be suppressed. The charge amount may be visually checked.

According to the structure, it is possible to absorb energy stably even in the impact caused by a comparatively low load, and to prevent degradation in the stability of attaching the steering device in the vehicle.

Figure 2:
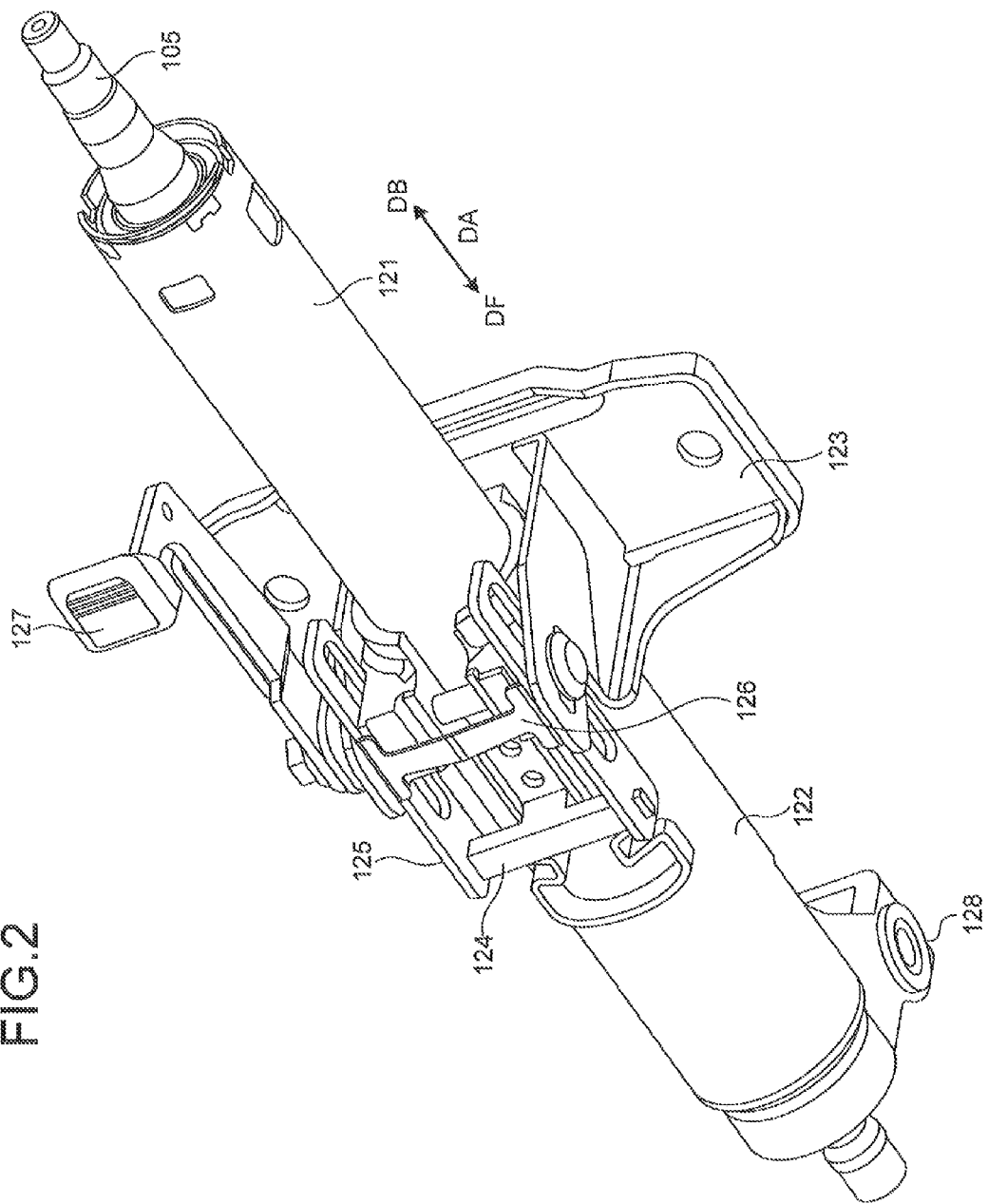
FIG. 2 is a perspective view illustrating a steering column apparatus of the steering device of the first to fourth embodiments.
Figure 3:
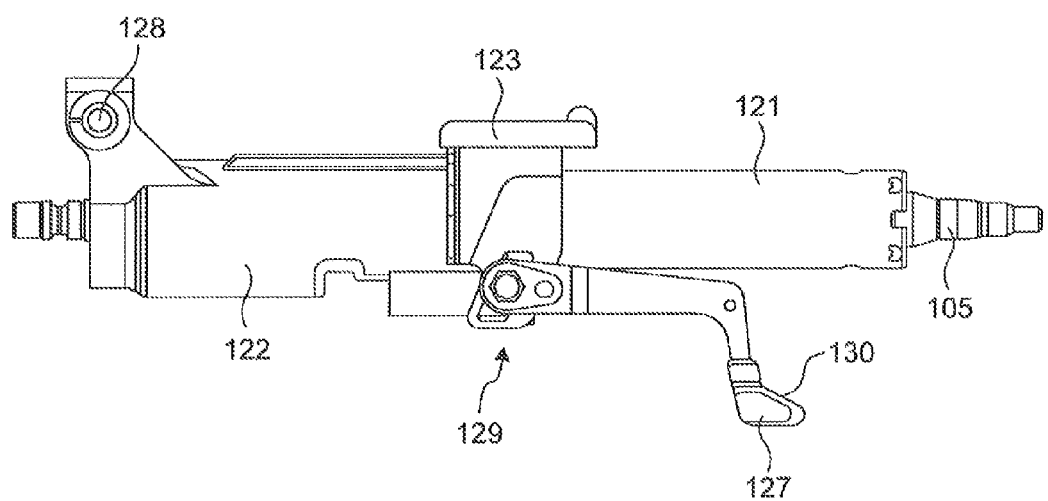
FIG. 3 is a diagram illustrating a side surface of the steering column apparatus according to the first to fourth embodiments.
Figure 4:
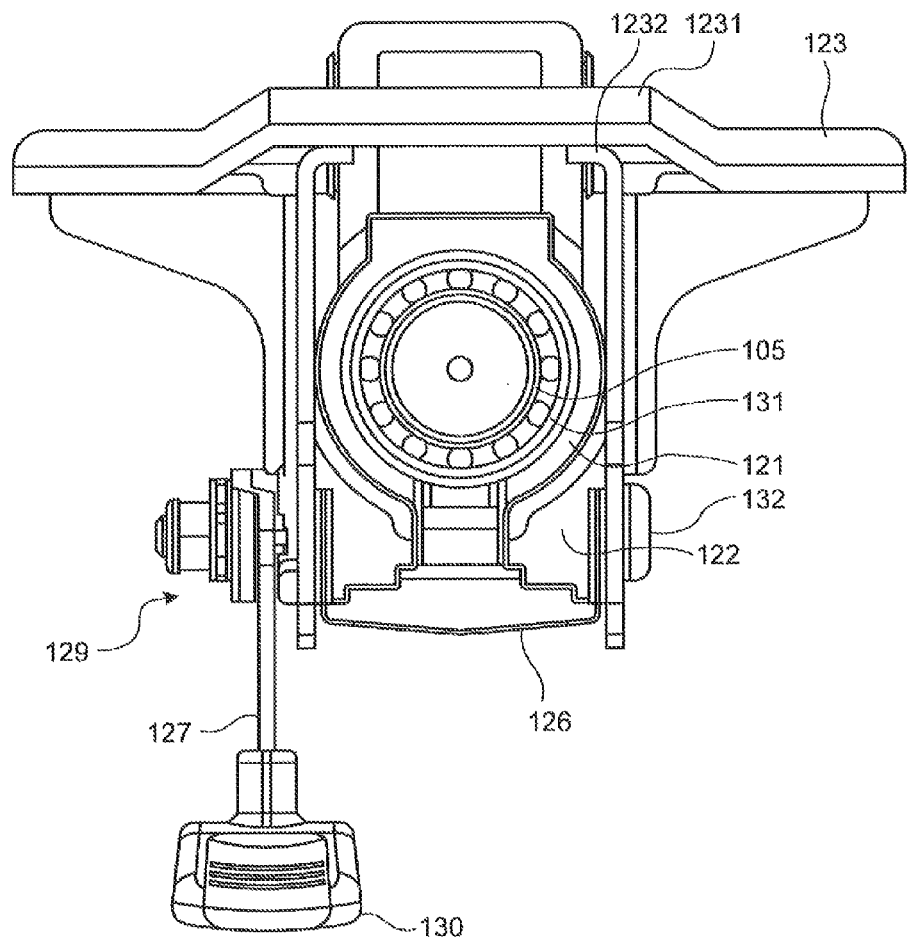
FIG. 4 is a diagram illustrating a front surface (at the rear side) of the steering column apparatus according to the first to fourth embodiments.
Figure 5:
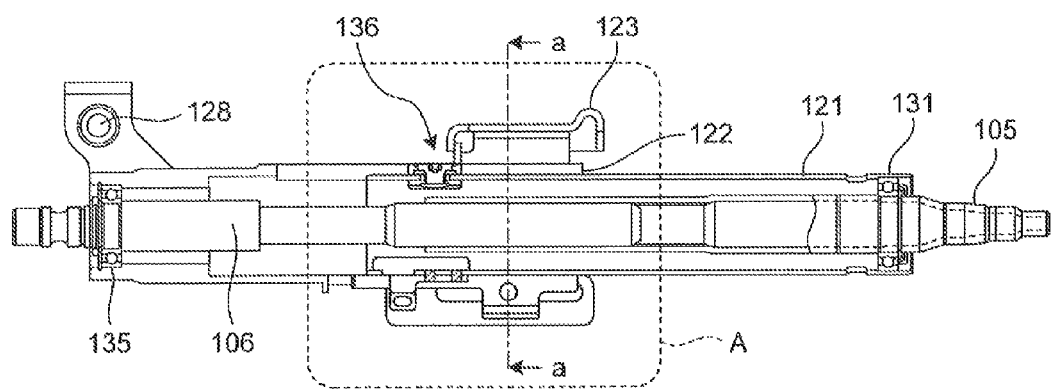
FIG. 5 is a diagram illustrating a side surface (a part of a cross-section) of the steering column apparatus according to the first embodiment.
Figure 6:
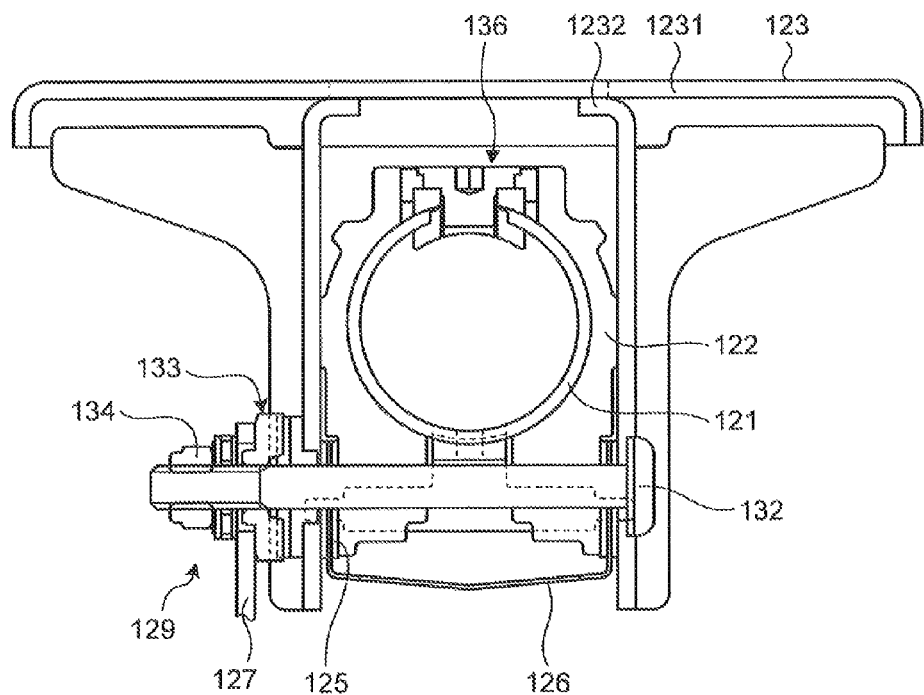
FIG. 6 is a cross-sectional view taken along the line a-a of FIG. 5.
Figure 7:
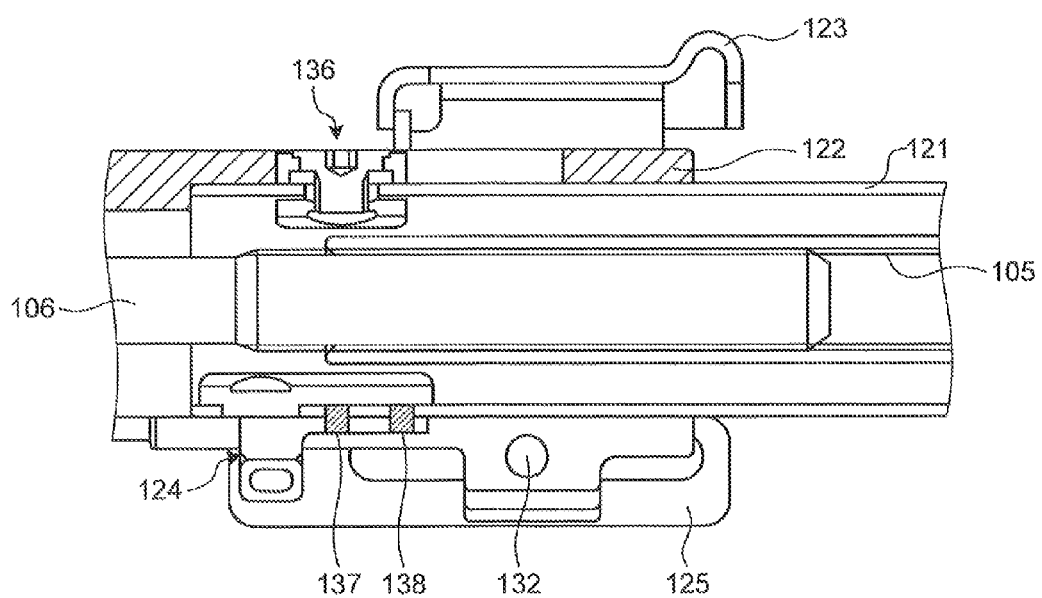
FIG. 7 is an enlarged diagram illustrating a part A of FIG. 5.
Figure 8:
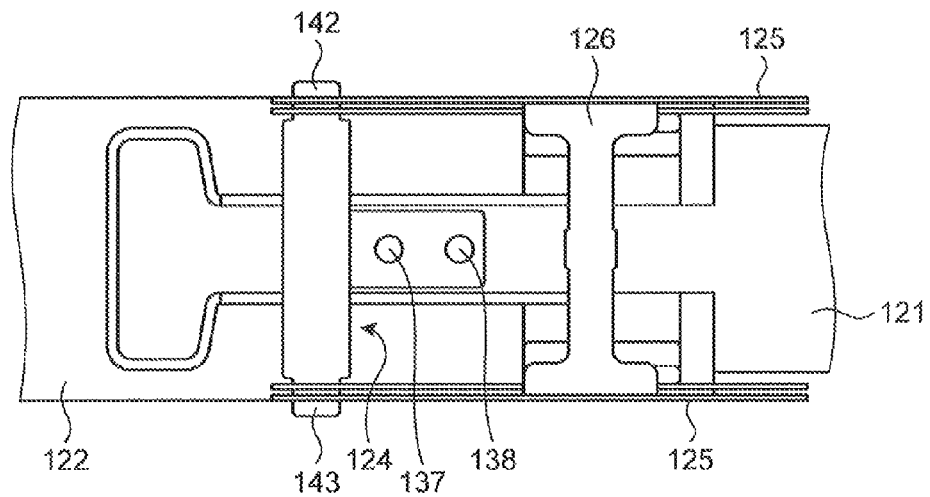
FIG. 8 is a diagram (a bottom view of the steering column apparatus) illustrating a bottom surface of FIG. 7.
Figure 9:
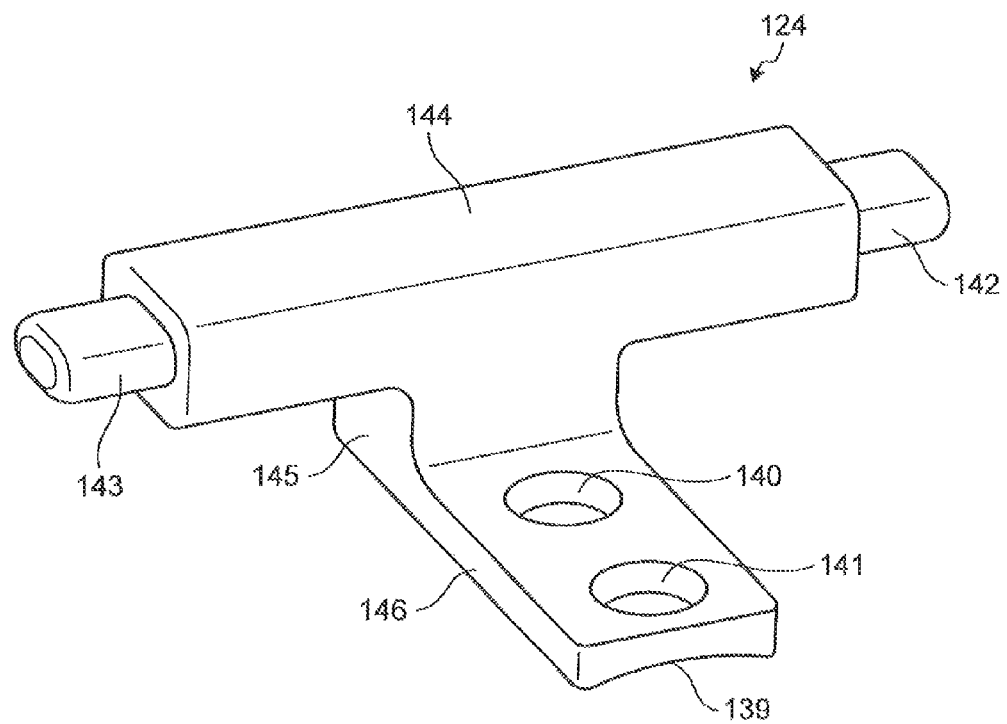
FIG. 9 is a perspective view illustrating a fixed bracket according to the first embodiment.
Figure 10:
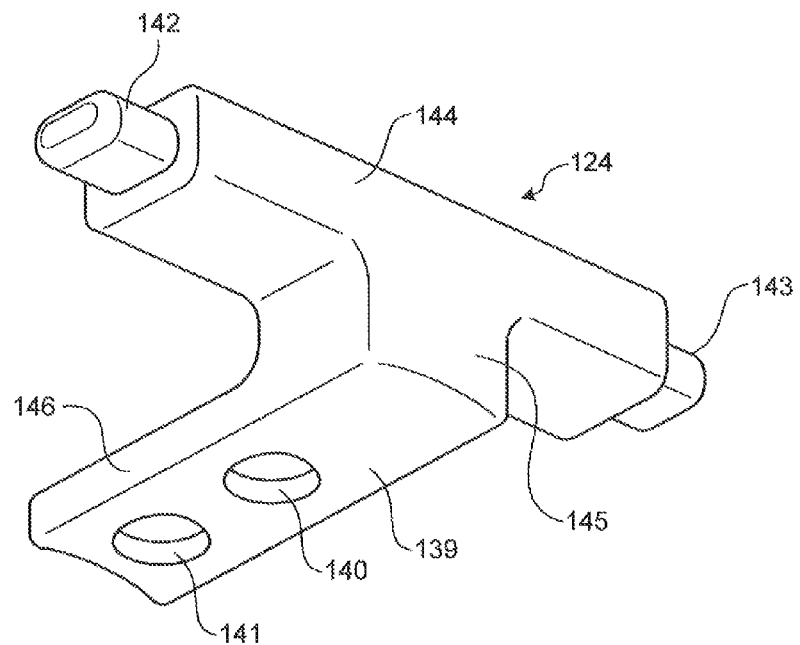
FIG. 10 is a perspective view illustrating the fixed bracket according to the first embodiment.
Figure 11:
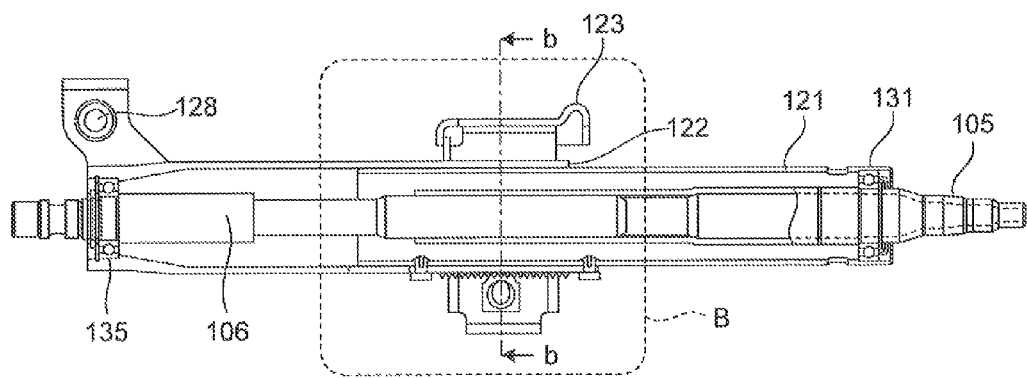
FIG. 11 is a diagram illustrating a side surface (a part of a cross-section) of the steering column apparatus of the second embodiment.
Figure 12:
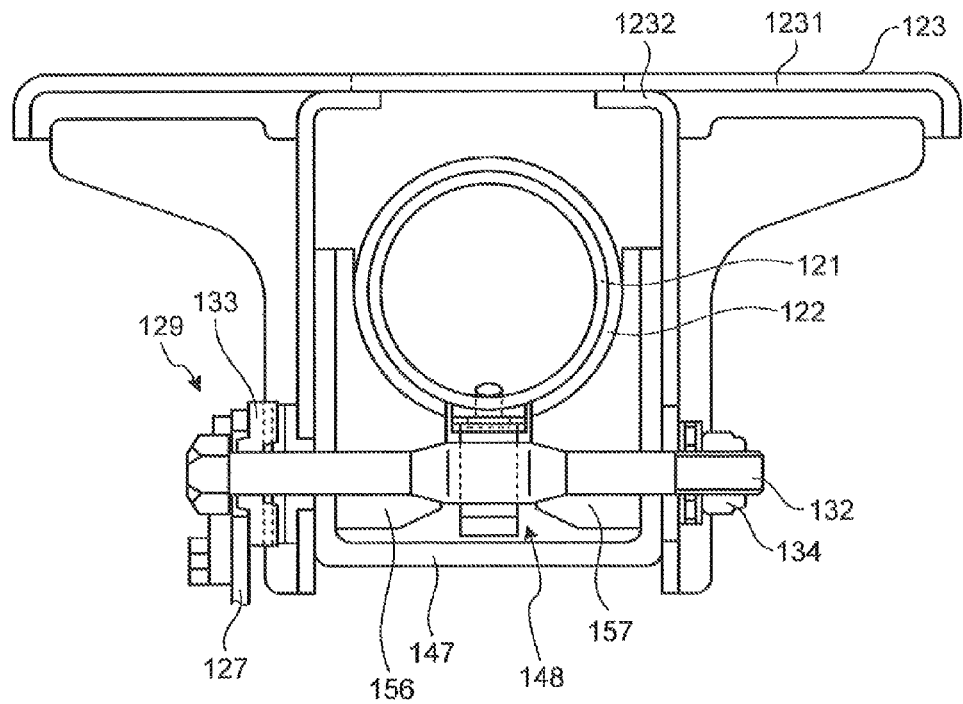
FIG. 12 is a cross-sectional view taken along the line b-b of FIG. 11.
Figure 13:
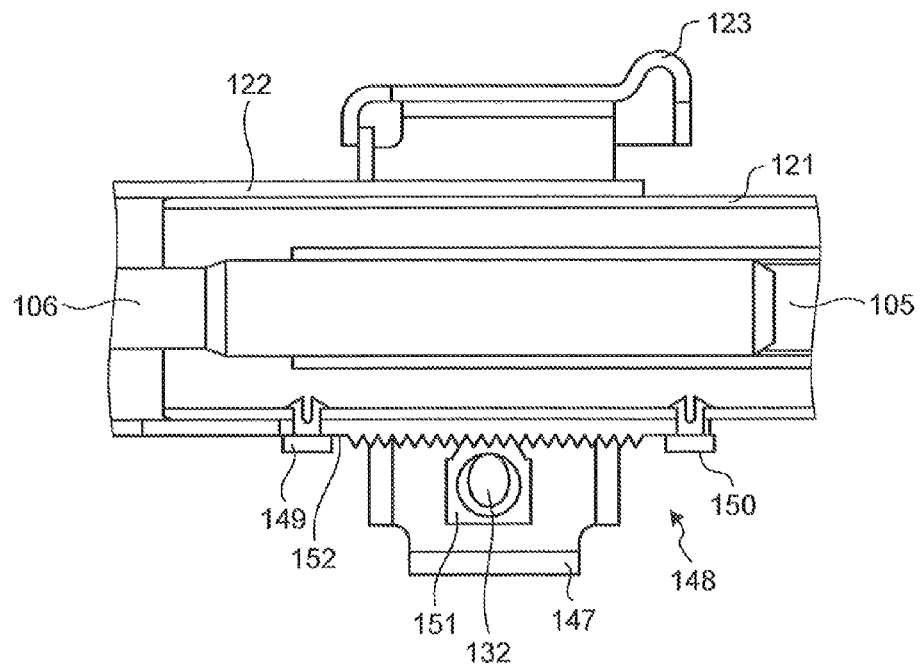
FIG. 13 is an enlarged diagram illustrating a part B of FIG. 11.
Figure 14:
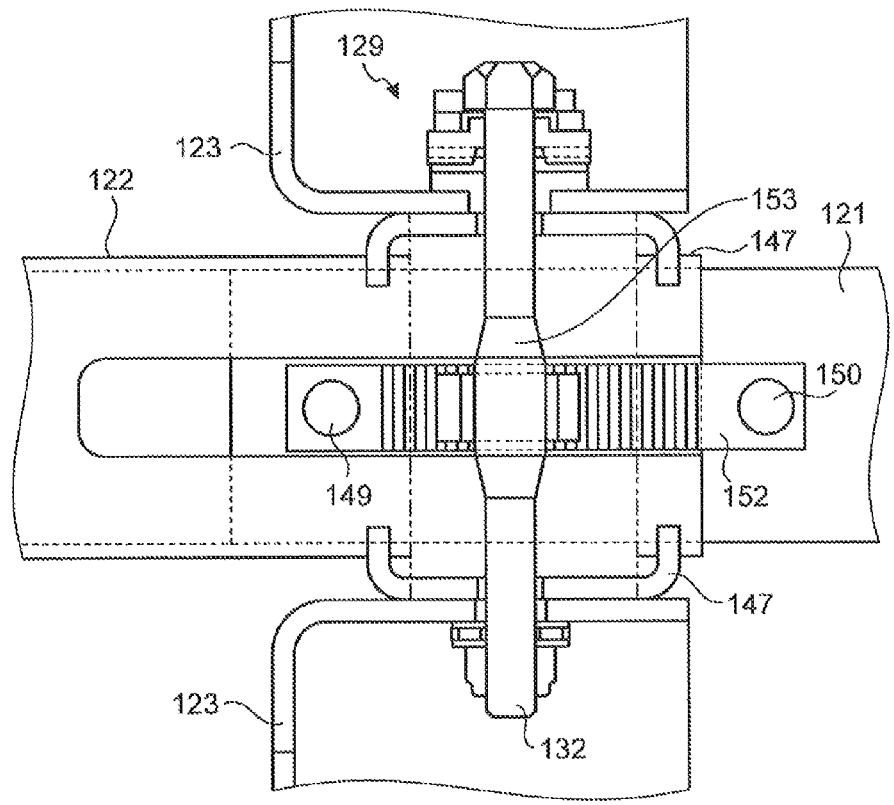
FIG. 14 is a diagram (a bottom view of the steering column apparatus) illustrating a bottom surface of FIG. 11.
Figure 15:
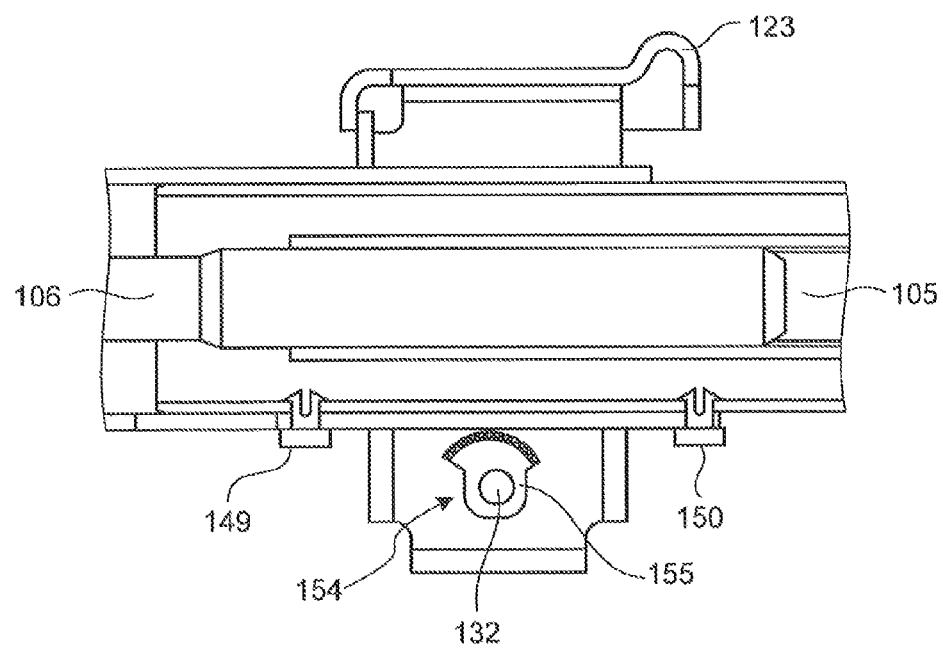
FIG. 15 is a diagram similar to FIG. 13 illustrating a modified example of the second embodiment.
Figure 16:
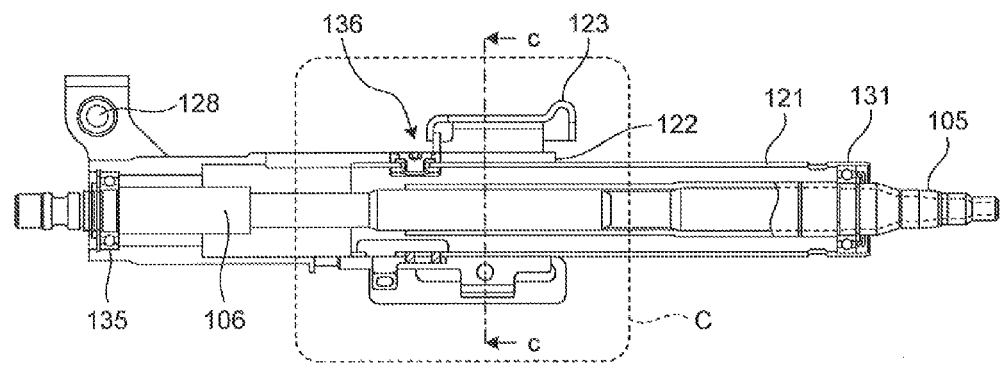
FIG. 16 is a diagram illustrating a side surface (a part of a cross-section) of the steering column apparatus of the third embodiment.
Figure 17:
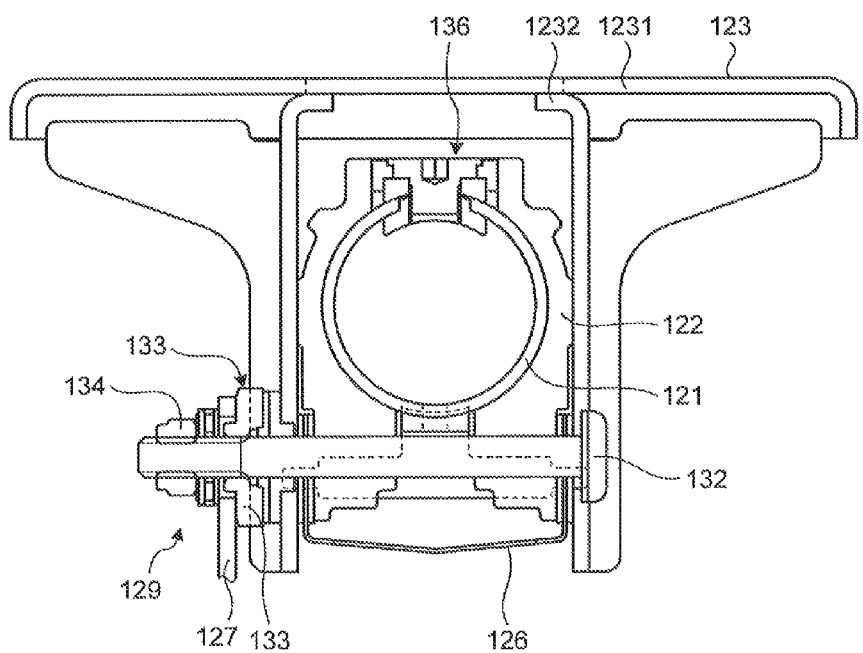
FIG. 17 is a cross-sectional view taken along the line c-c of FIG. 16.
Figure 18:
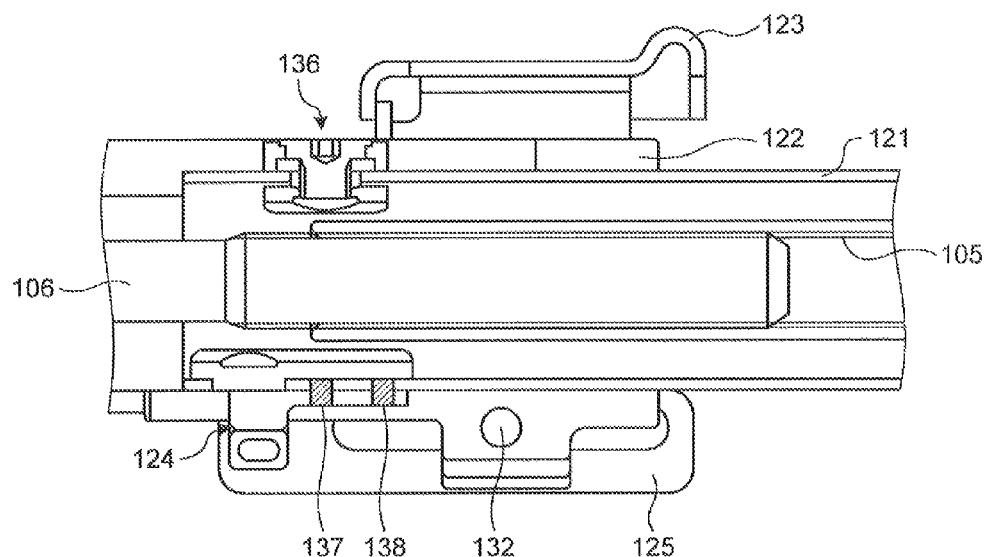
FIG. 18 is an enlarged diagram illustrating a part C of FIG. 16.
Figure 19:
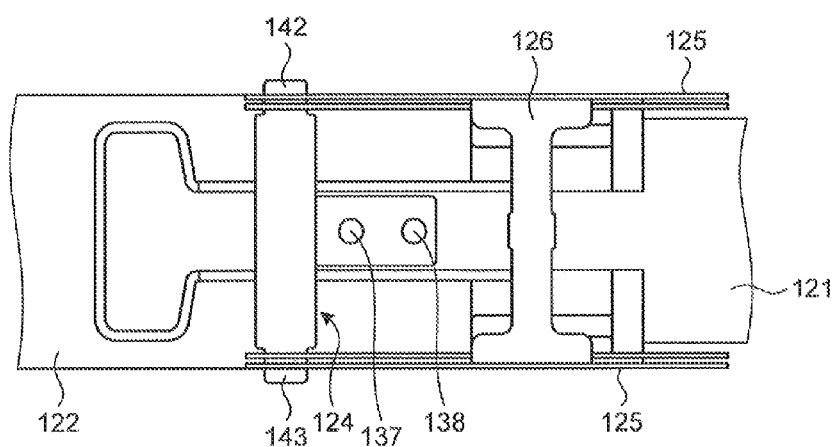
FIG. 19 is a diagram (a bottom view of the steering column apparatus) illustrating a bottom surface of FIG. 16.
Figure 22:
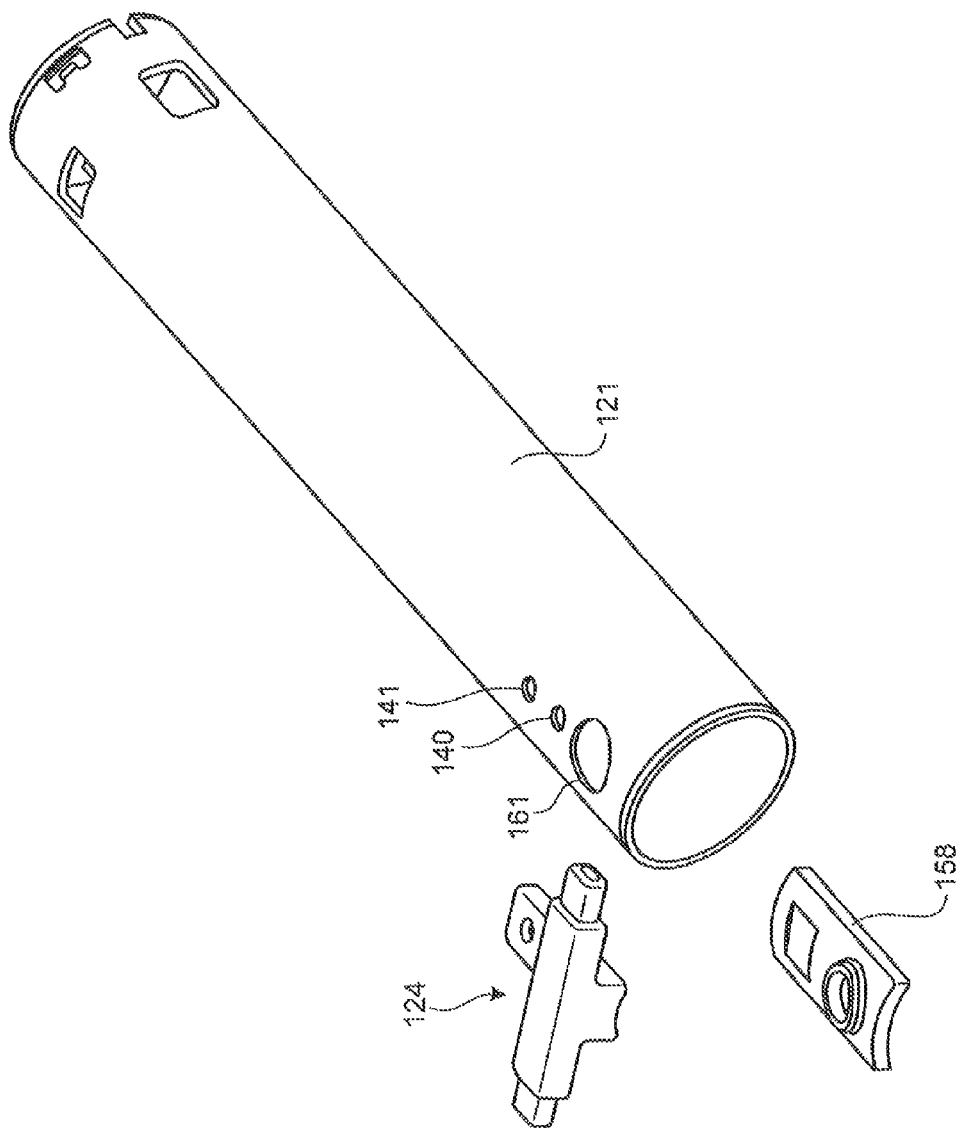
FIG. 22 is a diagram illustrating an inner plate attachment method according to the third embodiment.
Figure 23:
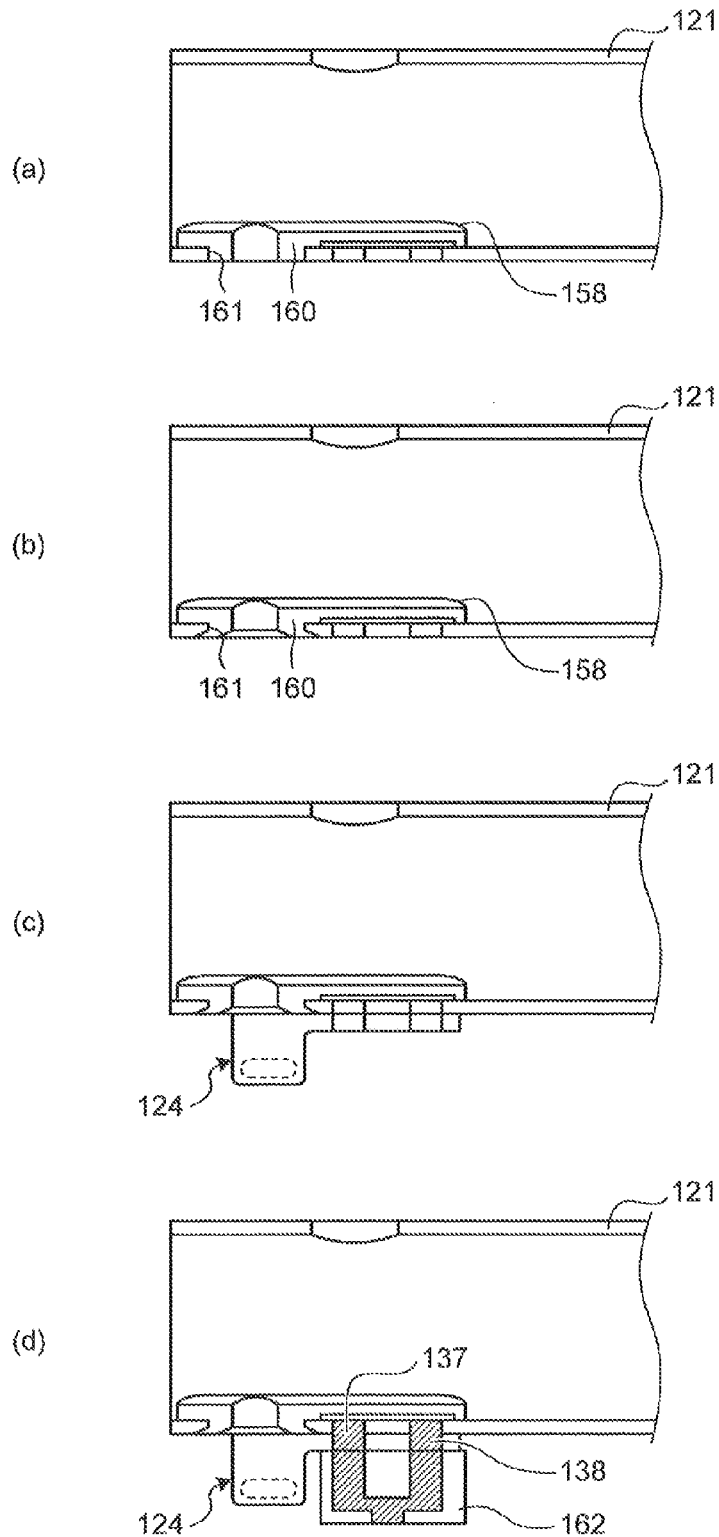
FIG. 23 is a diagram illustrating an inner plate attachment method according to the third embodiment.

Hereinafter, this structure will be described in detail with reference to FIGS. 1 to 23. FIGS. 1 to 4 schematically illustrate the first to fourth embodiments. FIGS. 5 to 10 specifically illustrate the structure of the first embodiment. Similarly, FIGS. 11 to 15 specifically illustrate the structure of the second embodiment, and FIGS. 16 to 23 specifically illustrate the structure of the third embodiment. In FIG. 2, the axial direction DA indicates the axial direction of the steering shaft, and the front side DF and the rear side DB indicate the front side and the rear side of the vehicle body when the steering device is attached to the vehicle body.

A steering column apparatus according to the first embodiment is a steering column apparatus that supports a steering shaft. Here, the steering column apparatus includes an inner column and an outer column and contracts in the axial direction so as to be adjusted in a telescopic manner and to absorb impact. The steering column apparatus may be tilted through a tilt bracket attached to a vehicle body. Then, the outer column is tightened by a tightening mechanism provided in the tilt bracket so as to hold the inner column. Here, a telescopic multiplate is provided so as to increase the friction surface of the tightening mechanism. Further, the telescopic multiplate is fixed to a fixed bracket provided in a slit of the outer column at the bottom surface side of the column, and a shear pin is inserted through a hole in a side surface of the inner column and a hole in a side surface of the fixed bracket, thereby detachably supporting the inner column from the fixed bracket.

That is, the first embodiment relates to a steering column apparatus 120 that supports a steering shaft including a male steering shaft 106 and a female steering shaft 105. Here, a steering column apparatus 120 includes an inner column 121 and an outer column 122 and contracts in the axial direction so as to be adjusted in a telescopic manner and to absorb impact, and may be tilted through a tilt bracket 123 attached to a vehicle body. Then, a tightening mechanism 129, provided in the tilt bracket 123, tightens the outer column 122 so as to hold the inner column 121. Here, a telescopic multiplate 125 is provided so as to increase the friction surface of the tightening mechanism 129. The telescopic multiplate 125 is fixed to a fixed bracket 124 provided in a slit of the outer column 122 at the bottom surface side of the columns (121, 122), and a hole of the inner column 121 and a hole of the fixed bracket 124 match each other so as to insert the shear pin through the holes of the inner column 121 and the fixed bracket 124, thereby the inner column 121 is detachably supported from the fixed bracket 124.

A steering column apparatus according to the second embodiment is a steering column apparatus that supports a steering shaft. Here, the steering column apparatus includes an inner column and an outer column and contracts in the axial direction relatively so as to be operated in a telescopic manner and to absorb impact, and the steering column apparatus is attached to a vehicle body so as to be tilted through a tilt bracket attached to the vehicle body. The tilt bracket includes a tightening mechanism which holds the inner column by tightening the outer column. The outer column includes a slit, and the inner column is gripped by a pressing bracket which presses the inner column by the action of the tightening mechanism in the left and right direction of the slit. Furthermore, a fixed plate detachably attached to the inner column is disposed in the slit, and the tightening mechanism is provided with a tilt lever which presses a cam in a direction from the downside of the fixed plate toward the upside thereof, by rotating the cam at the center of a tilt lever with the rotation of the tilt lever and holding the cam thereat.

That is, the second embodiment relates to the steering column apparatus 120 that supports the steering shaft including the male steering shaft 106 and the female steering shaft 105. Here, the steering column apparatus 120 includes the inner column 121 and the outer column 122 and contracts in the axial direction so as to be operated in a telescopic manner and to absorb impact. The steering column apparatus 120 is attached to the vehicle body so as to be tilted through the tilt bracket 123 attached to the vehicle body. Further, the tilt bracket 123 includes the tightening mechanism 129 which holds the inner column 121 by tightening the outer column 122. The outer column 122 includes a slit, and the inner column 121 is gripped by a pressing bracket 1232 which presses the inner column by the action of the tightening mechanism 129 in the left and right direction of the slit. Furthermore, a cam and gear mechanism 148 serving as a fixed plate detachably attached to the inner column 121 is disposed in the slit, and the tightening mechanism 129 is provided with a tilt lever which presses a cam portion provided in a tilt bolt center portion 153 in a direction from the downside of the fixed plate toward the upside thereof by rotating a cam lock mechanism 133, as a cam at the center of a tilt lever 127, with the rotation of the tilt lever and holding the cam thereat.

A steering column apparatus according to the third embodiment is a steering column apparatus that supports a steering shaft. Here, the steering column apparatus includes an inner column and an outer column and contracts in the axial direction so as to be adjusted in a telescopic manner and to absorb impact. The steering column apparatus includes a tilt bracket provided in a vehicle body, and is attached to the vehicle body in a tiltable state. Then, the tilt bracket, the outer column, and a telescopic multiplate as a friction plate are tightened by a tightening mechanism so as to hold the inner column fitted into the outer column. Further, the outer column includes a slit, and the inner column is gripped by a pressing bracket which presses the inner column in the left and right direction of the slit in the tightening mechanism. Furthermore, a fixed plate which is detachably attached to the inner column is disposed in the slit, and the fixed bracket which fixes the friction plate is coupled and fixed to the inner column by a resin injection-molding process.

The third embodiment relates to a steering column apparatus that supports a steering shaft. Here, the steering column apparatus includes an inner column and an outer column and contracts in the axial direction so as to be adjusted in a telescopic manner and to absorb impact. The steering column apparatus includes a tilt bracket provided in a vehicle body, and is attached to the vehicle body in a tiltable state. Then, the tilt bracket, the outer column, and a telescopic multiplate as a friction plate are tightened by a tightening mechanism so as to hold the inner column fitted into the outer column. Further, the outer column includes a slit, and the inner column is gripped by a pressing bracket which presses the inner column in the left and right direction of the slit in the tightening mechanism. Furthermore, an inner plate 158 which is a fixed plate as a friction plate detachably attached to the inner column is disposed in the slit, and the fixed bracket which fixes the friction plate is coupled and fixed to the inner column by shear pins 137 and 138 formed by an injection-molding process.

The fourth embodiment relates to a steering device that includes the steering column apparatus according to any one of the first to third embodiments.

The steering device of the fourth embodiment may be appropriately used as a vehicle steering device.

Fifth Embodiment

Figure 24:
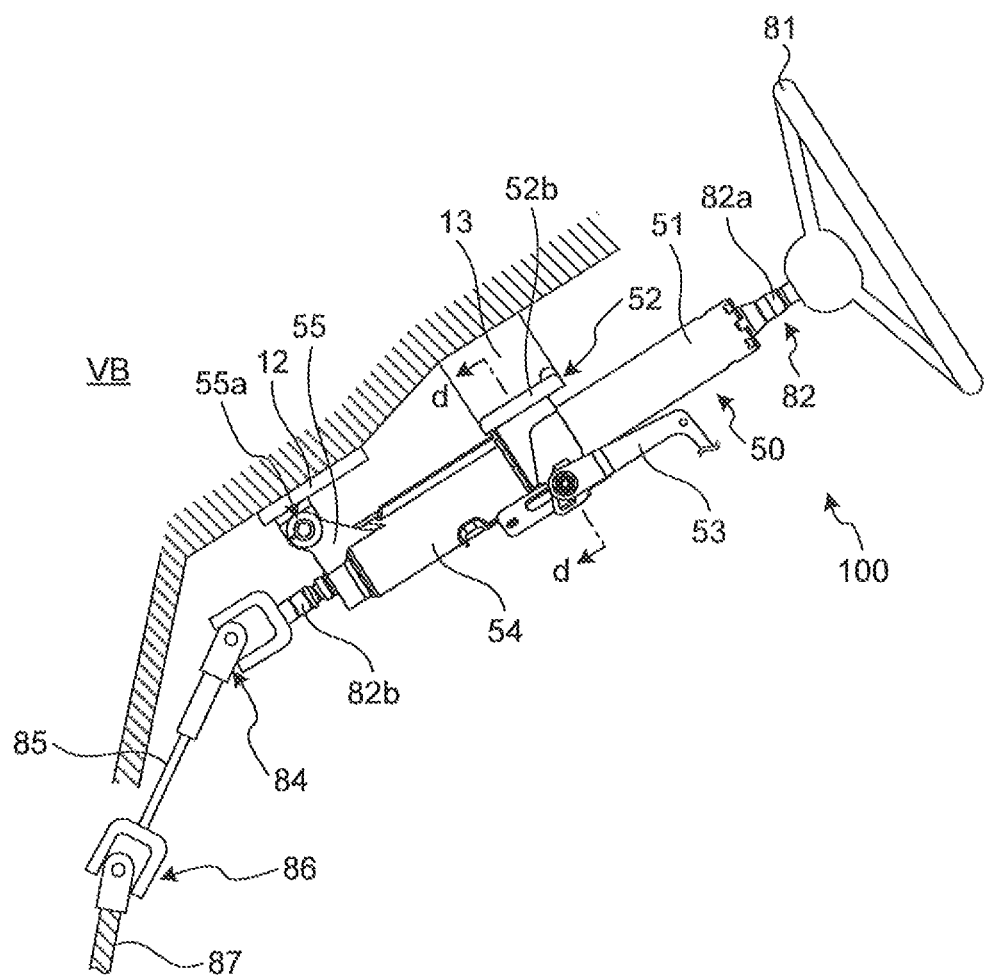
FIG. 24 is a schematic diagram illustrating the periphery of a steering device according to a fifth embodiment.
Figure 25:
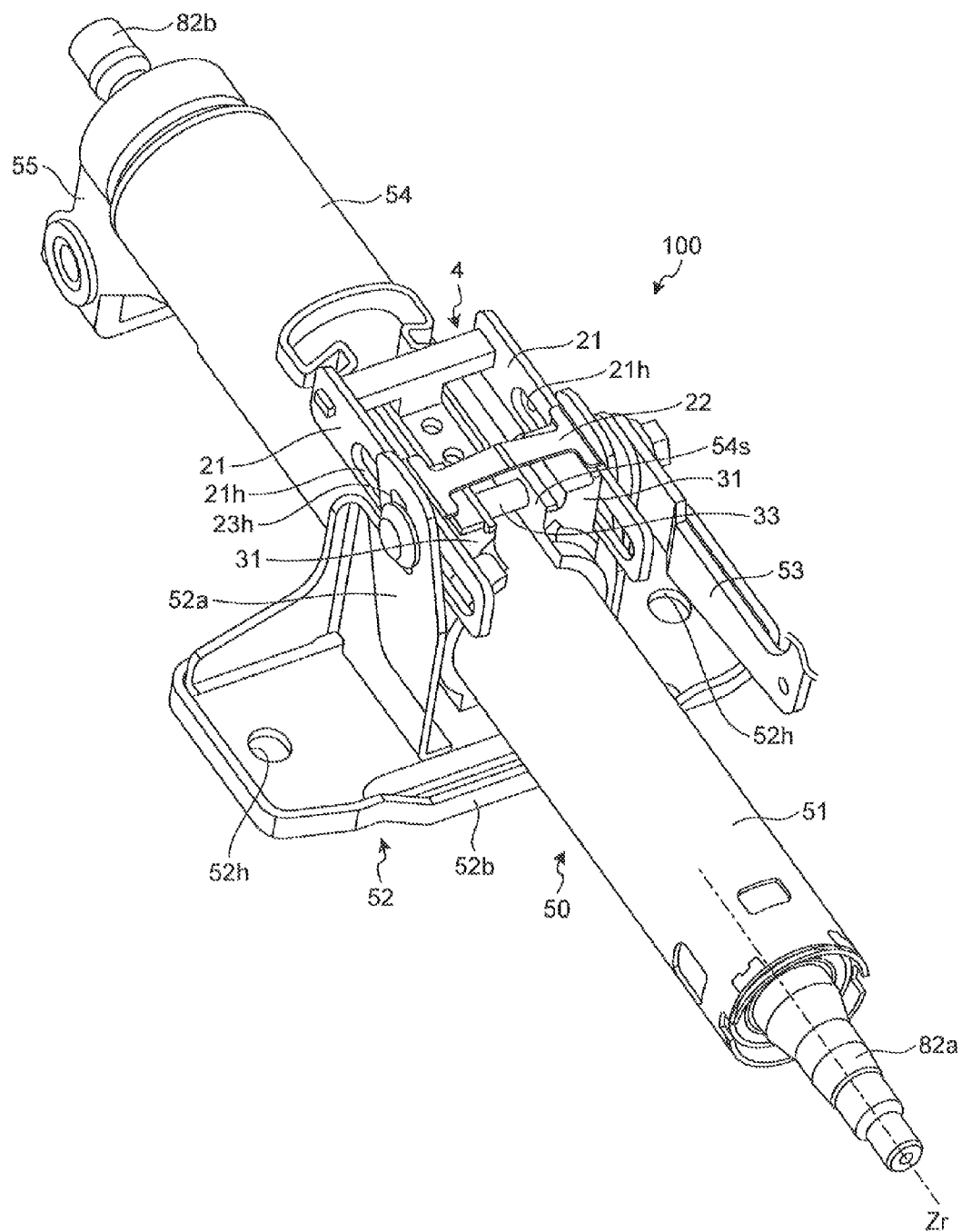
FIG. 25 is a perspective view illustrating the steering device of the fifth embodiment when viewed from a bottom surface thereof.

FIG. 24 is a schematic diagram illustrating the periphery of a steering device according to a fifth embodiment. FIG. 25 is a perspective view illustrating the steering device according to the fifth embodiment when viewed from the bottom surface thereof. Referring to FIGS. 24 and 25, an outline of the steering device according to the fifth embodiment will be described. Further, in the description below, the front side of a vehicle body VB when a steering device 100 is attached to the vehicle body VB will be simply referred to as the front side and the rear side of the vehicle body VB when the steering device 100 is attached to the vehicle body VB will be simply referred to as the rear side. In FIG. 24, the front side indicates the left side of the drawing, and the rear side indicates the right side of the drawing.

(Steering Device)

The steering device 100 includes a steering wheel 81, a steering shaft 82, a universal joint 84, a lower shaft 85, and a universal joint 86 in order in which a force is transmitted from an operator, and is coupled to a pinion shaft 87.

The steering shaft 82 includes an input shaft 82*a* and an output shaft 82*b*. In the input shaft 82*a*, one end is connected to the steering wheel 81 and the other end is connected to the output shaft 82*b*. In the output shaft 82*b*, one end is connected to the input shaft 82*a* and the other end is connected to the universal joint 84. In the fifth embodiment, the input shaft 82*a* and the output shaft 82*b* are formed of general steel such as carbon steel for machine structural use (so-called SC steel) or carbon steel tube for machine structural use (so-called STKM steel).

In the lower shaft 85, one end is connected to the universal joint 84 and the other end is connected to the universal joint 86. In the pinion shaft 87, one end is connected to the universal joint 86.

Further, the steering device 100 includes a steering column 50 including a cylindrical inner column 51 which supports the input shaft 82*a* so as to be rotatable about the rotation axis Zr illustrated in FIG. 25 and a cylindrical outer column 54 into which at least a part of the inner column 51 is inserted. The inner column 51 is disposed at the rear side of the outer column 54. In the description below, the axial direction of the inner column 51 and the axial direction of the outer column 54 will be simply referred to as the axial direction.

The steering device 100 includes an outer column bracket 52 which is fixed to a vehicle body side member 13 and supports the outer column 54. The outer column bracket 52 includes an attachment plate portion 52*b* which is fixed to the vehicle body side member 13 and a frame-shaped support portion 52*a* which is integrated with the attachment plate portion 52*b*. The attachment plate portion 52*b* of the outer column bracket 52 includes, for example, an attachment hole 52*h*, and is fixed to the vehicle body side member 13 by a fixing member such as a bolt and the attachment hole 52*h*. The frame-shaped support portion 52*a* of the outer column bracket 52 is disposed at both sides of the outer column 54 so as to tighten the outer column 54. Further, the frame-shaped support portion 52*a* is provided with a tilt adjustment hole 23*h* as an elongated hole which is long in the up and down direction of the vehicle body VB.

Further, the outer column 54 includes a pivot bracket 55 which is provided at the front end. The pivot bracket 55 is supported by the vehicle body side member 12 so as to be rotatable about a center of a rotation shaft 55*a*. The rotation shaft 55*a* is parallel to, for example, the horizontal direction. Accordingly, the outer column 54 is supported so as to be tilted in the vertical direction.

Figure 26:
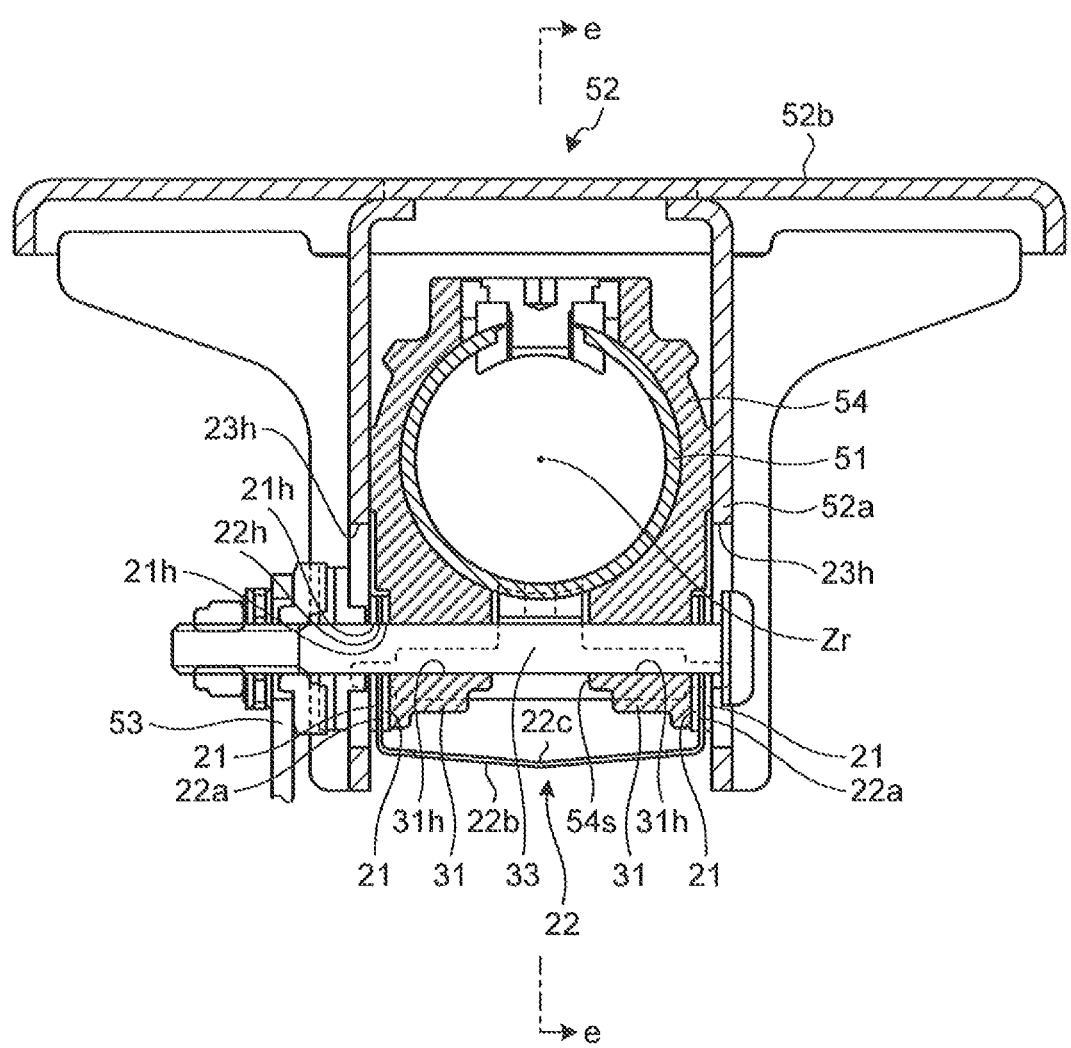
FIG. 26 is a cross-sectional view taken along the line d-d of FIG. 24.
Figure 27:
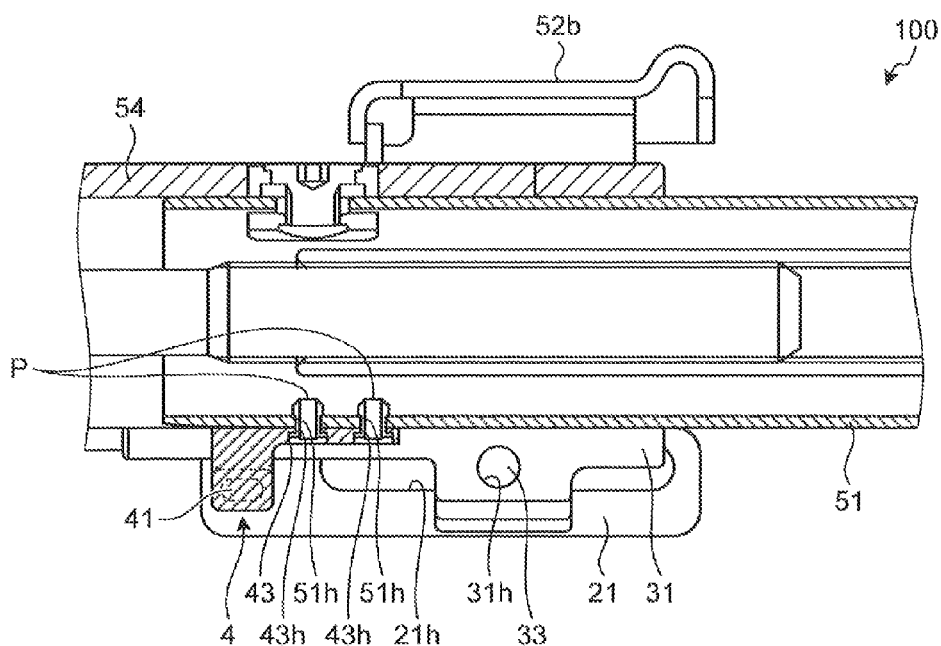
FIG. 27 is a cross-sectional view taken along the line e-e of FIG. 26.
Figure 28:
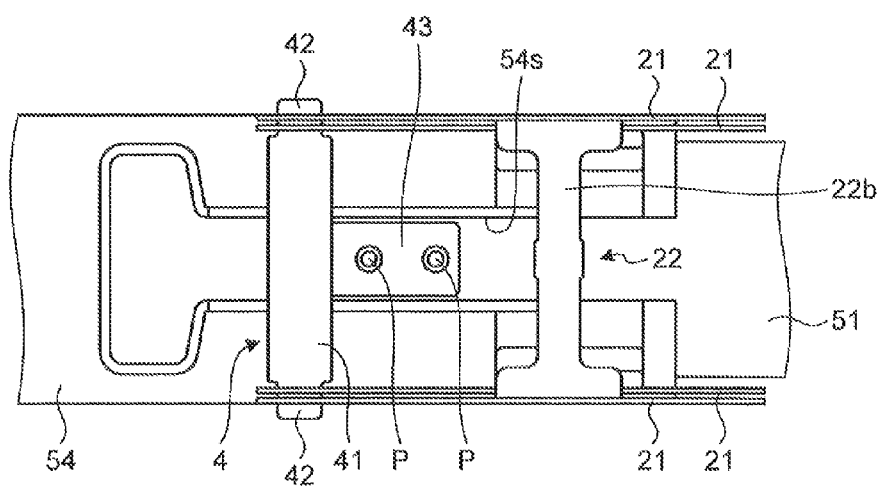
FIG. 28 is a diagram illustrating the bottom surface of the steering device according to the fifth embodiment.

FIG. 26 is a cross-sectional view taken along the line d-d of FIG. 24. FIG. 27 is a cross-sectional view taken along the line e-e of FIG. 26. FIG. 28 is a diagram illustrating the bottom surface of the steering device according to the fifth embodiment. As illustrated in FIG. 26, the outer column 54 includes two rod penetration holes 31 and a slit 54*s*. The rod penetration hole 31 is a portion which protrudes outward in the radial direction from the outer wall of the inner column 51, and includes a rod penetration hole 31*h* as an annular hole as illustrated in FIG. 27. The radial direction indicates a direction perpendicular to the axial direction, and is used as the same meaning in the description below. The rod penetration holes 31*h* of two rod penetration holes 31 face each other in the radial direction. Further, a part of the rod penetration hole 31 faces the frame-shaped support portion 52*a*. A rod 33 is connected to a manipulation lever 53 while penetrating two rod penetration holes 31*h* and the tilt adjustment hole 23*h* of the frame-shaped support portion 52*a*.

Further, the slit 54*s* is an elongated hole which is formed by notching one insertion side end of the inner column 51, and is provided in the outer wall of the outer column 54 at a position between two rod penetration holes 31. Since the outer column 54 includes the slit 54*s*, the inner diameter decreases when the outer column is tightened. Accordingly, in a state where the outer column 54 is tightened, the outer column 54 is located at a portion covering the inner column 51, and the inner wall of the outer column 54 contacts the outer wall of the inner column 51. For this reason, a friction force is generated between the outer column 54 and the inner column 51. Further, both ends of the slit 54*s* in the axial direction may be blocked. That is, the slit 54*s* may be a closed structure.

As illustrated in FIG. 26, the steering device 100 includes a first telescopic friction plate 21 and a second telescopic friction plate 22. The first telescopic friction plate 21 is a plate-shaped member that includes a telescopic adjustment hole 21*h* as an elongated hole which is long in the axial direction. For example, two first telescopic friction plates 21 are disposed between the frame-shaped support portion 52*a* and the rod penetration hole 31 in an overlapping state. The second telescopic friction plate 22 is, for example, a member that is formed by bending a plate material, and substantially has a U-shape when viewed from the axial direction. The second telescopic friction plate 22 includes two friction portions 22*a* which are disposed between two first telescopic friction plates 21, a connection portion 22*b* which connects two friction portions 22*a*, and a curved portion 22*c* which is provided in the connection portion 22*b*. In addition, the first telescopic friction plate 21 may not be essentially disposed between the frame-shaped support portion 52*a* and the rod penetration hole 31, and may be disposed with the frame-shaped support portion 52*a* interposed between the first telescopic friction plate 21 and the rod penetration hole 31.

The friction portion 22*a* includes a rod penetration hole 22*h* as an annular hole. The rod 33 penetrates the telescopic adjustment hole 21*h* and the rod penetration hole 22*h*. The connection portion 22*b* is used to integrally connect two friction portions 22*a*, and hence the friction portions 22*a* may be easily disposed between two first telescopic friction plates 21. Further, the connection portion 22*b* may be maintained in a droopy state due to the curved portion 22*c*. Accordingly, the connection portion 22*b* may not easily pull the friction portions 22*a* even when the tightening state of the outer column bracket 52 changes so that the distance between two friction portions 22*a* changes. For this reason, it is possible to suppress a problem in which the friction portions 22*a* are pulled by the connection portion 22*b* so that a gap is formed between the friction portion 22*a* and the first telescopic friction plate 21.

When the frame-shaped support portion 52*a* is tightened, the first telescopic friction plate 21 and the friction portion 22*a* of the second telescopic friction plate 22 are pressed against the rod penetration hole 31 of the outer column 54 by the frame-shaped support portion 52a. Accordingly, a friction force is generated between the frame-shaped support portion 52a and the first telescopic friction plate 21, a friction force is generated between the first telescopic friction plate 21 and the friction portion 22a of the second telescopic friction plate 22, and a friction force is generated between the first telescopic friction plate 21 and the rod penetration hole 31. For this reason, the surface causing a friction force increases compared to the case where the first telescopic friction plate 21 and the second telescopic friction plate 22 are not provided. The frame-shaped support portion 52a may more strongly tighten the outer column 54 by the first telescopic friction plate 21 and the second telescopic friction plate 22.

Further, when the manipulation lever 53 is rotated, the tightening force for the frame-shaped support portion 52a may be loosened, and the friction force between the frame-shaped support portion 52a and the outer column 54 disappears or decreases. Accordingly, the tilt position of the outer column 54 may be adjusted. Further, when the manipulation lever 53 is rotated, the tightening force for the frame-shaped support portion 52a may be loosened, and hence the width of the slit 54s of the outer column 54 increases. Accordingly, since the force in which the outer column 54 tightens the inner column 51 disappears, the friction force caused by the sliding of the inner column 51 disappears. Accordingly, an operator may adjust the telescopic position by pressing and pulling the inner column 51 through the steering wheel 81 after rotating the manipulation lever 53.

Figure 29:
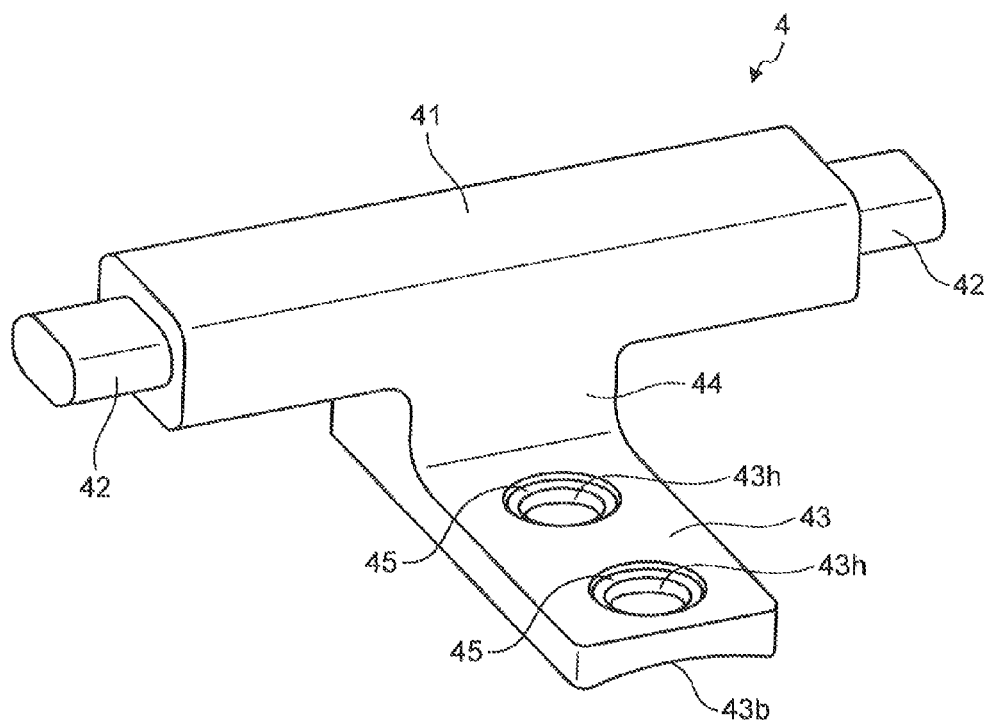
FIG. 29 is a perspective view illustrating an inner column bracket according to the fifth embodiment.

As illustrated in FIGS. 27 and 28, the steering device 100 includes an inner column bracket 4. FIG. 29 is a perspective view illustrating an inner column bracket according to the fifth embodiment. As illustrated in FIG. 29, the inner column bracket 4 includes, for example, an arm portion 41, an insertion portion 42, a neck portion 44, and a leg portion 43. For example, as illustrated in FIG. 28, the arm portion 41 is a rod-shaped portion which connects two first telescopic friction plates 21 facing each other at both sides of the outer column 54. The insertion portion 42 is a portion which is formed at both ends of the arm portion 41 and is inserted into a hole formed in the first telescopic friction plate 21. The insertion portion 42 is thinner than the arm portion 41. The neck portion 44 is a portion which protrudes from a part of the arm portion 41 in a direction perpendicular to the length direction of the arm portion 41. The leg portion 43 is a plate-shaped portion which is provided in the end opposite to the arm portion 41 of the neck portion 44 and contacts the inner column 51. As illustrated in FIG. 29, an inner column side surface 43b of the leg portion 43 is formed in a shape that follows the shape of the outer wall of the inner column 51. Further, the leg portion 43 includes, for example, two circular concave portions 45 in a surface opposite to the surface facing the inner column 51.

As illustrated in FIG. 28, the inner column bracket 4 is connected to the first telescopic friction plates 21 disposed at both sides of the outer column 54. The inner column bracket 4 is supported by the first telescopic friction plate 21 in a manner such that the insertion portion 42 is inserted into a hole formed in the first telescopic friction plate 21. Further, the first telescopic friction plates 21 which are disposed at both sides of the outer column 54 face each other with the arm portion 41 of the inner column bracket 4 interposed therebetween. Further, the inner column bracket 4 is connected to the inner column 51 by the leg portion 43.

In order to detachably connect the inner column bracket 4 and the inner column 51 to each other, as illustrated in FIG. 27, a first hole 51h is opened in the inner column 51, and a second hole 43h is opened in the bottom surface of the concave portion 45 of the leg portion 43. The first hole 51h and the second hole 43h communicate with each other. For example, in the fifth embodiment, each of the first hole 51h and the second hole 43h is provided at two positions, and has the same inner periphery. The shear pin P is inserted into a position straddling the first hole 51h and the second hole 43h, so that the inner column bracket 4 and the inner column 51 are detachably connected to each other. Further, the first hole 51h and the second hole 43h are disposed at a position where the distance values from the first telescopic friction plates 21 disposed at both sides of the outer column 54 are equal to each other.

Further, the inner column bracket 4 is disposed so that at least a part is fitted into the slit 54s of the outer column 54. Specifically, the leg portion 43 of the inner column bracket 4 is fitted so as to face the inner wall of the slit 54s.

Figure 30:
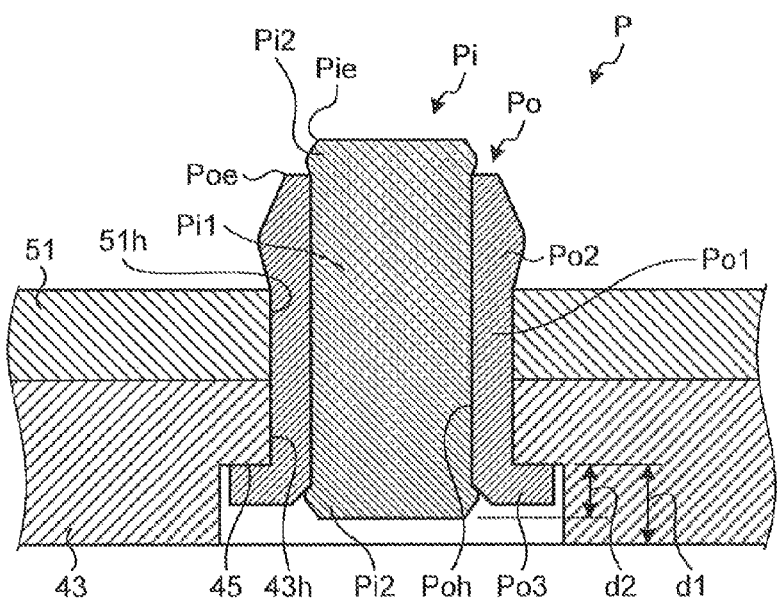
FIG. 30 is an enlarged diagram illustrating the periphery of a shear pin of FIG. 27.
Figure 31:
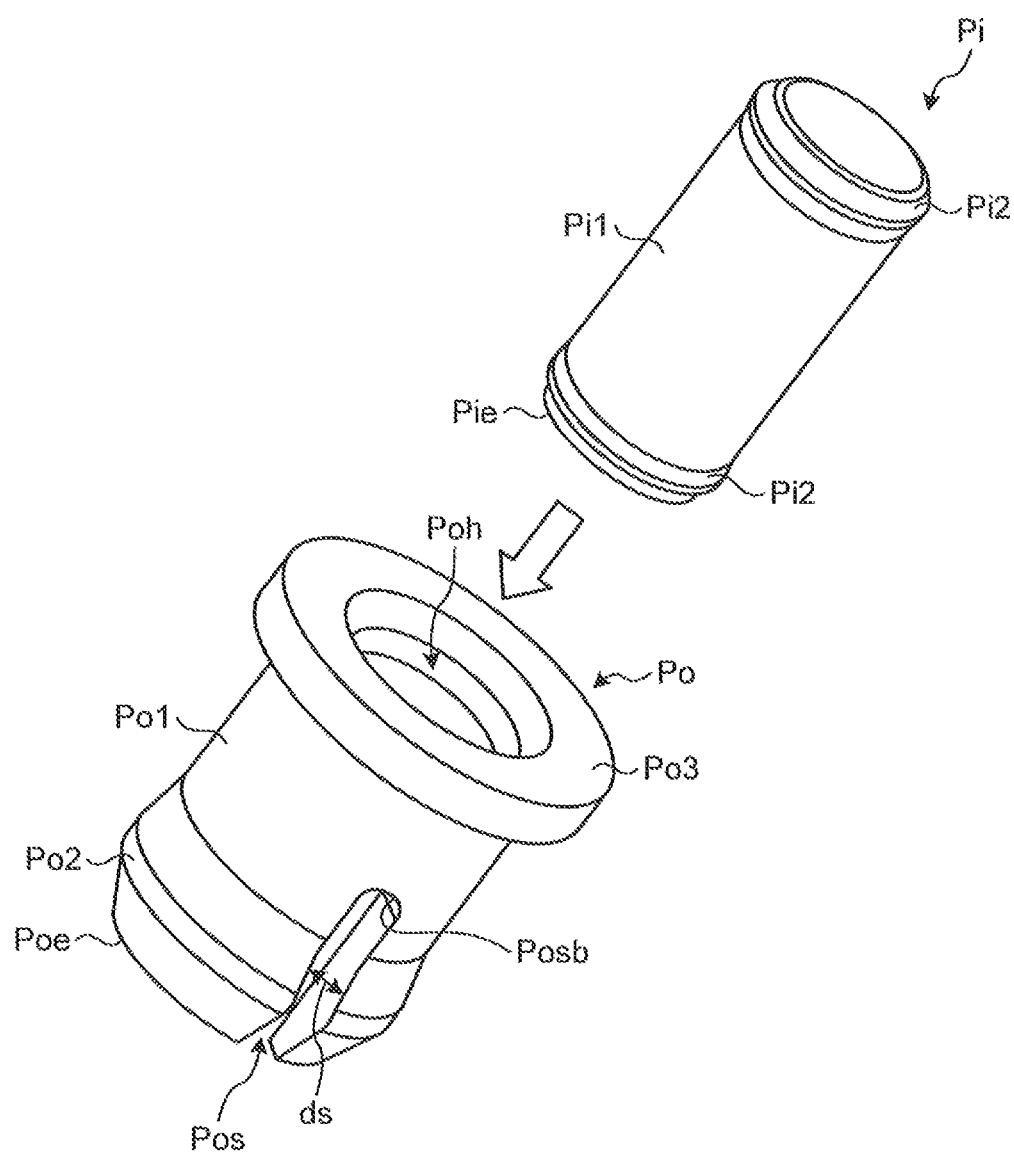
FIG. 31 is a perspective view illustrating a shear pin in a state before an inner pin according to the fifth embodiment is inserted into an outer pin.
Figure 32:
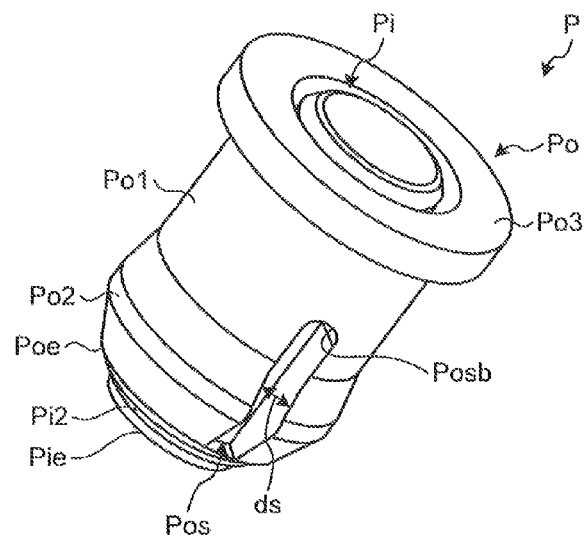
FIG. 32 is a perspective view illustrating the shear pin in a state after the inner pin according to the fifth embodiment is inserted into the outer pin.

FIG. 30 is an enlarged diagram illustrating the periphery of the shear pin of FIG. 27. FIG. 31 is a perspective view illustrating the shear pin in a state before an inner pin according to the fifth embodiment is inserted into an outer pin. FIG. 32 is a perspective view illustrating the shear pin in a state after the inner pin according to the fifth embodiment is inserted into the outer pin. In the fifth embodiment, the shear pin P includes an outer pin Po and an inner pin Pi. The outer pin Po and the inner pin Pi are formed of, for example, a resin such as polyacetal.

As illustrated in FIG. 30, the outer pin Po is a cylindrical member that is inserted through the first hole 51h and the second hole 43h. The outer pin Po includes, for example, a main body portion Po1, a separation preventing portion Po2, a flange portion Po3, and a guide hole Poh. As illustrated in FIGS. 30 and 31, the main body portion Po1 has a cylindrical shape, and is inserted through the first hole 51h and the second hole 43h. The separation preventing portion Po2 is provided at one end of the main body portion Po1 and is located at the inside of the inner column 51. The separation preventing portion Po2 has a cylindrical shape, and has an outer periphery larger than the inner periphery of the first hole 51h and the inner periphery of the second hole 43h. Accordingly, since the separation preventing portion Po2 contacts the inner wall of the inner column 51, it is possible to suppress the outer pin Po from coming off from the first hole 51h and the second hole 43h. The flange portion Po3 is provided at the other end of the main body portion Po1, and is located at the outside of the inner column 51 in the radial direction in relation to the second hole 43h. The flange portion Po3 has, for example, a disk shape, and has an outer periphery larger than the inner periphery of the first hole 51h and the inner periphery of the second hole 43h. Accordingly, since the flange portion Po3 contacts the bottom surface of the concave portion 45, it is possible to suppress the outer pin Po from coming off from the first hole 51h and the second hole 43h. The guide hole Poh is a penetration hole which penetrates an area from the flange portion Po3 to the separation preventing portion Po2.

In the fifth embodiment, the outer pin Po is inserted into the first hole 51h and the second hole 43h by press-inserting. Since the outer pin Po is inserted into the first hole 51h and the second hole 43h, the first hole 51h and the second hole 43h are positioned. For example, the separation preventing portion Po2 is inserted from the second hole 43h into the first hole 51h and the second hole 43h. The separation preventing portion Po2 is formed so that the outer periphery at the end Poe opposite to the main body portion Po1 is smaller than the inner periphery of the first hole 51h and the inner periphery of the second hole 43h. Accordingly, the separation preventing portion Po2 may be easily inserted into the second hole 43h. In addition, the outer pin Po may be inserted from the first hole 51h into the first hole 51h and the second hole 43h. Further, the outer pin Po may be press-inserted after a rib or the like is provided in the outer wall of the main body portion Po1.

Figure 33:
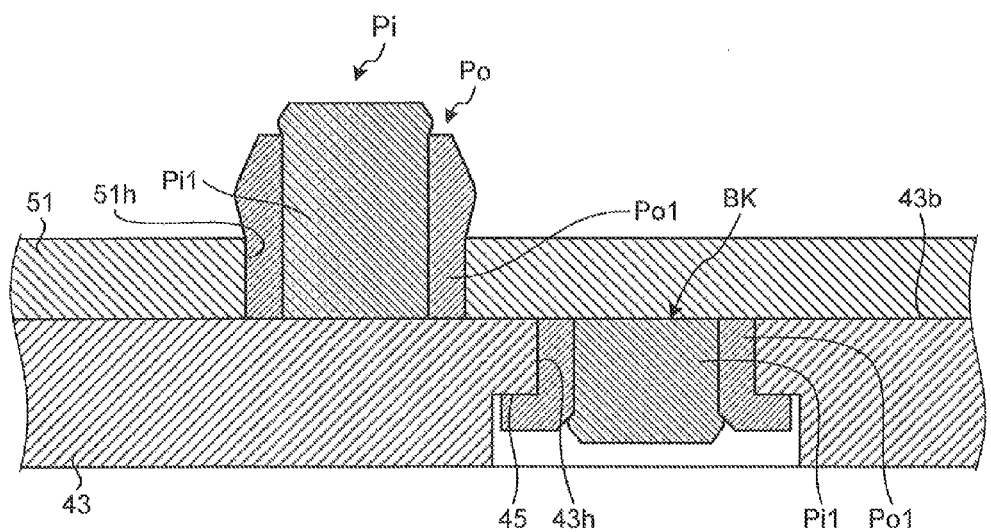
FIG. 33 is a diagram illustrating the cut shear pin.

As illustrated in FIGS. 31 to 33, the outer pin Po includes a single notch Pos which is formed from the separation preventing portion Po2 toward the flange portion Po3. When the separation preventing portion Po2 is inserted into the second hole 43h, the width ds of the notch Pos in the circumferential direction of the outer pin Po decreases, and hence the outer periphery of the separation preventing portion Po2 decreases. Accordingly, the separation preventing portion Po2 may be easily inserted through the first hole 51h and the second hole 43h. In the description below, the width ds of the notch Pos in the circumferential direction of the outer pin Po will be simply referred to as the width ds of the notch Pos. In addition, the outer pin Po may include a plurality of notches Pos. Here, it is desirable to dispose the plurality of notches Pos at the same interval in the circumferential direction of the outer pin Po.

In a state before the outer pin Po is inserted through the first hole 51h and the second hole 43h, the outer periphery of the main body portion Po1 is larger than the inner periphery of the first hole 51h and the inner periphery of the second hole 43h. Then, in a state where the outer pin Po is inserted into the first hole 51h and the second hole 43h, the outer periphery of the main body portion Po1 is the same as the inner periphery of the first hole 51h and the inner periphery of the second hole 43h. Accordingly, the main body portion Po1 urges the inner wall of the first hole 51h and the inner wall of the second hole 43h. For this reason, a gap is not easily formed between the main body portion Po1 and the inner wall of the first hole 51h and a gap is not easily formed between the main body portion Po1 and the inner wall of the second hole 43h. Accordingly, the play of the outer pin Po is suppressed.

The inner pin Pi is a member that penetrates the guide hole Poh and urges the inner wall of the guide hole Poh outward in the radial direction of the guide hole Poh. In the description below, the outside in the radial direction of the guide hole Poh will be simply referred to as the outside in the radial direction. The inner pin Pi includes, for example, a body portion Pi1 and a large diameter portion Pi2. As illustrated in FIGS. 30 to 32, the body portion Pi1 has a columnar shape and is inserted through the guide hole Poh. The large diameter portion Pi2 is provided at both ends of the body portion Pi1 and is located at the outside of the guide hole Poh. The large diameter portion Pi2 has an outer periphery larger than the inner periphery of the guide hole Poh. Accordingly, since the large diameter portion Pi2 contacts the edges of both ends of the guide hole Poh, it is possible to suppress the inner pin Pi from coming off from the outer pin Po. In addition, both ends of the guide hole Poh may be provided with a stepped portion of which the inner periphery is enlarged. In this case, since the large diameter portion Pi2 contacts the edge of the stepped portion, the inner pin Pi may not be easily projected from both ends of the guide hole Poh.

In the fifth embodiment, the inner pin Pi is inserted into the guide hole Poh by press-inserting. For example, the large diameter portion Pi2 is inserted from the flange portion Po3 into the guide hole Poh. The large diameter portion Pi2 is formed so that the outer periphery at the end Pie opposite to the body portion Pi1 becomes smaller than the inner periphery of the outer pin Po. Accordingly, the large diameter portion Pi2 may be easily inserted into the guide hole Poh. Further, since both ends of the inner pin Pi are provided with the same large diameter portion Pi2, the inner pin may be inserted from any end into the guide hole Poh. Accordingly, the shear pin P may be easily assembled.

In a state before the inner pin Pi is inserted into the guide hole Poh, the outer periphery of the body portion Pi1 is larger than the inner periphery of the guide hole Poh. Then, in a state where the inner pin Pi is inserted through the guide hole Poh, the outer periphery of the body portion Pi1 is the same as the inner periphery of the guide hole Poh. Accordingly, the body portion Pi1 urges the inner wall of the guide hole Poh. For this reason, a gap is not easily formed between the body portion Pi1 and the inner wall of the guide hole Poh. Accordingly, the play of the inner pin Pi is suppressed.

Since the body portion Pi1 urges the inner wall of the guide hole Poh outward in the radial direction, a force of widening the width ds of the notch Pos is applied to the outer pin Po. Accordingly, a force in which the outer pin Po urges the inner wall of the first hole 51h and the inner wall of the second hole 43h outward in the radial direction increases. Further, since the body portion Pi1 urges the inner wall of the guide hole Poh outward in the radial direction, the width ds of the notch Pos in the separation preventing portion Po2 increases. Accordingly, the outer periphery of the separation preventing portion Po2 increases. For this reason, the shear pin P which is obtained by integrating the outer pin Po and the inner pin Pi with each other is fixed to a position straddling the first hole 51h and the second hole 43h, and hence the inner column 51 and the inner column bracket 4 are connected to each other.

Further, since the steering device 100 according to the fifth embodiment uses the shear pin P in the first hole 51h and the second hole 43h, there is no need to provide a device for charging a resinous member and a member for receiving the resinous member compared to the case where the resinous member is charged into the first hole 51h and the second hole 43h. For this reason, the steering device 100 according to the fifth embodiment may be easily assembled.

When an excessive load is applied to the steering wheel 81, the load is transmitted to the inner column 51 through the input shaft 82a, and hence the inner column 51 is moved forward. Meanwhile, the inner column bracket 4 which is supported by the first telescopic friction plate 21 does not move. For this reason, since a shear force is applied to the shear pin P, the shear pin P is cut when the load exceeds the allowable shear force of the shear pin P. When the shear pin P is cut, the connection between the inner column 51 and the inner column bracket 4 is released. When the connection between the inner column 51 and the inner column bracket 4 is released, the inner column 51 is supported in the axial direction by a friction force generated between the inner column 51 and the outer column 54. Thus, when an excessive load is applied to the steering wheel due to the collision of the operator with respect to the steering wheel 81, a force for moving the inner column 51 decreases immediately after the excessive load is applied to the steering wheel, and hence impact is absorbed.

Further, even when the shear pin P is cut, the outer column 54 is supported by the outer column bracket 52 fixed to the vehicle body side member 13. Further, the inner column 51 is supported by the outer column 54. For this reason, even when the shear pin P is cut, the steering column 50 is not dropped.

FIG. 33 is a diagram illustrating a state where the shear pin is cut. As illustrated in FIG. 33, the shear pin P is cut at a cut surface BK. The cut surface BK corresponds to the outer wall of the inner column 51, that is, the inner column side surface 43b of the leg portion 43. The outer pin Po is cut at the main body portion Po1, and the inner pin Pi is cut at the body portion Pi1. For this reason, the allowable shear force of the shear pin P depends on the cross-sectional area of the main body portion Po1 and the cross-sectional area of the body portion Pi1 at the cut surface BK.

Figure 34:
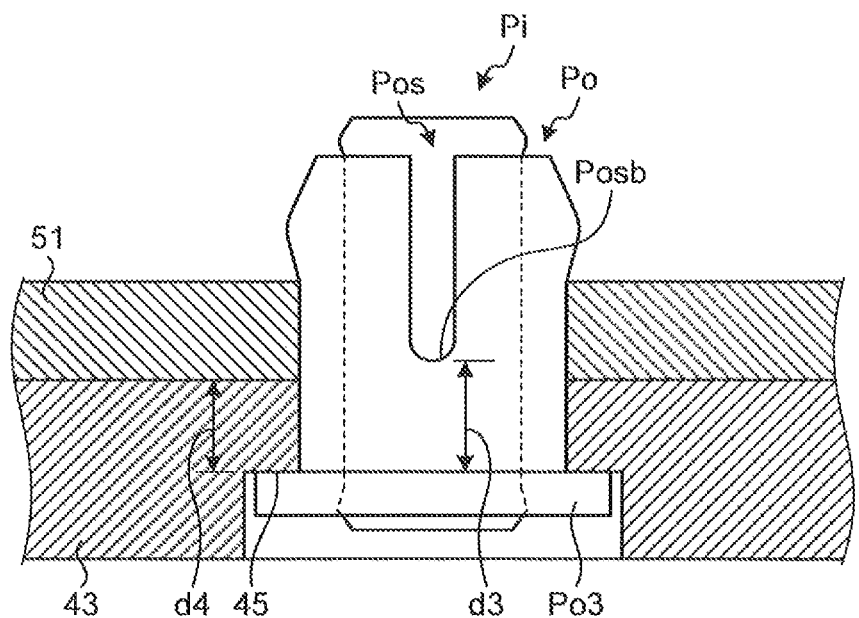
FIG. 34 is an enlarged diagram illustrating the periphery of the shear pin of FIG. 27 while illustrating only the shear pin as a side view.

FIG. 34 is an enlarged diagram illustrating the periphery of the shear pin of FIG. 27 while illustrating only the shear pin as a side view. As illustrated in FIG. 34, it is desirable that the distance d3 from the flange portion Po3 to the front end Posb of the notch Pos be larger than the distance d4 from the flange portion Po3 to the outer wall of the inner column 51. Accordingly, the notch Pos is not included in the cut surface BK used for cutting the shear pin P. For this reason, since a loss portion corresponding to the notch Pos disappears in the cross-section of the main body portion Po1 in the cut surface BK, unevenness in the allowable shear force of the shear pin P is suppressed.

Further, it is desirable that the inner column 51 move straightly in the axial direction after the shear pin P is cut. When the movement direction of the inner column 51 forms an angle with respect to the axial direction of the outer column 54, the movement of the inner column 51 is easily disturbed or a friction force generated between the inner column 51 and the outer column 54 easily becomes larger than a predetermined value.

In the fifth embodiment, as illustrated in FIG. 28, the inner column bracket 4 is bonded to the first telescopic friction plates 21 disposed at both sides of the outer column 54. Accordingly, when an axial load is applied to the inner column bracket 4, a tightening force is applied to the inner column bracket 4 from both sides of the outer column 54. For this reason, it is possible to stabilize the posture of the inner column bracket 4 when the shear pin P is cut. Thus, the posture of the inner column 51 when the inner column starts to move may be easily maintained so as to be straight in the axial direction. Accordingly, the inner column 51 moves easily straightly in the axial direction.

Further, as illustrated in FIGS. 27 and 28, each of the first hole 51h and the second hole 43h is provided at two different positions in the axial direction. For this reason, the shear pin P is disposed at two positions in the axial direction. If each of the first hole 51h and the second hole 43h is provided at one position, that is, the shear pin P is disposed at one position, there is a possibility that the inner column bracket 4 may rotate about the shear pin P. On the contrary, in the fifth embodiment, since the shear pin P is disposed at two different positions in the axial direction, the rotation of the inner column bracket 4 is suppressed. For this reason, it is possible to further stabilize the posture of the inner column bracket 4 when the shear pin P is cut.

Further, the first hole 51h and the second hole 43h are disposed at a position where the distance values from both of the first telescopic friction plates 21, which are disposed at both sides with the inner column bracket 4 interposed therebetween, are equal to each other. Accordingly, when an axial load is applied to the inner column bracket 4, a more stable tightening force is applied from both sides of the outer column 54 to the inner column bracket 4. Accordingly, it is possible to stabilize the posture of the inner column bracket 4 when the shear pin P is cut. Thus, it is possible to easily maintain the posture in which the inner column 51 starts to move so as to be straighter in the axial direction. Thus, the inner column 51 may move more straightly in the axial direction.

Further, even when the inner column bracket 4 may not receive a stable tightening force from both sides of the outer column 54, since the leg portion 43 of the inner column bracket 4 is fitted into the slit so as to face the inner wall of the slit 54s, the inner column bracket 4 is guided by the slit 54s. Accordingly, it is possible to stabilize the posture of the inner column bracket 4 when the shear pin P is cut.

Further, as illustrated in FIG. 30, it is desirable that the depth d1 of the concave portion 45 be equal to or larger than the length d2 of the portion projected from the second hole 43h in the shear pin P. Accordingly, the shear pin P is not projected from the surface of the inner column bracket 4. For this reason, the possibility that the shear pin P may be broken by an external force decreases.

In addition, the allowable shear force of the shear pin P may be adjusted by changing the number of the first holes 51h and the second holes 43h, the cross-sectional areas of the first hole 51h and the second hole 43h, and the material of the shear pin P. For example, each of the first hole 51h and the second hole 43h may be provided at one position or three or more positions. Further, the shear pin P may be formed of, for example, metal including non-ferrous metal or rubber.

Figure 35:
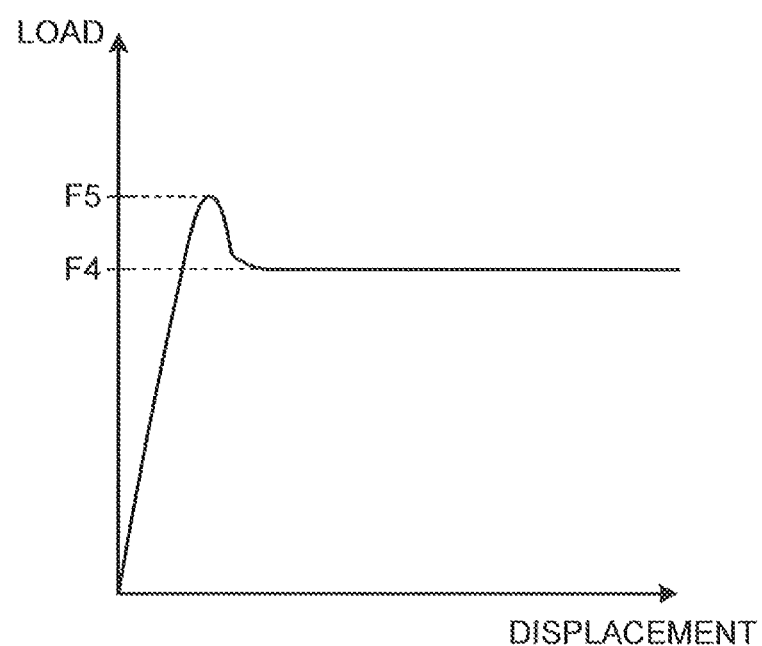
FIG. 35 is a diagram illustrating a relation between a displacement amount of a steering column and a load necessary to move the steering column of a comparative example.
Figure 36:
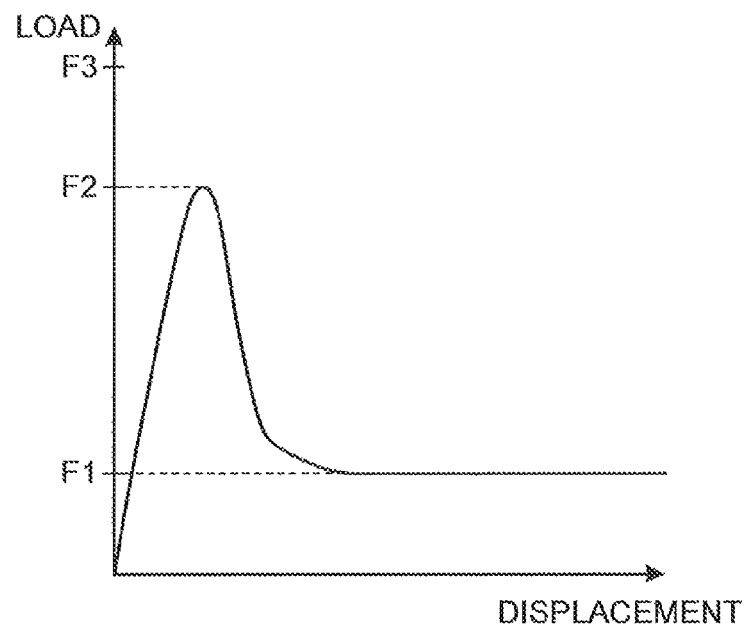
FIG. 36 is a diagram illustrating a relation between a displacement amount of a steering column and a load necessary to move the steering column of the fifth embodiment.

FIG. 35 is a diagram illustrating a relation between a displacement amount of a steering column and a load necessary to move the steering column of a comparative example. FIG. 36 is a diagram illustrating a relation between a displacement amount of the steering column and a load necessary to move the steering column of the fifth embodiment. In FIGS. 35 and 36, the horizontal axis indicates the forward displacement amount of the steering column, and the vertical axis indicates the load necessary to move the steering column forward.

The comparative example is an example in the case where the outer column is attached to the vehicle body through the capsule as in the technique disclosed in Patent Literature 1. In the comparative example, the outer column is disposed at the rear side in relation to the inner column. Then, when an excessive load is applied to the outer column, the rod contacts the end of the telescopic adjustment hole integrated with the outer column, and then the load is transmitted to the capsule through the bracket. A force F5 illustrated in FIG. 35 indicates the allowable shear force of the capsule.

In the comparative example, the outer column is supported in the axial direction by a friction force generated between the inner column and the outer column due to the tightening of the bracket. A force F4 illustrated in FIG. 35 indicates the friction force that supports the outer column. The force F4 is smaller than the force F5. In order to prevent the movement of the outer column by the load applied in normal use, the force F4 needs to be maintained at a predetermined value or more.

In the comparative example, when a load of the force F5 or more is applied to the outer column, the capsule is cut and the outer column is separated from the vehicle body. Subsequently, the outer column moves in the axial direction while absorbing a friction force with respect to the inner column. However, since the force F4 is maintained at a predetermined value or more as described above, the outer column moves smoothly, and hence the operator may not be easily protected from the secondary collision.

Meanwhile, in the fifth embodiment, the inner column 51 is supported in the axial direction by a first friction force generated between the inner column and the outer column 54 by the tightening of the outer column bracket 52 and a second friction force generated between the first telescopic friction plate 21 and the member (the outer column bracket 52, the second telescopic friction plate 22, and the outer column 54) contacting the first telescopic friction plate 21. The force F1 illustrated in FIG. 36 indicates the first friction force, and the force F3 indicates the sum of the first friction force and the second friction force. Further, the force F2 illustrated in FIG. 36 indicates the allowable shear force of the shear pin P. The force F2 is smaller than the force F3 and is larger than the force F1.

In the fifth embodiment, when a load of the force F2 or more is applied to the inner column 51, the shear pin P is cut and the inner column 51 is separated from the inner column bracket 4. Accordingly, since the connection between the inner column 51 and the first telescopic friction plate 21 is released, the second friction force is not applied to the inner column 51. For this reason, after the shear pin P is cut, the inner column 51 moves in the axial direction while absorbing an impact by the first friction force. In the steering device 100 according to the fifth embodiment, when the first friction force is set to be small, the inner column 51 moves smoothly, and hence the operator may be easily protected from the secondary collision.

In the fifth embodiment, even when the setting value of the first friction force is small, the second friction force may compensate a degree in which the first friction force decreases among the force supporting the inner column 51 in the axial direction. For this reason, since the steering device 100 according to the fifth embodiment adjusts the setting value of the first friction force and the setting value of the second friction force, it is possible to suppress the inner column 51 from moving by the load applied in normal use and to more easily protect the operator from the secondary collision.

As described above, the steering device 100 according to the fifth embodiment includes the cylindrical inner column 51 which rotatably supports the input shaft 82a connected to the steering wheel 81 and has the first hole 51h opened therein, and the outer column 54 which is formed in a cylindrical shape for inserting at least a part of the inner column 51 thereinto and has the slit 54s formed by notching one insertion end of the inner column 51. Further, the steering device 100 includes the outer column bracket 52 which is fixed to the vehicle body side member 13 so as to support the outer column 54 and tightens the outer column 54 along with the telescopic friction plate (the first telescopic friction plate 21) as the plate material. Further, the steering device 100 includes the inner column bracket 4 which is supported by the telescopic friction plate (the first telescopic friction plate 21) and in which the second hole 43h is opened. Further, the steering device 100 includes the shear pin P which detachably connects the inner column 51 and the inner column bracket 4 to each other at a position straddling the first hole 51h and the second hole 43h.

Accordingly, in the steering device 100 according to the fifth embodiment, when an excessive load is applied to the steering wheel 81, the load is transmitted to the inner column 51 through the input shaft 82a so as to move the inner column 51 forward. Meanwhile, the inner column bracket 4 which is supported by the first telescopic friction plate 21 does not move. For this reason, since a shear force is applied to the shear pin P, the shear pin P is cut when the load exceeds the allowable shear force of the shear pin P. When the shear pin P is cut, the connection between the inner column 51 and the inner column bracket 4 is released. When the connection between the inner column 51 and the inner column bracket 4 is released, the inner column 51 is supported in the axial direction by a friction force generated between the inner column 51 and the outer column 54. For this reason, the inner column 51 of the steering column 50 may move toward the front side of the vehicle body. Further, even when the shear pin P is cut, the outer column 54 is supported by the outer column bracket 52 fixed to the vehicle body side member 13. Further, the inner column 51 is supported by the outer column 54. For this reason, even when the shear pin P is cut, the steering column 50 is not dropped. Thus, the steering device 100 according to the fifth embodiment may suppress a problem in which the steering column 50 is dropped by the erroneous operation, even when the setting value (the allowable shear force of the shear pin P) of the separation load, where the steering column 50 moves toward the front side of the vehicle body, is decreased.

Further, in the steering device 100 according to the fifth embodiment, the shear pin P includes the outer pin Po which is a cylindrical member having the guide hole Poh formed by penetrating an area from one end to the other end thereof and is inserted through the first hole 51h and the second hole 43h, and the inner pin Pi which is inserted through the guide hole Poh and urges the inner wall of the guide hole Poh outward in the radial direction of the guide hole Poh. Accordingly, since the steering device 100 may be assembled in a manner such that the first hole 51h and the second hole 43h are positioned by the outer pin Po, and that the inner pin Pi is inserted thereinto, the steering device may be easily assembled.

Further, in the steering device 100 according to the fifth embodiment, the outer pin Po includes the cylindrical main body portion Po1 which is inserted through the first hole 51h and the second hole 43h, the separation preventing portion Po2 which is provided at one end of the main body portion Po1 and has an outer periphery larger than the inner periphery of the first hole 51h and the inner periphery of the second hole 43h, and the notch Pos which is formed from the separation preventing portion Po2 toward the other end of the main body portion Po1. Accordingly, when the separation preventing portion Po2 is inserted into the first hole 51h or the second hole 43h, the width ds of the notch Pos in the circumferential direction of the outer pin Po decreases, and hence the outer periphery of the separation preventing portion Po2 decreases. Accordingly, the separation preventing portion Po2 may be easily inserted through the first hole 51h and the second hole 43h. For this reason, the outer pin Po may be easily attached to the first hole 51h and the second hole 43h.

Further, in the steering device 100 according to the fifth embodiment, the outer pin Po includes the flange portion Po3 which is provided at the other end of the main body portion Po1 and has an outer periphery larger than the inner periphery of the first hole 51h and the inner periphery of the second hole 43h. The distance d3 from the flange portion Po3 to the front end Posb of the notch Pos is larger than the distance d4 from the flange portion Po3 to the outer wall of the inner column 51. Accordingly, the notch Pos is not included in the cut surface BK used for cutting the shear pin P. For this reason, a loss portion corresponding to the notch Pos disappears in the cross-section of the main body portion Po1 of the cut surface BK. Thus, the steering device 100 according to the fifth embodiment may easily suppress unevenness in the allowable shear force of the shear pin P.

Further, in the steering device 100 according to the fifth embodiment, the inner pin Pi includes the columnar body portion Pi1 which urges the inner wall of the guide hole Poh outward in the radial direction of the guide hole Poh, and the large diameter portions Pi2 which are provided at both ends of the body portion Pi1 and each of which has an outer periphery larger than the inner periphery of the guide hole Poh. Accordingly, since the large diameter portion Pi2 contacts the edges of both ends of the guide hole Poh, it is possible to suppress the inner pin Pi from coming off from the outer pin Po.

Further, in the steering device 100 according to the fifth embodiment, the inner column bracket 4 includes the concave portion 45 at the surface opposite to the inner column side surface 43b facing the inner column 51. The second hole 43h is opened in a part of the bottom surface of the concave portion 45, and the depth d1 of the concave portion 45 is equal to or larger than the length d2 of the portion projected from the second hole 43h in the shear pin P. Accordingly, the shear pin P is not projected from the surface of the inner column bracket 4. For this reason, the possibility that the shear pin P may be broken by an external force decreases.

Further, in the steering device 100 according to the fifth embodiment, the telescopic friction plate (the first telescopic friction plate 21) is disposed at both sides of the outer column 54. Accordingly, when an axial load is applied to the inner column bracket 4, a tightening force is applied to the inner column bracket 4 from both sides of the outer column 54. For this reason, it is possible to stabilize the posture of the inner column bracket 4 when the shear pin P is cut. Thus, the posture of the inner column 51 when the inner column starts to move may be easily maintained so as to be straight in the axial direction. Accordingly, since the inner column 51 may easily move straightly in the axial direction, it is possible to prevent a problem in which the movement of the inner column 51 is disturbed or a problem in which a friction force generated between the inner column 51 and the outer column 54 becomes larger than a predetermined value.

Further, in the steering device 100 according to the fifth embodiment, the telescopic friction plates (the first telescopic friction plates 21), which are disposed at both sides of the outer column 54, face each other with the inner column bracket 4 interposed therebetween, and the first hole 51h and the second hole 43h are disposed at a position where the distance values from the telescopic friction plates (the first telescopic friction plates 21), which face each other with the inner column bracket 4 interposed therebetween, are equal to each other. Accordingly, when an axial load is applied to the inner column bracket 4, since a more stable tightening force is applied from both sides of the outer column 54 to the inner column bracket 4, it is possible to stabilize the posture of the inner column bracket 4 when the shear pin P is cut. Thus, when the inner column starts to move, the posture of the inner column 51 may be easily maintained so as to be straight in the axial direction. Accordingly, since the inner column 51 may easily move straightly in the axial direction, it is possible to prevent a problem in which the movement of the inner column 51 is disturbed or a problem in which a friction force generated between the inner column 51 and the outer column 54 becomes larger than a predetermined value.

Further, in the steering device 100 according to the fifth embodiment, the outer column 54 is located at the front side of the vehicle body, includes the pivot bracket 55, and is formed so that the inner column 51 is inserted thereinto. Accordingly, the axial direction of the outer column 54 may be aligned to the axial direction of the inner column 51. For this reason, the outer column 54 may easily guide the inner column 51 when the inner column 51 moves in the axial direction. Accordingly, since the inner column 51 may easily move straightly in the axial direction, it is possible to prevent a problem in which the movement of the inner column 51 is disturbed or a problem in which a friction force generated between the inner column 51 and the outer column 54 becomes larger than a predetermined value.

Further, as described above, the steering device 100 according to the fifth embodiment is formed by a member connection structure using the shear pin P. The member connection structure includes the first fixed member (the inner column 51) in which the first hole 51h is opened and the second fixed member (the inner column bracket 4) which is disposed adjacent to the first fixed member (the inner column 51) and in which the second hole 43h is opened. Further, the member connection structure includes the shear pin P which connects the first fixed member (the inner column 51) and the second fixed member (the inner column bracket 4) to each other at a position straddling the first hole 51h and the second hole 43h and is cut at the cut surface BK of the boundary portion between the first fixed member (the inner column 51) and the second fixed member (the inner column bracket 4) by the movement of the first fixed member (the inner column 51) in the event of the secondary collision. The shear pin P includes the outer pin Po, which is a cylindrical member having the guide hole Poh formed by penetrating an area from one end to the other end thereof and is inserted through the first hole 51h and the second hole 43h, and the inner pin Pi, which is inserted through the guide hole Poh and urges the inner wall of the guide hole Poh outward in the radial direction of the guide hole Poh. The outer pin Po includes the cylindrical main body portion Po1 which is inserted through the first hole 51h and the second hole 43h, the separation preventing portion Po2 which is provided at one end of the main body portion Po1 and has an outer periphery larger than the inner periphery of the first hole 51h and the inner periphery of the second hole 43h, and the notch Pos which is formed from the separation preventing portion Po2 toward the other end of the main body portion Po1. The notch Pos does not overlap the cut surface BK.

Accordingly, the notch Pos is not included in the cut surface BK used for cutting the shear pin P. For this reason, a loss portion corresponding to the notch Pos disappears in the cross-section of the main body portion Po1 in the cut surface BK. Thus, the member connection structure according to the fifth embodiment may easily suppress unevenness in the allowable shear force of the shear pin P.

In addition, the member connection structure may be used not only for the connection between the inner column 51 and the inner column bracket 4, but also for the connection between the other members. For example, the member connection structure may be used for the connection between the vehicle body side member 13 and the outer column bracket 52. The member connection structure is a separation member connecting member connection structure which connects members so that one member (the first fixed member) is separated from the other member (the second fixed member) in the event of the secondary collision. Further, in a state before the inner pin Pi is inserted into the outer pin Po in the fifth embodiment, the separation preventing portion Po2 is projected outward in the radial direction of the guide hole Poh in relation to the outer wall of the main body portion Po1, but may be projected inward in the radial direction of the guide hole Poh in relation to the inner wall of the main body portion Po1 as in the third modified example of the fifth embodiment.

First Modified Example of Fifth Embodiment

Figure 37:
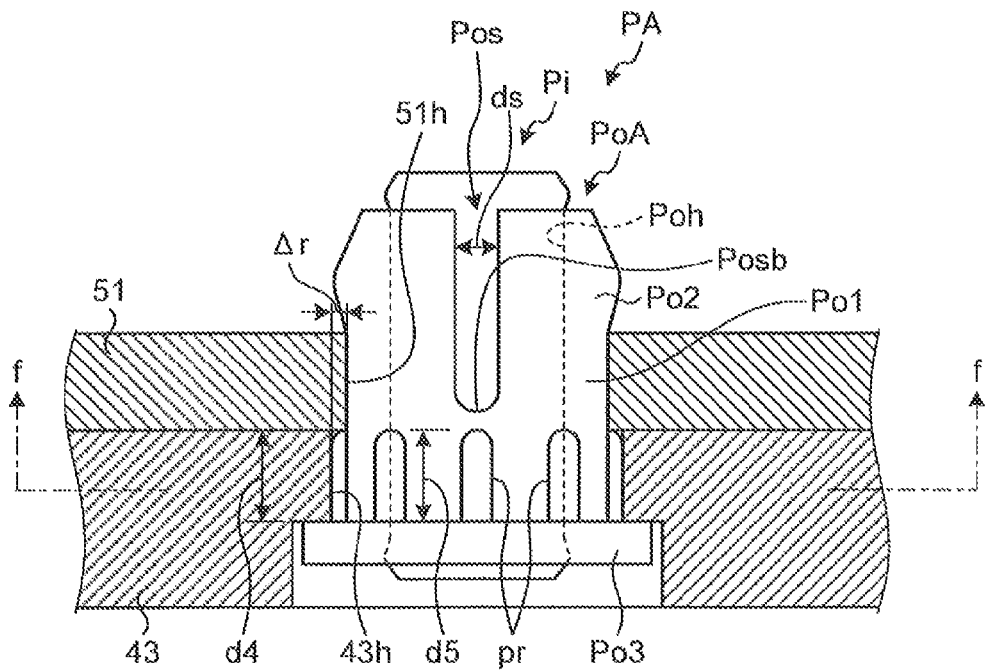
FIG. 37 is an enlarged diagram illustrating the periphery of a shear pin according to a first modified example of the fifth embodiment while illustrating only the shear pin as a side view.
Figure 38:
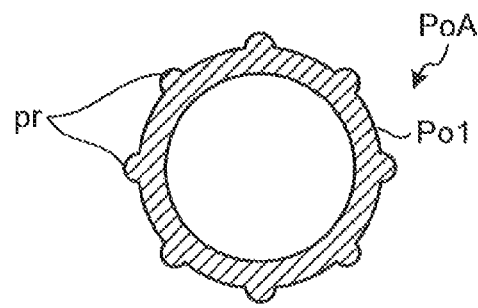
FIG. 38 is a cross-sectional view taken along the line f-f of FIG. 37.

FIG. 37 is an enlarged diagram illustrating the periphery of the shear pin according to the first modified example of the fifth embodiment while illustrating only the shear pin as a side view. FIG. 38 is a cross-sectional view taken along the line f-f of FIG. 37. The first modified example of the fifth embodiment is different from the fifth embodiment in that an outer pin PoA different from the outer pin Po according to the fifth embodiment is provided. In addition, the same reference signs will be given to the same components as those of the above-described embodiments, and the repetitive description thereof will not be presented.

As illustrated in FIG. 37, the outer pin PoA according to the first modified example of the fifth embodiment includes a protrusion pr in the outer wall of the main body portion Po1. The protrusion pr protrudes outward in the radial direction of the guide hole Poh. The protrusion pr is an elastically deformable member, and is formed of, for example, rubber. The protrusion pr is formed in, for example, a line shape from the flange portion Po3 toward the separation preventing portion Po2. As illustrated in FIG. 38, the outer pin PoA includes eight protrusions pr. Eight protrusions pr are disposed at the same interval in the circumferential direction of the main body portion Po1. In addition, the number of the protrusions pr of the outer pin PoA may not be eight, but may be seven or less or nine or more.

Even when a gap is formed between the main body portion Po1 and the first hole 51h in a state before the inner pin Pi is inserted into the guide hole Poh, the width ds of the notch Pos increases when the inner pin Pi is inserted into the guide hole Poh, and hence the outer periphery of the portion facing the first hole 51h in the main body portion Po1 increases. For this reason, the gap between the main body portion Po1 and the first hole 51h may be easily filled. On the contrary, when a gap is formed between the main body portion Po1 and the second hole 43h in a state before the inner pin Pi is inserted into the guide hole Poh, the outer periphery of the portion facing the second hole 43h in the main body portion Po1 hardly increases even when the inner pin Pi is inserted into the guide hole Poh. For this reason, there is a possibility that the gap between the main body portion Po1 and the second hole 43h may not be filled.

As illustrated in FIG. 37, when the inner periphery of the second hole 43h is larger than the inner periphery of the first hole 51h within the tolerance range, there is a possibility that a gap Δr may be formed between the main body portion Po1 and the inner wall of the second hole 43h. There is a possibility that the gap Δr may cause the play of the shear pin PA. On the contrary, since the outer pin PoA according to the first modified example of the fifth embodiment includes the protrusion pr which is elastically deformable, the protrusion pr may fill the gap Δr. Accordingly, the protrusion pr may compensate a degree in which the outer periphery of the portion facing the second hole 43h in the main body portion Po1 does not increase easily. For this reason, the steering device 100 according to the first modified example of the fifth embodiment may suppress the play of the shear pin PA.

As illustrated in FIG. 37, it is desirable that the length d5 of the protrusion pr be equal to the depth d4 of the second hole 43h. Accordingly, even when the inner periphery of the second hole 43h is larger than the inner periphery of the first hole 51h within the tolerance range, the gap Δr is filled in the entire length of the depth d4. For this reason, the steering device 100 according to the first modified example of the fifth embodiment may further suppress the play of the shear pin PA. In addition, the length d5 of the protrusion pr may be longer or shorter than the depth d4 of the second hole 43h.

As described above, in the steering device 100 according to the first modified example of the fifth embodiment, the outer pin PoA includes the protrusion pr provided in the outer wall of the main body portion Po1 so as to be elastically deformable. Accordingly, the protrusion pr may fill a gap between the main body portion Po1 and the inner wall of the first hole 51h or a gap between the main body portion Po1 and the inner wall of the second hole 43h. For this reason, the steering device 100 according to the first modified example of the fifth embodiment may suppress the play of the shear pin PA.

Second Modified Example of Fifth Embodiment

Figure 39:
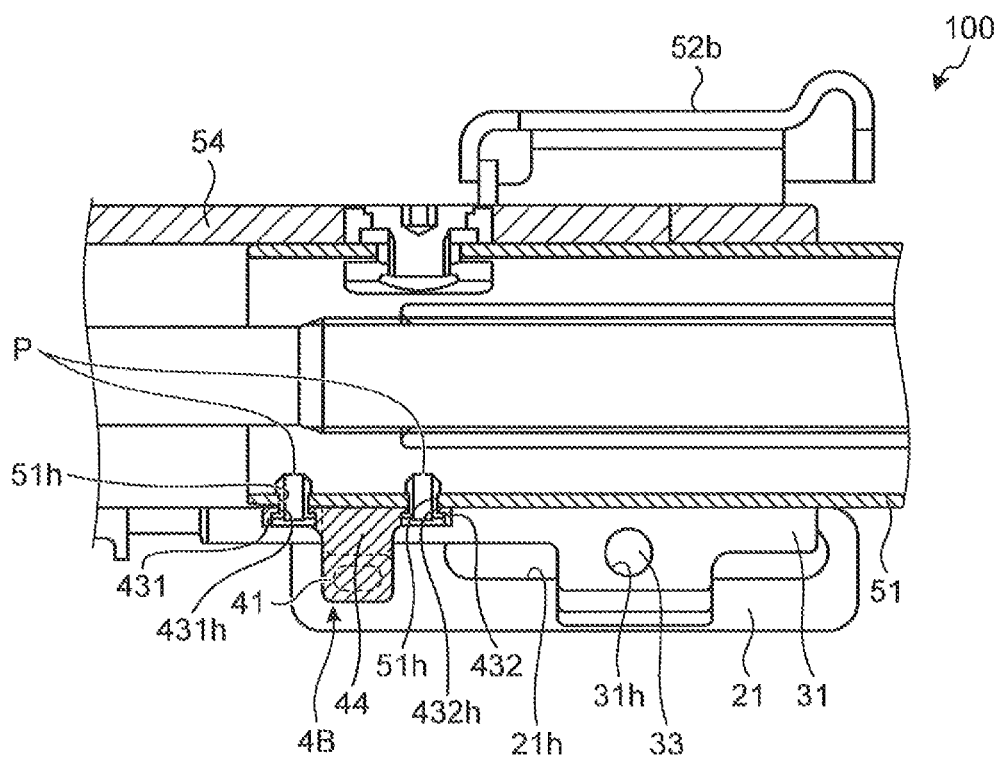
FIG. 39 is a cross-sectional view illustrating a steering device according to a second modified example of the fifth embodiment when taken along the line corresponding to the line e-e of FIG. 26.

FIG. 39 is a cross-sectional view illustrating a steering device according to a second modified example of the fifth embodiment when taken along the line corresponding to the line e-e of FIG. 26. The second modified example of the fifth embodiment is different from the fifth embodiment in that an inner column bracket 4B different from the inner column bracket 4 according to the fifth embodiment is provided.

As illustrated in FIG. 39, the inner column bracket 4B includes a leg portion 431 and a leg portion 432. The leg portion 431 is a plate-shaped portion which is formed forward from the end opposite to the arm portion 41 of the neck portion 44 and contacts the inner column 51. The leg portion 432 is a plate-shaped portion which is formed backward from the end opposite to the arm portion 41 of the neck portion 44 and contacts the inner column 51. The inner column side surfaces of the leg portions 431 and 432 are formed in a shape that follows the shape of the outer wall of the inner column 51. For example, each of the leg portions 431 and 432 includes one circular concave portion 45 in a surface opposite to the surface facing the inner column 51. A second hole 431h is opened in the bottom surface of the concave portion 45 of the leg portion 431. A second hole 432h is opened in the bottom surface of the concave portion 45 of the leg portion 432. The shear pin P is inserted at a position straddling the first hole 51h and the second hole 431h and a position straddling the first hole 51h and the second hole 432h, so that the inner column bracket 4B and the inner column 51 are detachably connected to each other.

The inner column bracket 4B includes second holes 431h and 432h which are provided at the front side and the rear side with respect to the arm portion 41 as the support point of the first telescopic friction plate. Accordingly, the distance values from the arm portion 41 to the second holes 431h and 432h are shortened compared to the case where two second holes 43h are provided at the rear side of the arm portion 41 as in the fifth embodiment. For this reason, even when a load is applied to the first telescopic friction plate and a moment exerted around the axis parallel to the length direction of the arm portion 41 is transmitted to the inner column bracket 4B, the moment applied to the shear pin P may be easily suppressed.

Further, the inner column bracket 4B may increase the distance between the second holes 431h and 432h compared to the case where two second holes 43h are provided at the rear side of the arm portion 41 as in the fifth embodiment. Accordingly, since the rotation of the inner column bracket 4B is suppressed, it is possible to stabilize the posture of the inner column bracket 4B when the shear pin P is cut. For this reason, unevenness in the allowable shear force of the shear pin P may be easily suppressed.

Third Modified Example of Fifth Embodiment

Figure 40:
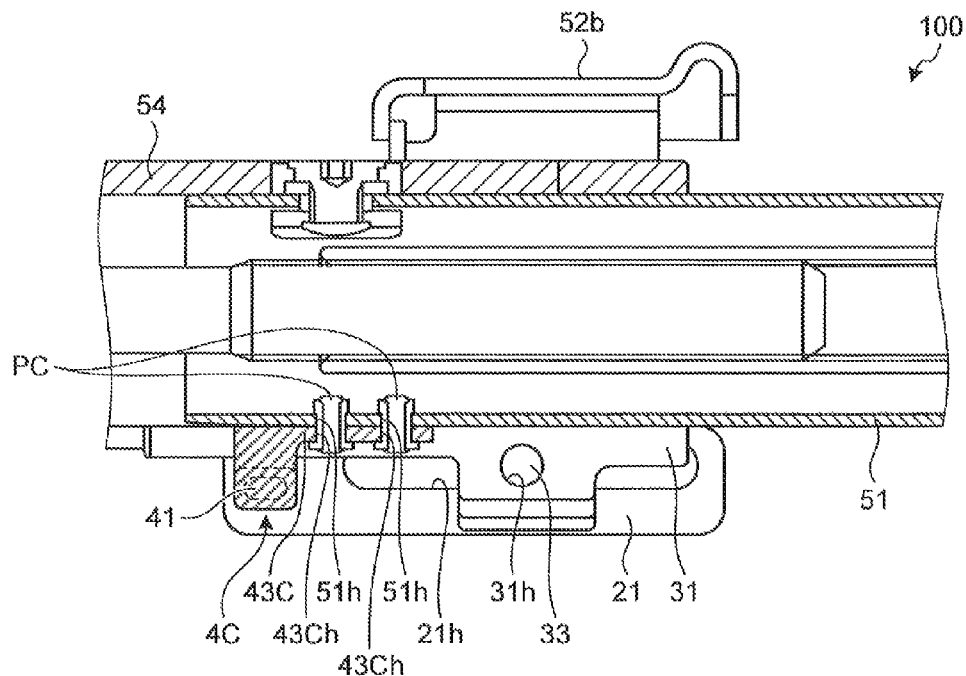
FIG. 40 is a cross-sectional view illustrating a steering device according to a third modified example of the fifth embodiment when taken along the line corresponding to the line e-e of FIG. 26.
Figure 41:
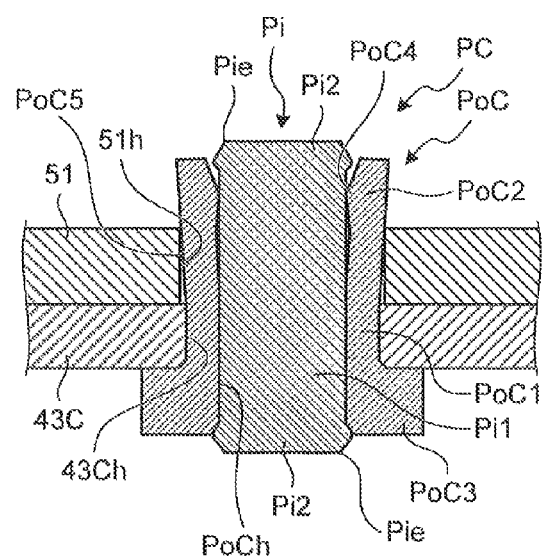
FIG. 41 is an enlarged diagram illustrating the periphery of a shear pin of FIG. 40.
Figure 42:
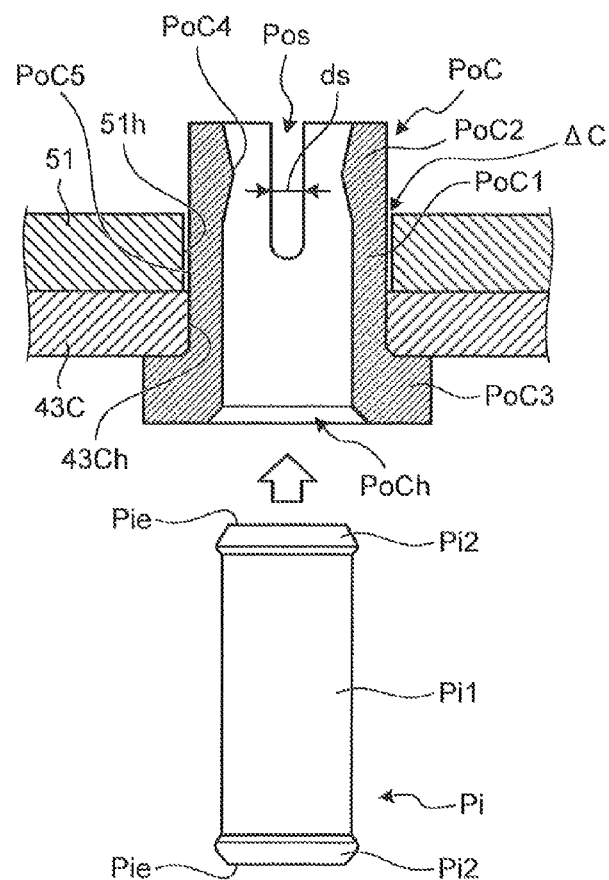
FIG. 42 is a perspective view illustrating the shear pin according to the third modified example of the fifth embodiment in a state before an inner pin is inserted into an outer pin.
Figure 43:
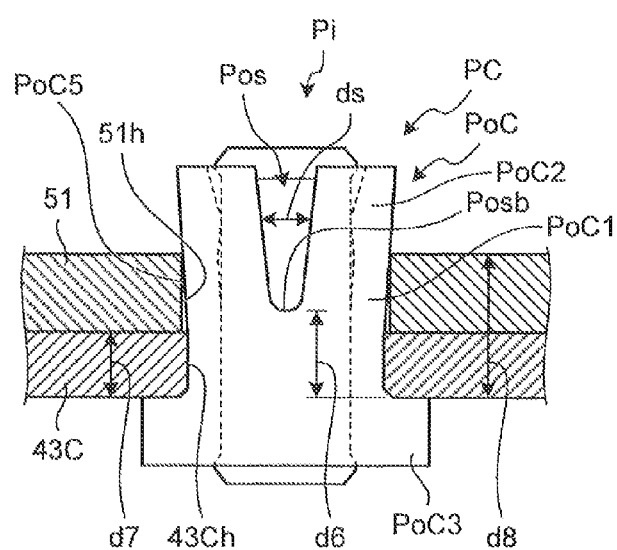
FIG. 43 is an enlarged diagram illustrating the shear pin of FIG. 40 while illustrating only the shear pin as a side view.

FIG. 40 is a cross-sectional view illustrating a steering device according to a third modified example of the fifth embodiment when taken along the line corresponding to the line e-e of FIG. 26. FIG. 41 is an enlarged diagram illustrating the periphery of the shear pin of FIG. 40. FIG. 42 is a perspective view illustrating a shear pin according to the third modified example of the fifth embodiment in a state before an inner pin is inserted into an outer pin. FIG. 43 is an enlarged diagram illustrating the periphery of the shear pin of FIG. 40 while illustrating only the shear pin as a side view. An inner column bracket 4C according to the third modified example of the fifth embodiment includes a leg portion 43C different from the leg portion 43 according to the fifth embodiment. Further, the shear pin PC according to the third modified example of the fifth embodiment includes an outer pin PoC different from the outer pin Po according to the fifth embodiment.

As illustrated in FIG. 40, the leg portion 43C according to the third modified example of the fifth embodiment includes, for example, two second holes 43Ch, but does not include a portion corresponding to the concave portion 45 of the leg portion 43 according to the embodiment. Accordingly, the inner column bracket 4C according to the third modified example of the fifth embodiment may be more easily manufactured since the number of manufacturing steps is smaller than that of the inner column bracket 4 according to the fifth embodiment. Further, as illustrated in FIGS. 41 and 42, the inner periphery of the first hole 51h is formed so as to be larger than the inner periphery of the second hole 43Ch. It is desirable that a difference between the inner periphery of the first hole 51h and the inner periphery of the second hole 43Ch be larger than a predetermined tolerance. With such a configuration, even when a manufacturing error of the first hole 51h and the second hole 43Ch occurs within the tolerance range, it is easy to maintain a state where the inner periphery of the first hole 51h is larger than the inner periphery of the second hole 43Ch.

In addition, the inner column bracket 4C may include a portion corresponding to the concave portion 45 of the leg portion 43 according to the fifth embodiment. With such a configuration, the possibility that the shear pin PC is broken by an external force decreases as described in the fifth embodiment.

As illustrated in FIG. 41, the shear pin PC includes the outer pin PoC and the inner pin Pi. The outer pin PoC is a cylindrical member that is inserted through the first hole 51h and the second hole 43Ch. For example, the outer pin PoC includes a main body portion PoC1, a separation preventing portion PoC2, a flange portion PoC3, and a guide hole PoCh. The main body portion PoC1 is formed in a cylindrical shape, and is inserted through the first hole 51h and the second hole 43Ch. The separation preventing portion PoC2 is provided at one end of the main body portion PoC1, and is located at the inside of the inner column 51. The flange portion PoC3 is provided at the other end of the main body portion PoC1, and is located at the outside in the radial direction of the inner column 51 in relation to the second hole 43Ch. The flange portion Po3 has, for example, a disk shape and has an outer periphery larger than the inner periphery of the second hole 43Ch. Accordingly, since the flange portion PoC3 contacts the surface of the leg portion 43C, it is possible to suppress the outer pin PoC from coming off from the first hole 51h and the second hole 43Ch. The guide hole PoCh is a penetration hole that penetrates an area from the flange portion PoC3 to the separation preventing portion PoC2.

In a state where the outer pin PoC is inserted into the first hole 51h and the second hole 43Ch, the outer peripheries of the main body portion PoC1 and the separation preventing portion PoC2 are constant. For example, the outer peripheries are larger than the inner periphery of the second hole 43Ch and are smaller than the inner periphery of the first hole 51h. Then, the outer pin PoC is inserted into the first hole 51h and the second hole 43Ch by press-inserting. Accordingly, a friction force is generated by the contact between the outer wall of the main body portion PoC1 and the inner wall of the second hole 43Ch, and hence the outer pin PoC is attached to the second hole 43Ch as illustrated in FIG. 42. For this reason, the first hole 51h and the second hole 43Ch are positioned. Further, a gap ΔC is formed between the main body portion PoC1 of the outer pin PoC and the inner wall of the first hole 51h.

The outer pin PoC includes a convex portion PoC4 which is formed in the inner wall of the separation preventing portion PoC2 so as to be projected inward in the radial direction of the guide hole PoCh. For example, the convex portion PoC4 is formed in an annular shape. Accordingly, as illustrated in FIG. 42, in a state before the inner pin Pi is inserted into the outer pin PoC, the inner periphery of the separation preventing portion PoC2 is smaller than the inner periphery of the main body portion PoC1. Further, in a state before the inner pin Pi is inserted into the outer pin PoC, the outer periphery of the body portion Pi1 of the inner pin Pi is substantially equal to the inner periphery of the main body portion PoC1 or is larger than the inner periphery of the main body portion PoC1. The inner pin Pi is inserted into the guide hole PoCh by press-inserting. When the inner pin Pi is inserted into the guide hole PoCh and the inner pin Pi contacts the convex portion PoC4, a force exerted outward in the radial direction is applied to the separation preventing portion PoC2. Accordingly, the width ds of the notch Pos in the circumferential direction of the outer pin PoC is widened. For this reason, as illustrated in FIG. 43, in a state after the inner pin Pi is inserted into the outer pin PoC, the separation preventing portion PoC2 of the outer pin PoC has an outer periphery larger than the inner periphery of the first hole 51h and the inner periphery of the second hole 43Ch. Accordingly, since the separation preventing portion PoC2 contacts the inner wall of the inner column 51, it is possible to suppress the outer pin PoC from coming off from the first hole 51h and the second hole 43Ch.

Since the width ds of the notch Pos in the circumferential direction of the outer pin PoC is widened, the outer periphery of a first hole facing portion PoC5 facing the inner wall of the first hole 51h in the main body portion PoC1 of the outer pin PoC increases. Accordingly, the gap ΔC illustrated in FIG. 42 is filled, and hence at least a part of the first hole facing portion PoC5 contacts the inner wall of the first hole 51h. For this reason, the play of the shear pin PC in the radial direction of the guide hole PoCh is suppressed.

Since the inner periphery of the first hole 51h is larger than the inner periphery of the second hole 43Ch, the outer periphery of the first hole facing portion PoC5 is widened toward the separation preventing portion PoC2 by using the boundary between the first hole 51h and the second hole 43Ch as an origin. Accordingly, as illustrated in FIGS. 41 and 43, the first hole facing portion PoC5 is caught by the edge of the first hole 51h and the edge of the second hole 43Ch. For this reason, the play of the shear pin PC in the axial direction of the guide hole PoCh is suppressed.

Further, when the first hole 51h is opened in the inner column 51, burr is generated in the edge of the first hole 51h located at the inside of the inner column 51. The burr indicates an unnecessary protrusion which is generated in a processing surface during a cutting work, and a process of removing the burr is generally needed. However, in the third modified example of the fifth embodiment, since burr is generated in the edge of the first hole 51h, the first hole facing portion PoC5 is easily caught by the edge of the first hole 51h. For this reason, in the third modified example of the fifth embodiment, there is no need to remove the burr, and the play of the shear pin PC in the axial direction of the guide hole PoCh is easily suppressed due to the existence of the burr.

Further, as illustrated in FIG. 43, it is desirable that the distance d6 from the flange portion PoC3 to the front end Posb of the notch Pos be smaller than the distance d8 from the flange portion Po3 to the inner wall of the inner column 51. Accordingly, since the width ds of the notch Pos may be easily widened in the circumferential direction of the outer pin PoC, the outer periphery of the first hole facing portion PoC5 may be easily widened. For this reason, it is possible to further suppress the play of the shear pin PC in the radial direction of the guide hole PoCh and the play of the shear pin PC in the axial direction of the guide hole PoCh.

Further, as illustrated in FIG. 43, it is desirable that the distance d6 be larger than the distance d7 from the flange portion Po3 to the outer wall of the inner column 51. Accordingly, the notch Pos is not included in the cut surface used for cutting the shear pin PC. For this reason, since a loss portion corresponding to the notch Pos disappears in the cross-section of the main body portion PoC1 at the cut surface, unevenness in the allowable shear force of the shear pin PC is suppressed. Here, the cut surface used for cutting the shear pin PC is a portion which corresponds to the cut surface BK illustrated in FIG. 33.

As described above, in the steering device 100 according to the third modified example of the fifth embodiment, the inner periphery of the first hole 51h is larger than the inner periphery of the second hole 43Ch. Further, the outer pin PoC includes the convex portion PoC4 which is formed in the inner wall of the separation preventing portion PoC2 so as to be projected inward in the radial direction of the guide hole PoCh. Accordingly, since the inner pin Pi presses the convex portion PoC4 outward in the radial direction of the guide hole PoCh, the width ds of the notch Pos in the circumferential direction of the outer pin PoC is widened. Accordingly, at least a part of the main body portion PoC1 of the outer pin PoC contacts the inner wall of the first hole 51h. For this reason, the play of the shear pin PC in the radial direction of the guide hole PoCh is suppressed. Further, since the inner periphery of the first hole 51h is larger than the inner periphery of the second hole 43Ch, the outer periphery of the main body portion PoC1 of the outer pin PoC is widened toward the separation preventing portion PoC2 by using the boundary between the first hole 51h and the second hole 43Ch as an origin. Accordingly, the main body portion PoC1 of the outer pin PoC is caught by the edge of the first hole 51h and the edge of the second hole 43Ch. For this reason, the play of the shear pin PC in the axial direction of the guide hole PoCh is also suppressed. Thus, the steering device 100 according to the third modified example of the fifth embodiment may suppress both the play of the shear pin PC in the radial direction of the guide hole PoCh and the play of the shear pin PC in the axial direction of the guide hole PoCh.

Further, in the steering device 100 according to the third modified example of the fifth embodiment, the outer pin PoC includes the flange portion PoC3 which is provided at the other end of the main body portion PoC1 and has an outer periphery larger than the inner periphery of the first hole 51h and the inner periphery of the second hole 43Ch. The distance d6 from the flange portion PoC3 to the front end Posb of the notch Pos is smaller than the distance d8 from the flange portion PoC3 to the inner wall of the inner column 51. Accordingly, since the width ds of the notch Pos in the circumferential direction of the outer pin PoC is more easily widened, the outer periphery of the main body portion PoC1 of the outer pin PoC is easily widened. For this reason, it is possible to further suppress the play of the shear pin PC in the radial direction of the guide hole PoCh and the play of the shear pin PC in the axial direction of the guide hole PoCh.

Sixth Embodiment

Figure 44:
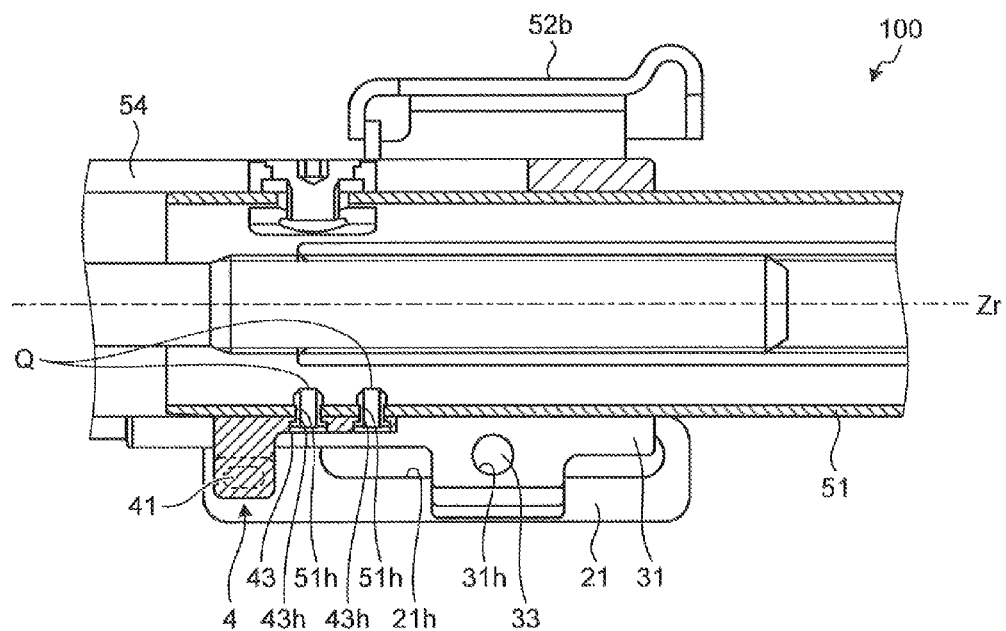
FIG. 44 is a cross-sectional view illustrating a steering device according to a sixth embodiment when taken along the line corresponding to the line e-e of FIG. 26.
Figure 45:
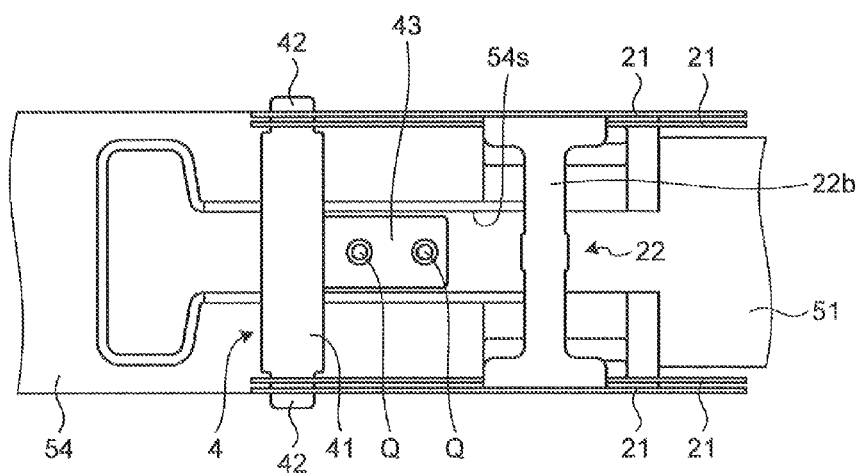
FIG. 45 is a diagram illustrating a bottom surface of the steering device according to the sixth embodiment.

FIG. 44 is a cross-sectional view illustrating a steering device according to a sixth embodiment when taking along the line corresponding to the line e-e of FIG. 26. FIG. 45 is a diagram illustrating the bottom surface of the steering device according to the sixth embodiment. In addition, the same reference signs will be given to the same components as those of the above-described embodiments, and the repetitive description thereof will not be presented.

In order to detachably connect the inner column bracket 4 and the inner column 51 to each other, as illustrated in FIG. 44, the first hole 51h is opened in the inner column 51 and the second hole 43h is opened in the bottom surface of the concave portion 45 of the leg portion 43. The first hole 51h and the second hole 43h communicate with each other. For example, in the sixth embodiment, each of the first hole 51h and the second hole 43h is provided at two positions and has the same inner periphery. A shear pin Q is inserted at a position straddling the first hole 51h and the second hole 43h, so that the inner column bracket 4 and the inner column 51 are detachably connected to each other. Further, the first hole 51h and the second hole 43h are disposed at a position where the distance values from the first telescopic friction plates 21 disposed at both sides of the outer column 54 are equal to each other.

Figure 46:
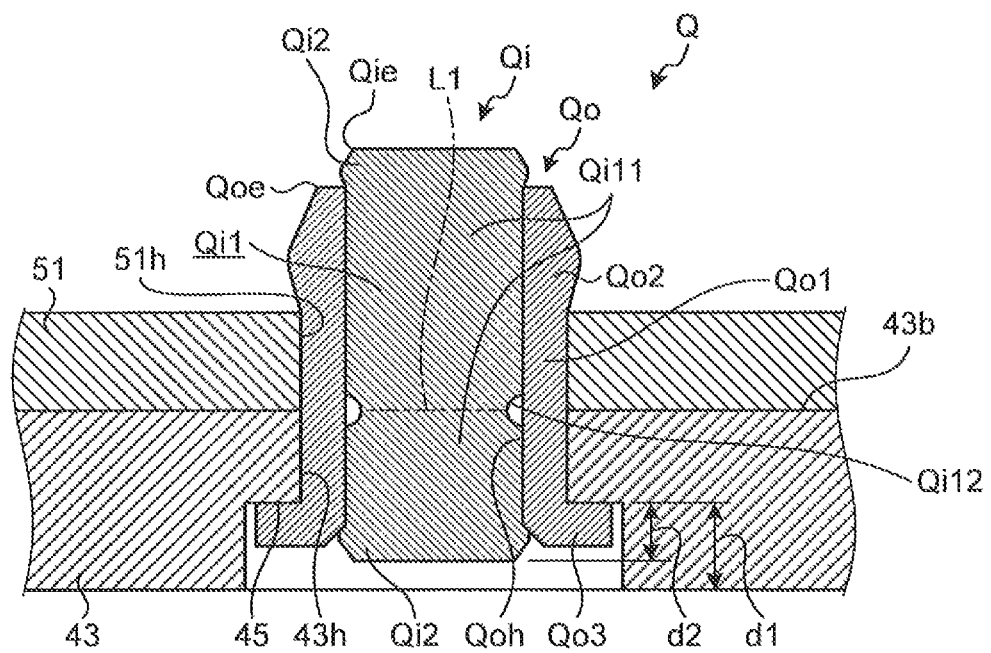
FIG. 46 is an enlarged diagram illustrating the periphery of a shear pin of FIG. 44.
Figure 47:
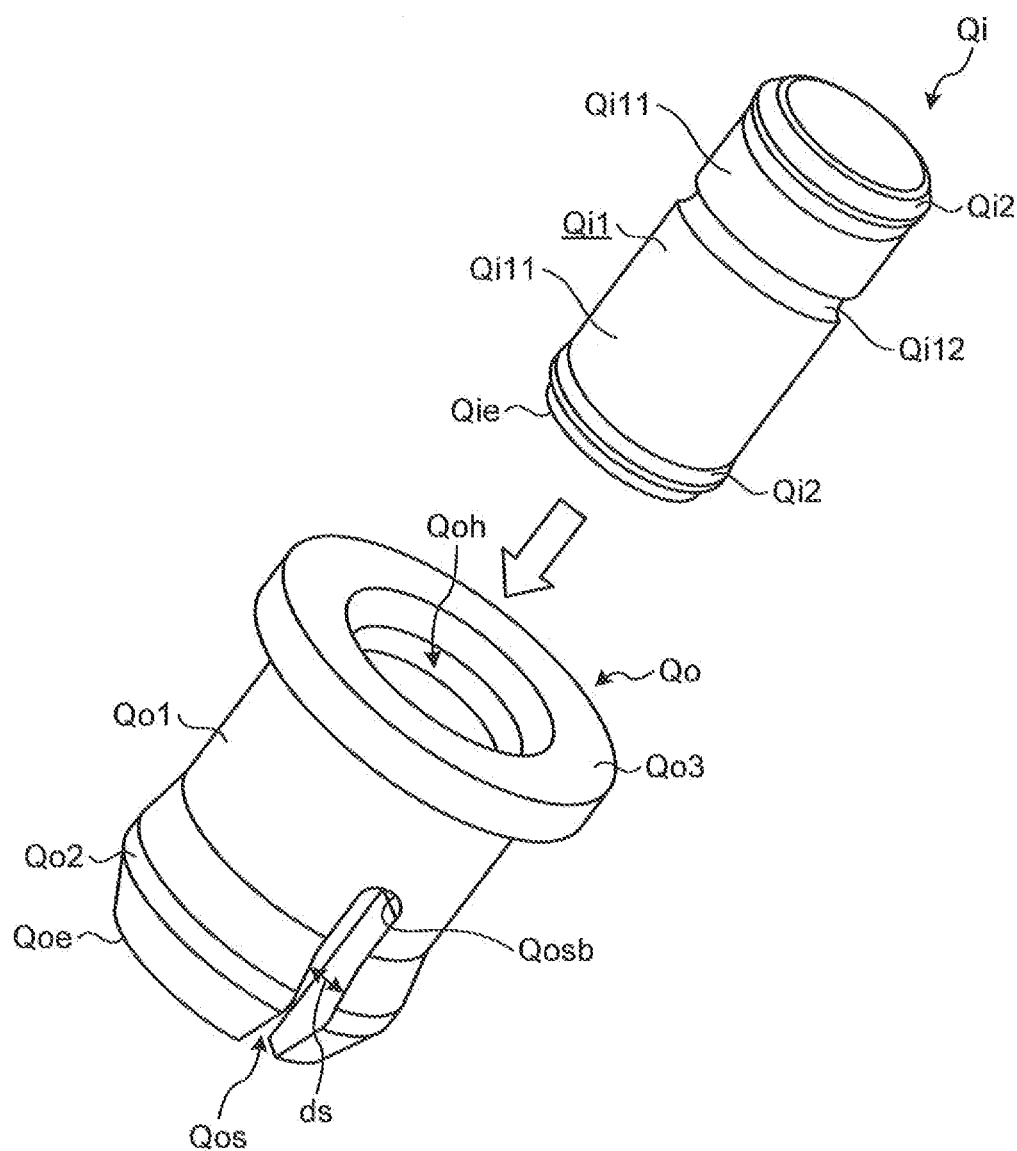
FIG. 47 is a perspective view illustrating the shear pin in a state before an inner pin according to the sixth embodiment is inserted into an outer pin.
Figure 48:
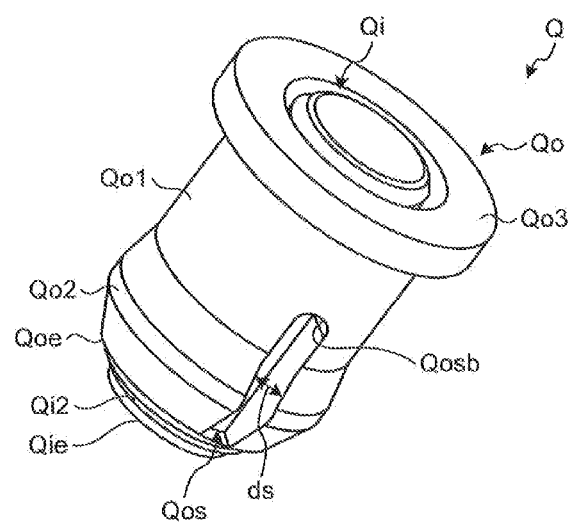
FIG. 48 is a perspective view illustrating the shear pin in a state after the inner pin according to the sixth embodiment is inserted into the outer pin.

FIG. 46 is an enlarged diagram illustrating the periphery of the shear pin of FIG. 44. FIG. 47 is a perspective view illustrating the shear pin in a state before an inner pin according to the sixth embodiment is inserted into an outer pin. FIG. 48 is a perspective view illustrating the shear pin in a state after the inner pin according to the sixth embodiment is inserted into the outer pin. In the sixth embodiment, the shear pin Q includes an outer pin Qo and an inner pin Qi. The outer pin Qo and the inner pin Qi are formed of, for example, a resin such as polyacetal.

As illustrated in FIG. 46, the outer pin Qo is a cylindrical member that is inserted through the first hole 51h and the second hole 43h. The outer pin Qo includes, for example, a main body portion Qo1, a separation preventing portion Qo2, an outer flange portion Qo3, and a guide hole Qoh. As illustrated in FIGS. 46 and 47, the main body portion Qo1 has a cylindrical shape, and is inserted through the first hole 51h and the second hole 43h. The separation preventing portion Qo2 is provided at one end of the main body portion Qo1 and is located at the inside of the inner column 51. The separation preventing portion Qo2 has a cylindrical shape and has an outer periphery larger than the inner periphery of the first hole 51h and the inner periphery of the second hole 43h. Accordingly, since the separation preventing portion Qo2 contacts the inner wall of the inner column 51, the outer pin Qo does not easily come off from the first hole 51h and the second hole 43h. The outer flange portion Qo3 is provided at the other end of the main body portion Qo1 and is located at the outside of the second hole 43h in the radial direction of the inner column 51. The outer flange portion Qo3 has, for example, a disk shape and has an outer periphery larger than the inner periphery of the first hole 51h and the inner periphery of the second hole 43h. Accordingly, since the outer flange portion Qo3 contacts the bottom surface of the concave portion 45, the outer pin Qo does not easily come off from the first hole 51h and the second hole 43h. The guide hole Qoh is a penetration hole which penetrates an area from the outer flange portion Qo3 to the separation preventing portion Qo2.

In the sixth embodiment, the outer pin Qo is inserted into the first hole 51h and the second hole 43h by press-inserting. Since the outer pin Qo is inserted through the first hole 51h and the second hole 43h, the first hole 51h and the second hole 43h are positioned. For example, the separation preventing portion Qo2 is inserted from the second hole 43h into the first hole 51h and the second hole 43h. The separation preventing portion Qo2 is formed so that the outer periphery at the end Qoe opposite to the main body portion Qo1 is smaller than the inner periphery of the first hole 51h and the inner periphery of the second hole 43h. Accordingly, the separation preventing portion Qo2 may be easily inserted into the second hole 43h.

In addition, the outer pin Qo may be inserted from the first hole 51h into the first hole 51h and the second hole 43h. Further, the outer pin Qo may be press-inserted after a rib or the like is formed on the outer wall of the main body portion Qo1.

As illustrated in FIGS. 47 and 48, the outer pin Qo includes one notch Qos which is formed from the separation preventing portion Qo2 toward the outer flange portion Qo3. When the separation preventing portion Qo2 is inserted into the second hole 43h, the width ds of the notch Qos in the circumferential direction of the outer pin Qo decreases, and hence the outer periphery of the separation preventing portion Qo2 decreases. Accordingly, the separation preventing portion Qo2 may be easily inserted through the first hole 51h and the second hole 43h. In the description below, the width ds of the notch Qos in the circumferential direction of the outer pin Qo will be simply referred to as the width ds of the notch Qos.

In addition, the outer pin Qo may include a plurality of notches Qos. When a plurality of notches Qos is provided, it is desirable that the plurality of notches Qos be disposed at the same interval in the circumferential direction of the outer pin Qo.

In a state before the outer pin Qo is inserted through the first hole 51h and the second hole 43h, the outer periphery of the main body portion Qo1 is larger than the inner periphery of the first hole 51h and the inner periphery of the second hole 43h. Then, in a state where the outer pin Qo is inserted through the first hole 51h and the second hole 43h, the outer periphery of the main body portion Qo1 is the same as the inner periphery of the first hole 51h and the inner periphery of the second hole 43h due to the elastic deformation of the main body portion Qo1. Accordingly, the main body portion Qo1 presses the inner wall of the first hole 51h and the inner wall of the second hole 43h. For this reason, a gap is not easily formed between the main body portion Qo1 and the inner wall of the first hole 51h and a gap is not easily formed between the main body portion Qo1 and the inner wall of the second hole 43h. Accordingly, the play of the outer pin Qo is suppressed.

The inner pin Qi is a member that is inserted into the guide hole Qoh of the outer pin Qo. In the description below, the outside in the radial direction of the guide hole Qoh will be simply referred to as the outside in the radial direction. The inner pin Qi includes, for example, a body portion Qi1 and a protrusion portion Qi2. As illustrated in FIGS. 46 to 48, the body portion Qi1 substantially has a columnar shape as a whole, and is inserted through the guide hole Qoh. The body portion Qi1 includes a first large diameter portion Qi11 and a first small diameter portion Qi12. The first large diameter portion Qi11 has, for example, a columnar shape and has the same outer periphery as the inner periphery of the guide hole Qoh. The first small diameter portion Qi12 is provided at a position straddling the first hole 51h and the second hole 43h. The first small diameter portion Qi12 has, for example, a shape of a rotation body concentric with the first large diameter portion Qi11. The outer periphery of the first small diameter portion Qi12 is smaller than the outer periphery of the first large diameter portion Qi11. For example, as illustrated in FIG. 47, the first small diameter portion Qi12 is formed by notching a part of the entire circumference of the body portion Qi1 in the circumferential direction. That is, the first small diameter portion Qi12 is a groove which is formed by depressing the surface of the body portion Qi1 in the circumferential direction. For example, the bottom portion of the surface of the first small diameter portion Qi12 is formed in a curved surface shape. That is, the surface of the first small diameter portion Qi12 depicts a circular-arc in the cross-section (the cross-section illustrated in FIG. 46) obtained by cutting the inner pin Qi along a plane including the rotation axis Zr. More specifically, the surface of the first small diameter portion Qi12 depicts a semi-circle. For example, in the cross-section illustrated in FIG. 46, the line L1 that passes through a portion having a maximum outer periphery in the first small diameter portion Qi12 is located on the extension line of the outer wall of the inner column 51, that is, the extension line of the inner column side surface 43b of the leg portion 43. The protrusion portions Qi2 are provided at both ends of the body portion Qi1 and each of which are located at the outside of the guide hole Qoh. The protrusion portion Qi2 has an outer periphery larger than the inner periphery of the guide hole Qoh. Accordingly, since the protrusion portion Qi2 contacts the edges of both ends of the guide hole Qoh, the inner pin Qi does not easily come off from the outer pin Qo. Further, since the inner pin Qi is positioned, the first small diameter portion Qi12 is not easily deviated from a position straddling the first hole 51h and the second hole 43h.

In addition, both ends of the guide hole Qoh may be provided with a stepped portion formed by enlarging the inner periphery thereof. In this case, since the protrusion portion Qi2 contacts the edge of the stepped portion, the inner pin Qi is not easily projected from both ends of the guide hole Qoh.

In the sixth embodiment, the inner pin Qi is inserted into the guide hole Qoh by press-inserting. For example, the protrusion portion Qi2 is inserted from the outer flange portion Qo3 into the guide hole Qoh. The protrusion portion Qi2 is formed so that the outer periphery at the end Qie opposite to the body portion Qi1 is smaller than the inner periphery of the outer pin Qo. Accordingly, the protrusion portion Qi2 may be easily inserted into the guide hole Qoh. Further, since both ends of the inner pin Qi are provided with the same protrusion portion Qi2, the inner pin may be inserted from any end into the guide hole Qoh. Accordingly, the shear pin Q may be easily assembled.

In a state before the inner pin Qi is inserted into the guide hole Qoh, the outer periphery of the first large diameter portion Qi11 is larger than the inner periphery of the guide hole Qoh. Then, in a state where the body portion Qi1 is inserted through the guide hole Qoh, the first large diameter portion Qi11 is elastically deformed, and hence the outer periphery of the first large diameter portion Qi11 is the same as the inner periphery of the guide hole Qoh. Accordingly, the first large diameter portion Qi11 presses the inner wall of the guide hole Qoh outward in the radial direction. For this reason, a gap is not easily formed between the body portion Qi1 and the inner wall of the guide hole Qoh. Accordingly, the play of the inner pin Qi is suppressed.

Since the first large diameter portion Qi11 presses the inner wall of the guide hole Qoh outward in the radial direction, a force of widening the width ds of the notch Qos is applied to the outer pin Qo. Accordingly, a friction force generated in the outer pin Qo, the inner wall of the first hole 51h, and the inner wall of the second hole 43h increases. Further, since the width ds of the notch Qos of the separation preventing portion Qo2 increases, the outer periphery of the separation preventing portion Qo2 increases. For this reason, the shear pin Q obtained by integrating the outer pin Qo and the inner pin Qi is fixed at a position straddling the first hole 51h and the second hole 43h, and hence the inner column 51 and the inner column bracket 4 are connected to each other.

Since the steering device 100 is assembled in a manner such that the first hole 51h and the second hole 43h are positioned by the outer pin Qo and the inner pin Qi is inserted thereinto, the steering device may be easily assembled.

Further, since the steering device 100 according to the sixth embodiment uses the shear pin Q for the first hole 51h and the second hole 43h, there is no need to provide a device that charges a resinous member and a member that receives the resinous member compared to the case where the resinous member is charged into the first hole 51h and the second hole 43h. For this reason, the steering device 100 according to the sixth embodiment may be easily assembled.

When an excessive load is applied to the steering wheel 81, the load is transmitted to the inner column 51 through the input shaft 82a, and hence the inner column 51 is moved forward. Meanwhile, the inner column bracket 4 which is supported by the first telescopic friction plate 21 does not move. For this reason, since a shear force is applied to the shear pin Q, the shear pin Q is cut when the load exceeds the allowable shear force of the shear pin Q. When the shear pin Q is cut, the connection between the inner column 51 and the inner column bracket 4 is released. When the connection between the inner column 51 and the inner column bracket 4 is released, the inner column 51 is supported in the axial direction by a friction force generated between the inner column 51 and the outer column 54. Thus, when an excessive load is applied to the steering wheel due to the collision of the operator with respect to the steering wheel 81, a force for moving the inner column 51 decreases immediately after the excessive load is applied to the steering wheel, and hence impact is absorbed.

Further, even when the shear pin Q is cut, the outer column 54 is supported by the outer column bracket 52 fixed to the vehicle body side member 13. Further, the inner column 51 is supported by the outer column 54. For this reason, even when the shear pin Q is cut, the steering column 50 is not dropped.

Figure 49:
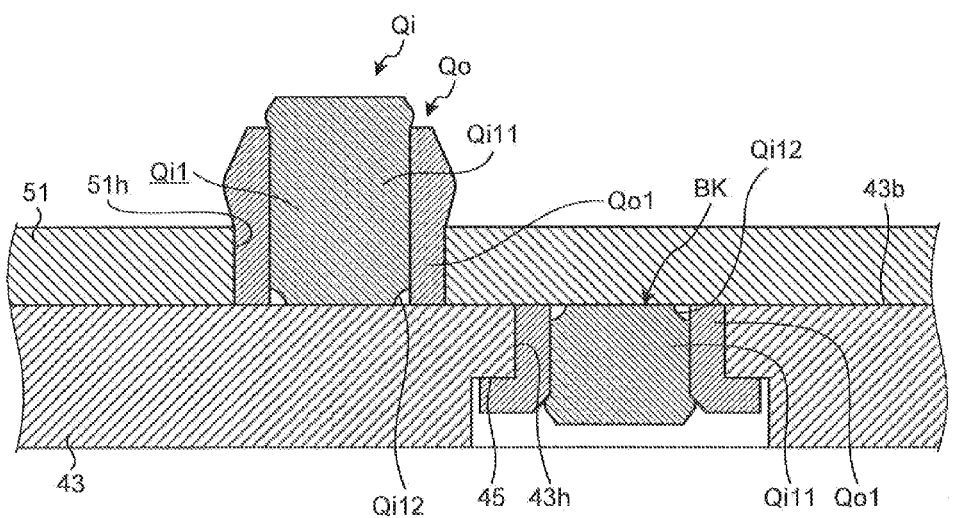
FIG. 49 is a diagram illustrating the cut shear pin.

FIG. 49 is a diagram illustrating a state where the shear pin is cut. As illustrated in FIG. 49, the shear pin Q is cut at a cut surface BK. The cut surface BK is generated in a portion straddling the first hole 51h and the second hole 43h in the shear pin Q. In the cross-section (the cross-section illustrated in FIG. 49) obtained by cutting the inner pin Qi along a plane including the rotation axis Zr, the cut surface BK is located on the extension line of the outer wall of the inner column 51, that is, the extension line of the inner column side surface 43b of the leg portion 43.

The allowable shear force of the shear pin Q depends on the cross-sectional area of the cut surface BK. Since the outer periphery of the first small diameter portion Qi12 is smaller than the outer periphery of the first large diameter portion Qi11, stress concentration occurs when a shear force is applied to the inner pin Qi, and hence a crack easily occurs in the first small diameter portion Qi12. Accordingly, the inner pin Qi is easily cut at the first small diameter portion Qi12, that is, the cut surface BK of the inner pin Qi is easily included in the first small diameter portion Qi12. For this reason, the area of the cut surface BK in the inner pin Qi does not easily change. Thus, the allowable shear force of the shear pin Q is stabilized.

Further, since the bottom portion of the surface of the first small diameter portion Qi12 is formed in a curved surface shape as described above, the first small diameter portion Qi12 may be easily processed compared to the case where the bottom portion of the surface of the first small diameter portion Qi12 is sharp. For this reason, the processing precision for the first small diameter portion Qi12 according to the sixth embodiment may be improved.

Figure 50:
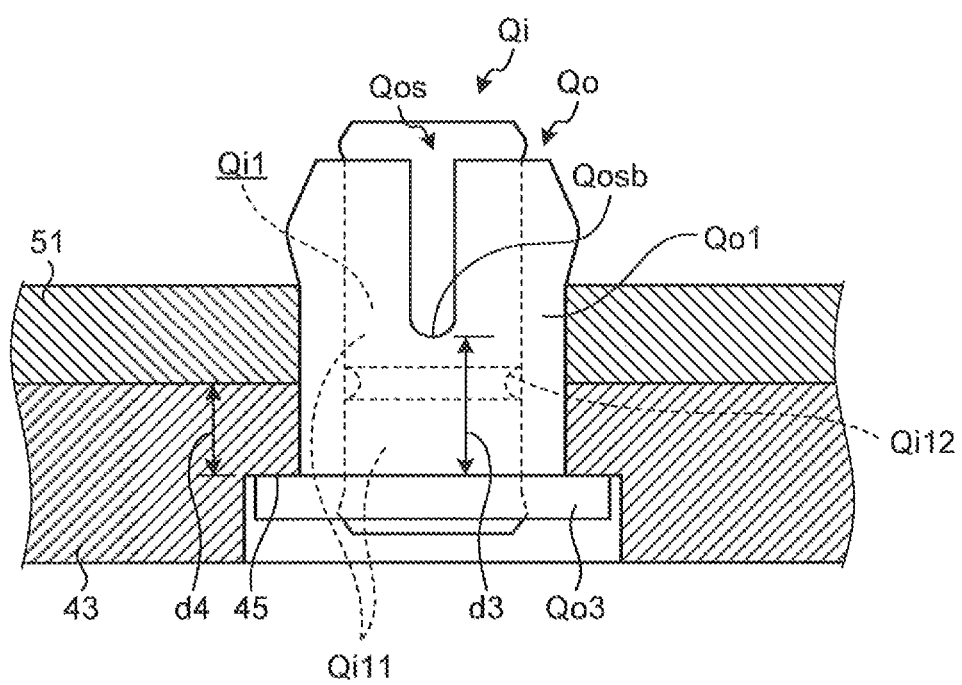
FIG. 50 is an enlarged diagram illustrating the periphery of the shear pin of FIG. 44 while illustrating only the shear pin as a side view.

FIG. 50 is an enlarged diagram illustrating the periphery of the shear pin of FIG. 44 while illustrating only the shear pin as a side view. As illustrated in FIG. 50, it is desirable that the distance d3 from the outer flange portion Qo3 to the front end Qosb of the notch Qos be larger than the distance d4 from the outer flange portion Qo3 to the outer wall of the inner column 51. Accordingly, the notch Qos is not included in the cut surface BK used for cutting the shear pin Q. For this reason, since a loss portion corresponding to the notch Qos in the cross-section of the main body portion Qo1 in the cut surface BK disappears, unevenness in the allowable shear force of the shear pin Q is suppressed.

Further, it is desirable that the inner column 51 move straightly in the axial direction after the shear pin Q is cut. When the movement direction of the inner column 51 forms an angle with respect to the axial direction of the outer column 54, the possibility that the movement of the inner column 51 is disturbed or the possibility that a friction force generated between the inner column 51 and the outer column 54 becomes larger than a predetermined value increases.

In the sixth embodiment, as illustrated in FIG. 45, the inner column bracket 4 is bonded to the first telescopic friction plates 21 disposed at both sides of the outer column 54. Accordingly, when an axial load is applied to the inner column bracket 4, a tightening force is applied to the inner column bracket 4 from both sides of the outer column 54. For this reason, it is possible to stabilize the posture of the inner column bracket 4 when the shear pin Q is cut. Thus, the posture of the inner column 51 when the inner column starts to move may be easily maintained so as to be straight in the axial direction. Thus, the inner column 51 moves easily straightly in the axial direction.

Further, as illustrated in FIGS. 44 and 45, each of the first hole 51h and the second hole 43h is provided at two different positions in the axial direction. For this reason, the shear pin Q is disposed at two positions in the axial direction. If each of the first hole 51h and the second hole 43h is provided at one position, that is, the shear pin Q is disposed at one position, there is a possibility that the inner column bracket 4 may rotate about the shear pin Q. On the contrary, in the sixth embodiment, since the shear pin Q is disposed at two different positions in the axial direction, the rotation of the inner column bracket 4 is suppressed. For this reason, it is possible to further stabilize the posture of the inner column bracket 4 when the shear pin Q is cut.

Further, the first hole 51$h$ and the second hole 43$h$ are disposed at a position where the distance values from the first telescopic friction plates 21 disposed at both sides with the inner column bracket 4 interposed therebetween are equal to each other. Accordingly, when an axial load is applied to the inner column bracket 4, a more stable tightening force is applied from both sides of the outer column 54 to the inner column bracket 4. Accordingly, it is possible to stabilize the posture of the inner column bracket 4 when the shear pin Q is cut. Thus, it is possible to easily maintain the posture in which the inner column 51 starts to move so as to be straighter in the axial direction. Thus, the inner column 51 may move more straightly in the axial direction.

Further, even when the inner column bracket 4 may not receive a stable tightening force from both sides of the outer column 54, since the leg portion 43 of the inner column bracket 4 is fitted into the slit so as to face the inner wall of the slit 54$s$, the inner column bracket 4 is guided by the slit 54$s$. Accordingly, it is possible to stabilize the posture of the inner column bracket 4 when the shear pin Q is cut.

Further, as illustrated in FIG. 46, it is desirable that the depth d1 of the concave portion 45 be equal to or larger than the length d2 of the portion projected from the second hole 43$h$ in the shear pin Q. Accordingly, the shear pin Q is not projected from the surface of the inner column bracket 4. For this reason, the possibility that the shear pin Q may be broken by an external force decreases.

In addition, the allowable shear force of the shear pin Q may be adjusted by changing the number of the first holes 51$h$ and the second holes 43$h$, the cross-sectional areas of the first hole 51$h$ and the second hole 43$h$, and the material of the shear pin Q. For example, each of the first hole 51$h$ and the second hole 43$h$ may be provided at one position or three or more positions. Further, the shear pin Q may be formed of, for example, metal including non-ferrous metal or rubber.

A diagram illustrating a relation between a displacement amount of a steering column and a load necessary to move the steering column of the sixth embodiment is the same as FIG. 36.

In the sixth embodiment, the inner column 51 is supported in the axial direction by a first friction force, which is generated between the inner column and the outer column 54 by the tightening of the outer column bracket 52, and a second friction force, which is generated between the first telescopic friction plate 21 and the member (the outer column bracket 52, the second telescopic friction plate 22, and the outer column 54) contacting the first telescopic friction plate 21. The force F1 illustrated in FIG. 36 indicates the first friction force, and the force F3 indicates the sum of the first friction force and the second friction force. Further, the force F2 illustrated in FIG. 36 indicates the allowable shear force of the shear pin Q. The force F2 is smaller than the force F3 and is larger than the force F1.

In the sixth embodiment, when a load of the force F2 or more is applied to the inner column 51, the shear pin Q is cut and the inner column 51 is separated from the inner column bracket 4. Accordingly, since the connection between the inner column 51 and the first telescopic friction plate 21 is released, the second friction force is not applied to the inner column 51. For this reason, after the shear pin Q is cut, the inner column 51 moves in the axial direction while absorbing an impact by the first friction force. In the steering device 100 according to the sixth embodiment, when the first friction force is set to be small, the inner column 51 moves smoothly, and hence the operator may be easily protected from the secondary collision.

In the sixth embodiment, even when the setting value of the first friction force is small, the second friction force may compensate a degree in which the first friction force decreases among the force supporting the inner column 51 in the axial direction. For this reason, since the steering device 100 according to the sixth embodiment adjusts the setting value of the first friction force and the setting value of the second friction force, it is possible to suppress the inner column 51 from moving by the load applied in normal use and to more easily protect the operator from the secondary collision.

As described above, the steering device 100 according to the sixth embodiment includes the cylindrical inner column 51 which rotatably supports the input shaft 82$a$ connected to the steering wheel 81 and has the first hole 51$h$ opened therein and the outer column 54 which is formed in a cylindrical shape for inserting at least a part of the inner column 51 thereinto and has the slit 54$s$ formed by notching one insertion end of the inner column 51. Further, the steering device 100 includes the outer column bracket 52 which is fixed to the vehicle body side member 13 so as to support the outer column 54 and tightens the outer column 54 along with the telescopic friction plate (the first telescopic friction plate 21) as the plate material. Further, the steering device 100 includes the inner column bracket 4 which is supported by the telescopic friction plate (the first telescopic friction plate 21) and in which the second hole 43$h$ is opened. Further, the steering device 100 includes the shear pin Q which detachably connects the inner column 51 and the inner column bracket 4 to each other at a position straddling the first hole 51$h$ and the second hole 43$h$. The shear pin Q includes the outer pin Qo which is a cylindrical member having the guide hole Qoh penetrating an area from one end to the other end thereof and is inserted through the first hole 51$h$ and the second hole 43$h$ and the inner pin Qi which is inserted into the guide hole Qoh. The inner pin Qi includes the body portion Qi1 which is inserted through the guide hole Qoh. The body portion Qi1 includes the first large diameter portion Qi11 which presses the inner wall of the guide hole Qoh outward in the radial direction of the guide hole Qoh and the first small diameter portion Qi12 which is disposed at a position straddling the first hole 51$h$ and the second hole 43$h$ and has an outer periphery smaller than the outer periphery of the first large diameter portion Qi11.

Accordingly, in the steering device 100 according to the sixth embodiment, when an excessive load is applied to the steering wheel 81, the load is transmitted to the inner column 51 through the input shaft 82$a$, and hence the inner column 51 is moved forward. Meanwhile, the inner column bracket 4 which is supported by the first telescopic friction plate 21 does not move. For this reason, since a shear force is applied to the shear pin Q, the shear pin Q is cut when the load exceeds the allowable shear force of the shear pin Q. When the shear pin Q is cut, the connection between the inner column 51 and the inner column bracket 4 is released. When the connection between the inner column 51 and the inner column bracket 4 is released, the inner column 51 is supported in the axial direction by a friction force generated between the inner column 51 and the outer column 54. For this reason, the inner column 51 of the steering column 50 may move toward the front side of the vehicle body. Further, even when the shear pin Q is cut, the outer column 54 is supported by the outer column bracket 52 fixed to the vehicle body side member 13. Further, the inner column 51 is supported by the outer column 54. For this reason, even when the shear pin Q is cut, the steering column 50 is not dropped. Thus, the steering device 100 according to the sixth embodiment may suppress a problem in which the steering column 50 is dropped by the erroneous operation even when the setting value (the allowable shear force of the shear pin Q) of the separation load in which the steering column 50 moves toward the front side of the vehicle body is decreased.

Further, the allowable shear force of the shear pin Q depends on the cross-sectional area of the cut surface BK. Since the outer periphery of the first small diameter portion Qi12 is smaller than the outer periphery of the first large diameter portion Qi11, a crack may easily occur in the first small diameter portion Qi12 when a shear force is applied to the inner pin Qi. Accordingly, the inner pin Qi is easily cut at the first small diameter portion Qi12. That is, since stress concentration occurs in a sheared state due to the first small diameter portion Qi12, the cut surface BK of the inner pin Qi is easily included in the first small diameter portion Qi12. For this reason, since unevenness in the position and the area of the cut surface BK in the inner pin Qi hardly occurs, the allowable shear force of the shear pin Q is stabilized. Thus, the steering device 100 according to the sixth embodiment may improve the precision of the setting value (the allowable shear force of the shear pin Q) of the separation load.

In the steering device 100 according to the sixth embodiment, the inner pin Qi is formed so that the protrusion portion Qi2 having an outer periphery larger than the inner periphery of the guide hole Qoh is provided at both ends of the body portion Qi1. Accordingly, since the inner pin Qi is positioned, the first small diameter portion Qi12 is not easily deviated from a position straddling the first hole 51h and the second hole 43h. For this reason, the allowable shear force of the shear pin Q is more stabilized compared to the case where the inner pin Qi does not include the protrusion portion Qi2.

Further, in the steering device 100 according to the sixth embodiment, the inner column bracket 4 includes the concave portion 45 at the surface opposite to the inner column side surface 43b facing the inner column 51. The second hole 43h is opened in a part of the bottom surface of the concave portion 45, and the depth d1 of the concave portion 45 is equal to or larger than the length d2 of the portion projected from the second hole 43h in the shear pin Q. Accordingly, the shear pin Q is not projected from the surface of the inner column bracket 4. For this reason, the steering device 100 may prevent the shear pin Q from being broken by an external force.

Further, in the steering device 100 according to the sixth embodiment, the telescopic friction plate (the first telescopic friction plate 21) is disposed at both sides of the outer column 54. Accordingly, when an axial load is applied to the inner column bracket 4, a tightening force is applied to the inner column bracket 4 from both sides of the outer column 54. For this reason, it is possible to stabilize the posture of the inner column bracket 4 when the shear pin Q is cut. Thus, the posture of the inner column 51 when the inner column starts to move may be easily maintained so as to be straight in the axial direction. Thus, since the inner column 51 may move easily straightly in the axial direction, the steering device 100 may prevent a problem in which the movement of the inner column 51 is disturbed or a problem in which a friction force generated between the inner column 51 and the outer column 54 becomes larger than a predetermined value.

Further, in the steering device 100 according to the sixth embodiment, the telescopic friction plates (the first telescopic friction plates 21), which are disposed at both sides of the outer column 54, face each other with the inner column bracket 4 interposed therebetween, and the first hole 51h and the second hole 43h are disposed at a position where the distance values from the telescopic friction plates (the first telescopic friction plates 21), which face each other with the inner column bracket 4 interposed therebetween, are equal to each other. Accordingly, when an axial load is applied to the inner column bracket 4, since a more stable tightening force is applied from both sides of the outer column 54 to the inner column bracket 4, it is possible to stabilize the posture of the inner column bracket 4 when the shear pin Q is cut. Thus, when the inner column starts to move, the posture of the inner column 51 may be easily maintained so as to be straight in the axial direction. Thus, since the inner column 51 may easily move straightly in the axial direction, the steering device 100 may prevent a problem in which the movement of the inner column 51 is disturbed or a problem in which a friction force generated between the inner column 51 and the outer column 54 becomes larger than a predetermined value.

Further, in the steering device 100 according to the sixth embodiment, the outer column 54 is located at the front side of the vehicle body, includes the pivot bracket 55, and is formed so that the inner column 51 is inserted thereinto. Accordingly, the axis of the outer column 54 may be aligned to the axis of the inner column 51. For this reason, the outer column 54 may easily guide the inner column 51 when the inner column 51 moves in the axial direction. Thus, since the inner column 51 may easily move straightly in the axial direction, the steering device 100 may prevent a problem in which the movement of the inner column 51 is disturbed or a problem in which a friction force generated between the inner column 51 and the outer column 54 becomes larger than a predetermined value.

Further, as described above, the steering device 100 according to the sixth embodiment is formed by a member connection structure using the shear pin Q. The member connection structure includes the first fixed member (the inner column 51) in which the first hole 51h is opened and the second fixed member in which the second hole 43h is opened (the inner column bracket 4) which is disposed adjacent to the first fixed member (the inner column 51). Further, the member connection structure includes the shear pin Q at a position straddling the first hole 51h and the second hole 43h, and the shear pin connects the first fixed member (the inner column 51) and the second fixed member (the inner column bracket 4) to each other and is cut at the cut surface BK of the boundary portion between the first fixed member (the inner column 51) and the second fixed member (the inner column bracket 4) by the movement of the first fixed member (the inner column 51) in the event of the secondary collision. The shear pin Q includes the outer pin Qo which is a cylindrical member having the guide hole Qoh penetrating an area from one end to the other end thereof and is inserted through the first hole 51h and the second hole 43h and the inner pin Qi which is inserted into the guide hole Qoh. The inner pin Qi includes the body portion Qi1 which is inserted through the guide hole Qoh. The body portion Qi1 includes the first large diameter portion Qi11 which presses the inner wall of the guide hole Qoh outward in the radial direction of the guide hole Qoh and the first small diameter portion Qi12 which is disposed at a position straddling the first hole 51h and the second hole 43h and has an outer periphery smaller than the outer periphery of the first large diameter portion Qi11.

The allowable shear force of the shear pin Q depends on the cross-sectional area of the cut surface BK. Since the outer periphery of the first small diameter portion Qi12 is smaller than the outer periphery of the first large diameter portion Qi11, a crack may easily occur in the first small diameter portion Qi12 when a shear force is applied to the inner pin Qi. Accordingly, the inner pin Qi is easily cut at the first small diameter portion Qi12. That is, since stress concentration occurs in a sheared state due to the first small diameter portion Qi12, the cut surface BK of the inner pin Qi is easily included in the first small diameter portion Qi12. For this reason, since unevenness in the position and the area of the cut surface BK in the inner pin Qi hardly occurs, the allowable shear force of the shear pin Q is stabilized. Thus, the member connection structure according to the sixth embodiment may improve the precision of the setting value (the allowable shear force of the shear pin Q) of the separation load.

In addition, the member connection structure may be used not only for the connection between the inner column 51 and the inner column bracket 4, but also for the connection between the other members. For example, the member connection structure may be used for the connection between the vehicle body side member 13 and the outer column bracket 52. The member connection structure is a separation member connecting member connection structure which connects members so that one member (the first fixed member) is separated from the other member (the second fixed member) in the event of the secondary collision.

First Modified Example of Sixth Embodiment

Figure 51:
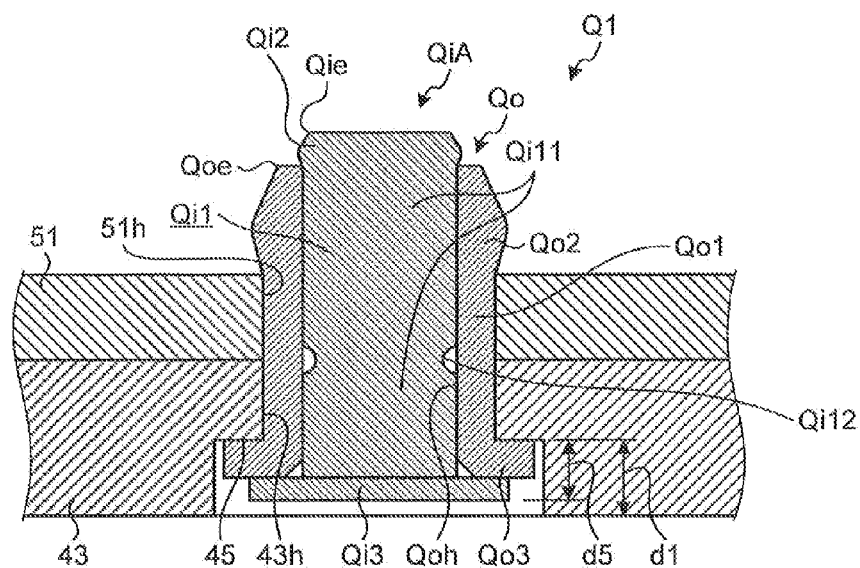
FIG. 51 is a cross-sectional view illustrating the periphery of a shear pin according to a first modified example of the sixth embodiment.

FIG. 51 is a cross-sectional view illustrating the periphery of a shear pin according to a first modified example of the sixth embodiment. A shear pin Q1 according to the first modified example of the sixth embodiment is different from the shear pin Q according to the sixth embodiment in that an inner pin QiA different from the inner pin Qi is provided. In addition, the same reference signs will be given to the same components as those of the above-described embodiments, and the repetitive description thereof will not be presented.

As illustrated in FIG. 51, the inner pin QiA according to the first modified example of the sixth embodiment includes, for example, the body portion Qi1, the protrusion portion Qi2, and an inner flange portion Qi3. In the inner pin QiA, for example, the protrusion portion Qi2 is provided at the inner end of the inner column 51 of the body portion Qi1. That is, the protrusion portion Qi2 is disposed at a position inside the inner column 51 and outside the guide hole Qoh. Accordingly, since the protrusion portion Qi2 contacts the edge of one end of the guide hole Qoh, the inner pin Qi does not easily come off from the outer pin Qo. The inner flange portion Qi3 has, for example, a disk shape and is provided at the end opposite to the protrusion portion Qi2 in the body portion Qi1. The inner flange portion Qi3 is disposed at a position inside the concave portion 45 and outside the guide hole Qoh. The outer periphery of the inner flange portion Qi3 is larger than the outer periphery of the protrusion portion Qi2. Accordingly, since the inner flange portion Qi3 contacts the edge of the other end of the guide hole Qoh, the inner pin QiA does not easily come off from the outer pin Qo.

The inner pin QiA is inserted into the guide hole Qoh from the protrusion portion Qi2 which is easily press-inserted. In a direction in which the inner pin QiA is press-inserted into the guide hole Qoh, an area in which the inner flange portion Qi3 overlaps the outer pin Qo is larger than an area in which the protrusion portion Qi2 overlaps the outer pin Qo. Accordingly, even when a force for press-inserting the protrusion portion Qi2 into the guide hole Qoh is applied to the inner pin QiA, the entrance of the inner pin QiA into the guide hole Qoh is suppressed when the inner flange portion Qi3 and the outer pin Qo contact each other. That is, in the inner pin QiA according to the first modified example of the sixth embodiment, it is possible to easily suppress the inner pin QiA from being excessively press-inserted into the guide hole Qoh compared to the case where the protrusion portion Qi2 is provided at both ends of the body portion Qi1. Accordingly, the first small diameter portion Qi12 is not easily deviated from a position straddling the first hole 51$h$ and the second hole 43$h$. For this reason, the allowable shear force of the shear pin Q is easily stabilized.

In addition, as illustrated in FIG. 51, it is desirable that the depth d1 of the concave portion 45 be equal to or larger than the length d5 of the portion projected from the second hole 43$h$ in the inner pin QiA. Accordingly, the shear pin Q1 is not projected from the surface of the inner column bracket 4. For this reason, the steering device 100 may prevent the shear pin Q1 from being broken by an external force.

Second Modified Example of Sixth Embodiment

Figure 52:
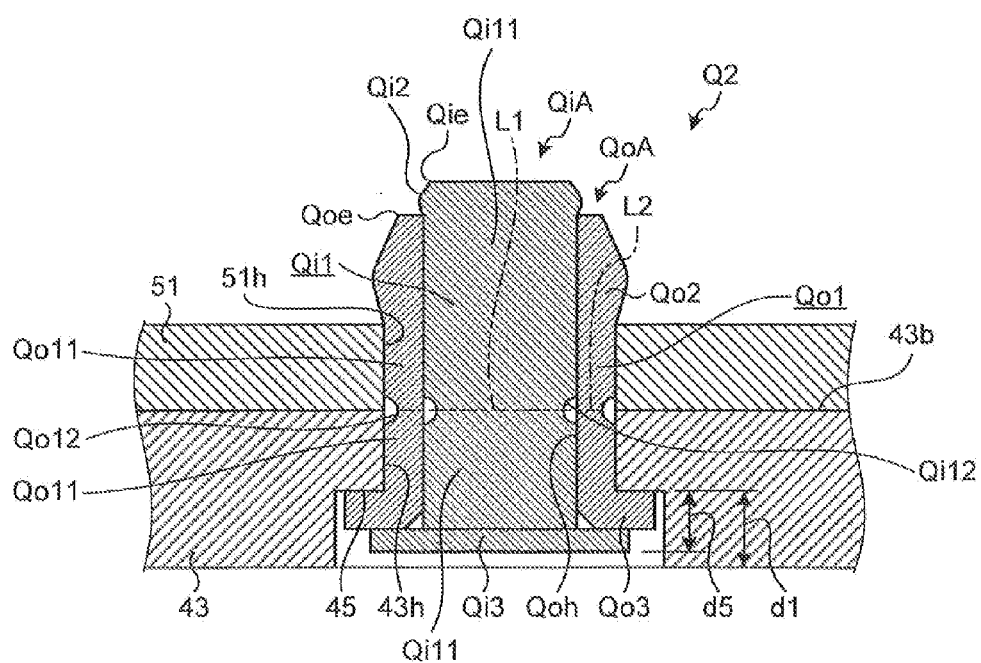
FIG. 52 is a cross-sectional view illustrating the periphery of a shear pin according to a second modified example of the sixth embodiment.
Figure 53:
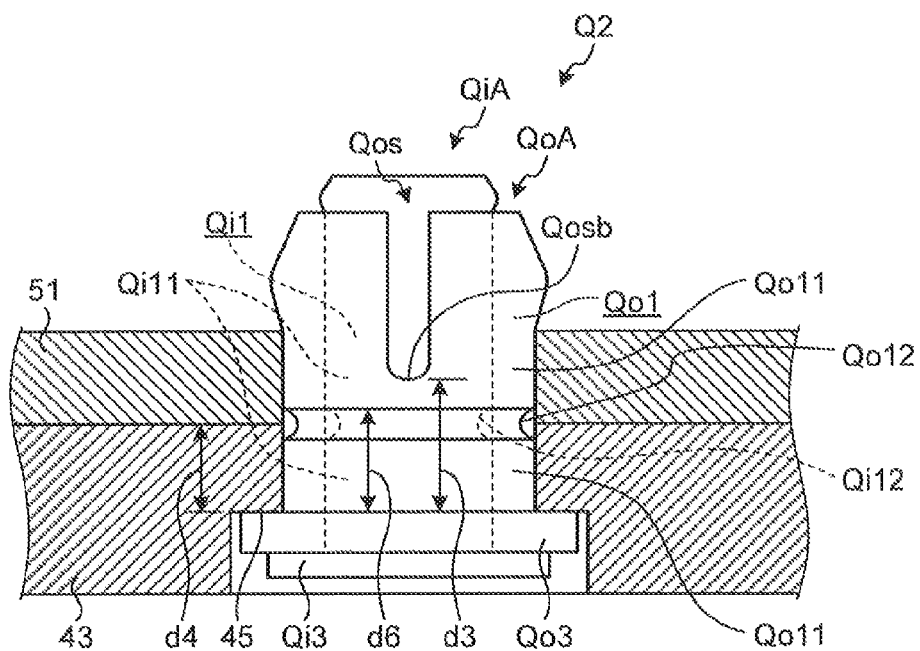
FIG. 53 is a cross-sectional view illustrating the periphery of the shear pin according to the second modified example of the sixth embodiment while illustrating only the shear pin as a side view.

FIG. 52 is a cross-sectional view illustrating the periphery of a shear pin according to a second modified example of the sixth embodiment. FIG. 53 is a cross-sectional view illustrating the periphery of the shear pin according to the second modified example of the sixth embodiment while illustrating only the shear pin as a side view. A shear pin Q2 according to the second modified example of the sixth embodiment is different from the shear pin Q according to the sixth embodiment in that an outer pin QoA different from the inner pin QiA and the outer pin Qo illustrated in the first modified example of the sixth embodiment is provided. In addition, the same reference signs will be given to the same components as those of the above-described embodiments, and the repetitive description thereof will not be presented.

As illustrated in FIG. 52, in the outer pin QoA according to the second modified example of the sixth embodiment, the main body portion Qo1 includes a second large diameter portion Qo11 and a second small diameter portion Qo12. For example, the second large diameter portion Qo11 has a columnar shape and has the same outer periphery as the inner periphery of the first hole 51$h$ and the second hole 43$h$. The second small diameter portion Qo12 is provided at a position straddling the first hole 51$h$ and the second hole 43$h$. The second small diameter portion Qo12 has, for example, a shape of a rotation body concentric with the second large diameter portion Qo11. The outer periphery of the second small diameter portion Qo12 is smaller than the outer periphery of the second large diameter portion Qo11. For example, the second small diameter portion Qo12 is formed by notching a part of the entire circumference of the main body portion Qo1 in the circumferential direction. The surface of the second small diameter portion Qo12 depicts a circular-arc in the cross-section (the cross-section illustrated in FIG. 52) obtained by cutting the inner pin QiA along a plane including the rotation axis Zr. For example, in the cross-section illustrated in FIG. 52, the line L1 that passes through a portion having a minimum outer periphery in the first small diameter portion Qi12 overlaps the line L2 that passes through a portion having a minimum outer periphery in the second small diameter portion Qo12. Further, in the second modified example of the sixth embodiment, the width of the first small diameter portion Qi12 in the axial direction of the body portion Qi1 is equal to the width of the second small diameter portion Qo12 in the axial direction of the body portion Qi1.

The allowable shear force of the shear pin Q2 depends on the cross-sectional area of the cut surface BK. Since the outer periphery of the second small diameter portion Qo12 is smaller than the outer periphery of the second large diameter portion Qo11, a crack easily occur in the second small diameter portion Qo12 when a shear force is applied to the outer pin QoA. Accordingly, the outer pin QoA is easily cut at the second small diameter portion Qo12. That is, since stress concentration occurs in a sheared state due to the second small diameter portion Qo12, the cut surface BK of the outer pin QoA is easily included in the second small diameter portion Qo12. For this reason, since unevenness in the position and the area of the cut surface BK in the outer pin QoA hardly occurs, the allowable shear force of the shear pin Q2 is stabilized. Thus, the steering device 100 according to the second modified example of the sixth embodiment may improve the precision of the setting value (the allowable shear force of the shear pin Q2) of the separation load.

Further, the outer pin QoA includes the separation preventing portion Qo2 which is provided at one end of the main body portion Qo1 and has an outer periphery larger than the inner periphery of the first hole 51h and the inner periphery of the second hole 43h, the outer flange portion Qo3 which is provided at the other end of the main body portion Qo1 and has an outer periphery larger than the outer periphery of the separation preventing portion Qo2, and the notch Qos which is provided from the separation preventing portion Qo2 toward the outer flange portion Qo3. Accordingly, when the separation preventing portion Qo2 is inserted into the first hole 51h or the second hole 43h, the width ds of the notch Qos (see FIG. 47 and the like) in the circumferential direction of the outer pin QoA decreases, and the outer periphery of the separation preventing portion Qo2 decreases. Accordingly, the separation preventing portion Qo2 may easily pass through the first hole 51h and the second hole 43h. For this reason, the outer pin QoA may be easily attached to the first hole 51h and the second hole 43h. Further, since the outer pin QoA is positioned by the separation preventing portion Qo2 and the outer flange portion Qo3, the second small diameter portion Qo12 is not easily deviated from the first hole 51h and the second hole 43h. For this reason, the allowable shear force of the shear pin Q2 is more stabilized.

As illustrated in FIG. 53, it is desirable that the distance d3 from the outer flange portion Qo3 to the front end Qosb of the notch Qos be larger than the distance d6 from the outer flange portion Qo3 to the end near the first hole 51h of the second small diameter portion Qo12. Accordingly, since the notch Qos and the second small diameter portion Qo12 do not overlap each other, the notch Qos is not included in the cut surface BK used for cutting the outer pin QoA. For this reason, since the loss portion corresponding to the notch Qos disappears in the cut surface BK of the outer pin QoA, unevenness in the allowable shear force of the shear pin Q2 is suppressed.

Figure 54:
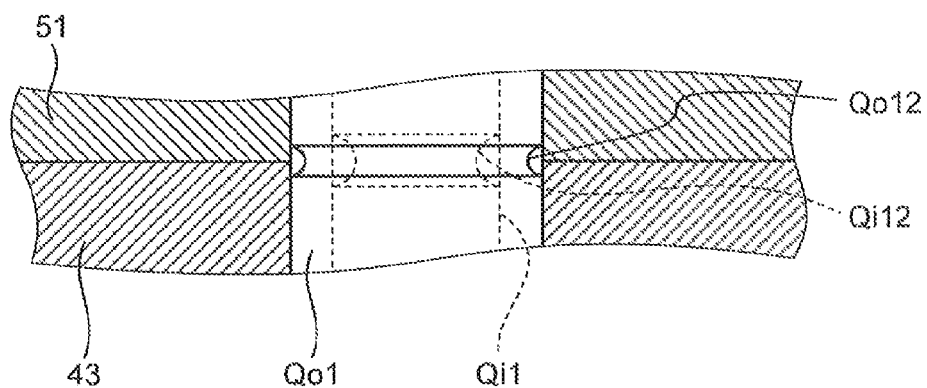
FIG. 54 is a diagram illustrating a small diameter portion of the shear pin according to the second modified example of the sixth embodiment.

In addition, the width of the first small diameter portion Qi12 in the axial direction of the body portion Qi1 may not be essentially equal to the width of the second small diameter portion Qo12 in the axial direction of the body portion Qi1. FIG. 54 is a diagram illustrating a small diameter portion of a shear pin according to the second modified example of the sixth embodiment. For example, as illustrated in FIG. 54, the width of the first small diameter portion Qi12 in the axial direction of the body portion Qi1 may be larger than the width of the second small diameter portion Qo12 in the axial direction of the body portion Qi1.

Third Modified Example of Sixth Embodiment

Figure 55:
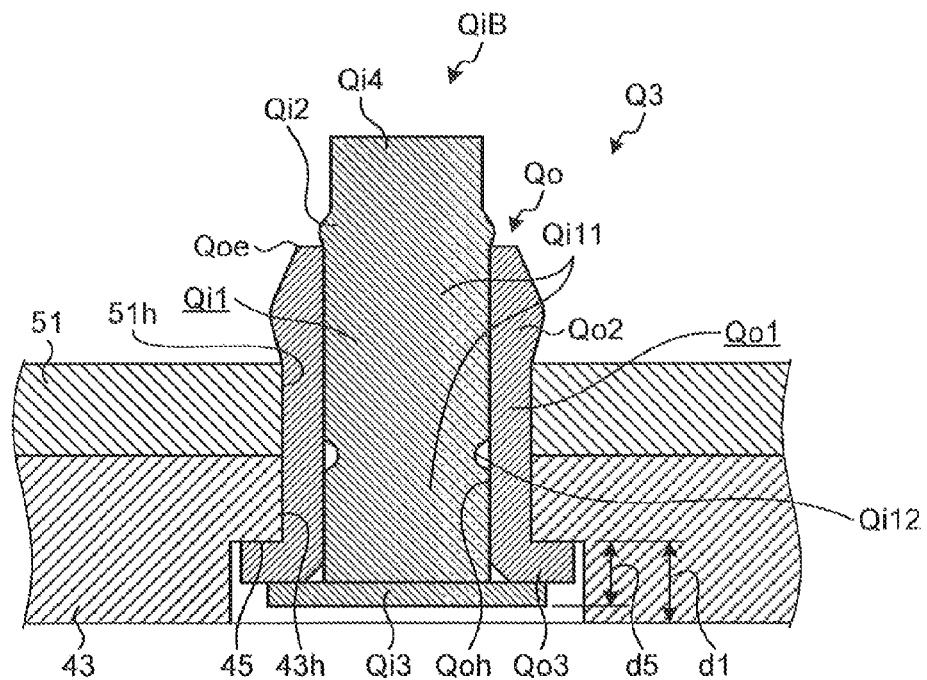
FIG. 55 is a cross-sectional view illustrating the periphery of a shear pin according to a third modified example of the sixth embodiment.

FIG. 55 is a cross-sectional view illustrating the periphery of a shear pin according to a third modified example of the sixth embodiment. A shear pin Q3 according to the third modified example of the sixth embodiment is different from the shear pin Q according to the sixth embodiment in that an inner pin QiB different from the inner pin Qi is provided. In addition, the same reference signs will be given to the same components as those of the above-described embodiments, and the repetitive description thereof will not be presented.

As illustrated in FIG. 55, the inner pin QiB includes, for example, the body portion Qi1, the protrusion portion Qi2, the inner flange portion Qi3, and a guide portion Qi4. The inner pin QiB is different from the inner pin QiA according to the first modified example of the sixth embodiment in that the guide portion Qi4 is provided. For example, the guide portion Qi4 is formed in a columnar shape so as to be concentric with the body portion Qi1 and is provided at the end opposite to the body portion Qi1 in the protrusion portion Qi2. The protrusion portion Qi2 is disposed between the body portion Qi1 and the guide portion Qi4. The outer periphery of the guide portion Qi4 is smaller than the outer periphery of the first large diameter portion Qi11 of the body portion Qi1.

The inner pin QiB is inserted from the guide portion Qi4 into the guide hole Qoh. First, the guide portion Qi4 is inserted from the outer flange portion Qo3 into the guide hole Qoh. Since the outer periphery of the guide portion Qi4 is smaller than the inner periphery of the guide hole Qoh, a gap is formed between the guide portion Qi4 and the inner wall of the guide hole Qoh. Accordingly, the guide portion Qi4 may easily enter the guide hole Qoh. Subsequently, for example, the protrusion portion Qi2 contacts the edge of the guide hole Qoh, so that a pressure is applied to the inner pin QiB and the inner pin QiB is press-inserted into the guide hole Qoh. That is, the inner pin QiB is press-inserted into the guide hole Qoh. That is, the inner pin QiB is press-inserted into the guide hole Qoh while the guide portion Qi4 is inserted into the guide hole Qoh in advance. Even when the inner pin QiB falls when the inner pin QiB is press-inserted into the guide hole Qoh, the edge of the guide portion Qi4 contacts the inner wall of the guide hole Qoh. Accordingly, an angle in which the inner pin QiB falls is regulated at a predetermined angle or less. Accordingly, it is possible to easily stabilize the posture of the inner pin QiB when the inner pin is press-inserted into the guide hole Qoh. Thus, the steering device 100 according to the third modified example of the sixth embodiment may easily assemble the connection portion between the inner column 51 and the inner column bracket 4 which are detachably connected to each other.

Fourth Modified Example of Sixth Embodiment

Figure 56:
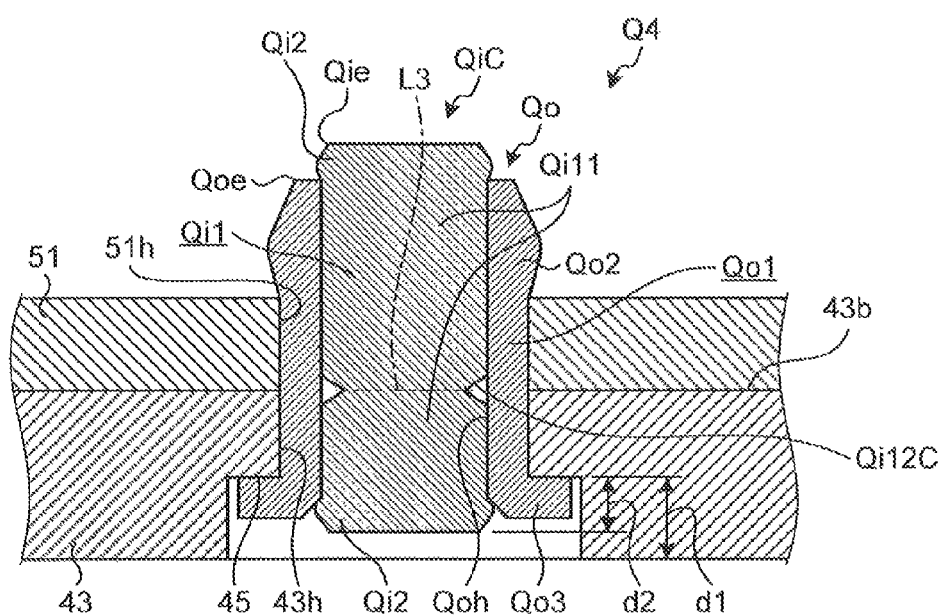
FIG. 56 is a cross-sectional view illustrating the periphery of a shear pin according to a fourth modified example of the sixth embodiment.

FIG. 56 is a cross-sectional view illustrating the periphery of a shear pin according to a fourth modified example of the sixth embodiment. A shear pin Q4 according to the fourth modified example of the sixth embodiment is different from the shear pin Q according to the sixth embodiment in that an inner pin QiC different from the inner pin Qi is provided. In addition, the same reference signs will be given to the same components as those of the above-described embodiments, and the repetitive description thereof will not be presented.

As illustrated in FIG. 56, the inner pin QiC includes a first small diameter portion Qi12C having a shape different from the first small diameter portion Qi12 illustrated in the sixth embodiment. The first small diameter portion Qi12C are provided at a position straddling the first hole 51h and the second hole 43h. The first small diameter portion Qi12C has, for example, a shape of a rotation body concentric with the first large diameter portion Qi11. The outer periphery of the first small diameter portion Qi12C is smaller than the outer periphery of the first large diameter portion Qi11. For example, the first small diameter portion Qi12C is formed by notching a part of the entire circumference of the body portion Qi1 in the circumferential direction. That is, the first small diameter portion Qi12C is a groove which is formed by depressing the surface of the body portion Qi1 in the circumferential direction. For example, the bottom portion of the surface of the first small diameter portion Qi12C is formed in a V-shape. The surface of the first small diameter portion Qi12C depicts a wedge shape in the cross-section (the cross-section illustrated in FIG. 56) obtained by cutting the inner pin QiC along a plane including the rotation axis Zr. For example, in the cross-section illustrated in FIG. 56, the line L3 that passes through a portion having a minimum outer periphery in the first small diameter portion Qi12C is located on the extension line of the outer wall of the inner column 51, that is, the extension line of the inner column side surface 43b of the leg portion 43.

Since the outer periphery of the first small diameter portion Qi12C is smaller than the outer periphery of the first large diameter portion Qi11, a crack easily occurs in the first small diameter portion Qi12C when a shear force is applied to the inner pin QiC. Further, since the cross-sectional shape of the first small diameter portion Qi12C is formed in a wedge shape, the first small diameter portion Qi12C causes a crack in a portion having a minimum outer periphery (a wedge-shaped front end). Accordingly, the first small diameter portion Qi12C easily causes a crack in the portion having a minimum outer periphery. The inner pin QiC may improve the precision in position in the cut surface BK of the inner pin QiC compared to the inner pin Qi according to the sixth embodiment. For this reason, since unevenness in the area of the cut surface BK in the inner pin QiC hardly occurs, the allowable shear force of the shear pin Q4 is stabilized.

In addition, in the cross-section illustrated in FIG. 56, the surface of the first small diameter portion Qi12C depicts a wedge shape, but the wedge-shaped front end may not be essentially formed in a V-shape, that is, a sharp shape. The wedge shape may be formed in a shape which is narrowed inward in the radial direction of the body portion Qi1. For example, the wedge-shaped front end may be formed in a circular-arc shape. Alternatively, the wedge-shaped front end may be formed in a line shape parallel to the axial direction of the body portion Qi1, that is, the entire wedge shape may be formed in a trapezoid shape.

In the description above, the sixth embodiment and the first to fourth modified examples of the sixth embodiment have been described, but the above-described content is not limited to the above-described embodiments. Each of the outer pin Qo and the outer pin QoA illustrated in the sixth embodiment and the first to fourth modified examples of the sixth embodiment may be assembled to one of the inner pin Qi, the inner pin QiA, the inner pin QiB, and the inner pin QiC. Further, the shape (the wedge shape) of the first small diameter portion Qi12C according to the fourth modified example of the sixth embodiment may be also applied to the shape of the second small diameter portion Qo12 of the outer pin QoA. Further, the entire shape of the inner pin Qi may not be essentially formed in the above-described columnar shape, and the entire shape of the outer pin Qo may not be essentially formed in the above-described cylindrical shape. For example, the cross-sectional shape obtained by cutting the inner pin Qi or the outer pin Qo in a plane perpendicular to the axial direction of the first hole 51h may be a polygonal shape such as a square shape. Further, the cross-sectional shape obtained by cutting the first small diameter portion Qi12 or the second small diameter portion Qo12 in a plane perpendicular to the axial direction of the first hole 51h is not limited to a circular shape, but may be a polygonal shape such as a square shape.

Seventh Embodiment

Figure 57:
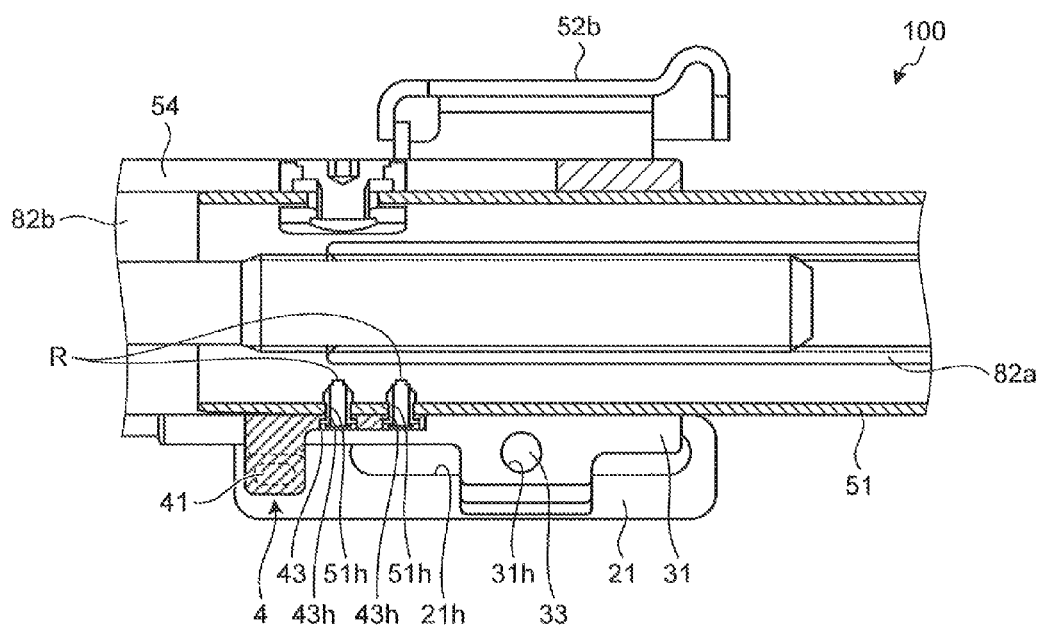
FIG. 57 is a cross-sectional view illustrating a steering device according to a seventh embodiment when taken along the line corresponding to the line e-e of FIG. 26.
Figure 58:
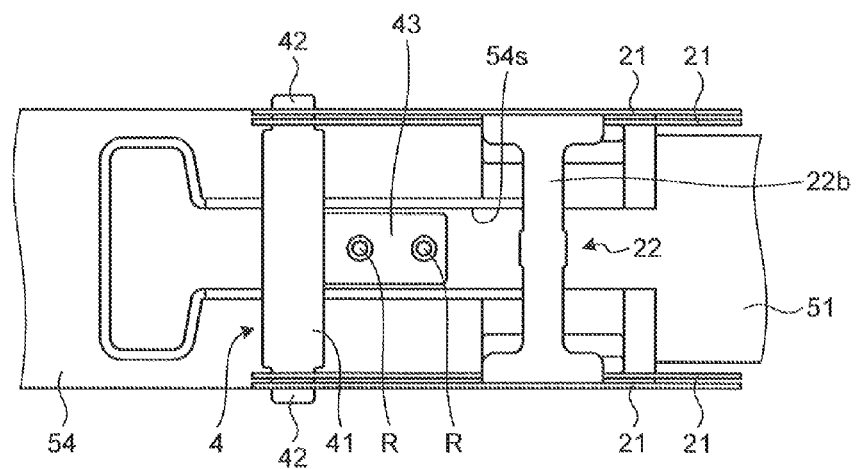
FIG. 58 is a diagram illustrating a bottom surface of the steering device according to the seventh embodiment.

FIG. 57 is a cross-sectional view illustrating a steering device according to a seventh embodiment when taken along the line corresponding to the line e-e of FIG. 26. FIG. 58 is a diagram illustrating a bottom surface of the steering device according to the seventh embodiment. In addition, the same reference signs will be given to the same components as those of the above-described embodiments, and the repetitive description thereof will not be presented.

In order to detachably connect the inner column bracket 4 and the inner column 51 to each other, as illustrated in FIG. 57, a first hole 51h is opened in the inner column 51, and a second hole 43h is opened in the bottom surface of the concave portion 45 of the leg portion 43. The first hole 51h and the second hole 43h communicate with each other. For example, in the seventh embodiment, each of the first hole 51h and the second hole 43h is provided at two positions, and has the same inner periphery. A shear pin R is inserted into a position straddling the first hole 51h and the second hole 43h, so that the inner column bracket 4 and the inner column 51 are detachably connected to each other. Further, the first hole 51h and the second hole 43h are disposed at a position where the distance values from the first telescopic friction plates 21 disposed at both sides of the outer column 54 are equal to each other.

Figure 59:
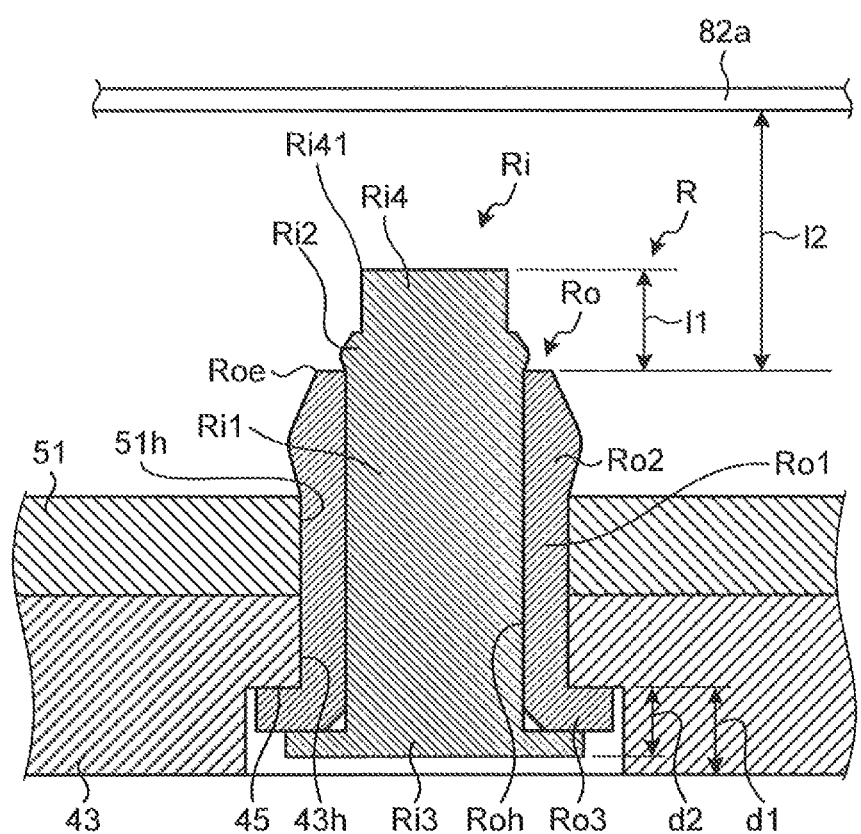
FIG. 59 is an enlarged diagram illustrating the periphery of a shear pin of FIG. 57.
Figure 60:
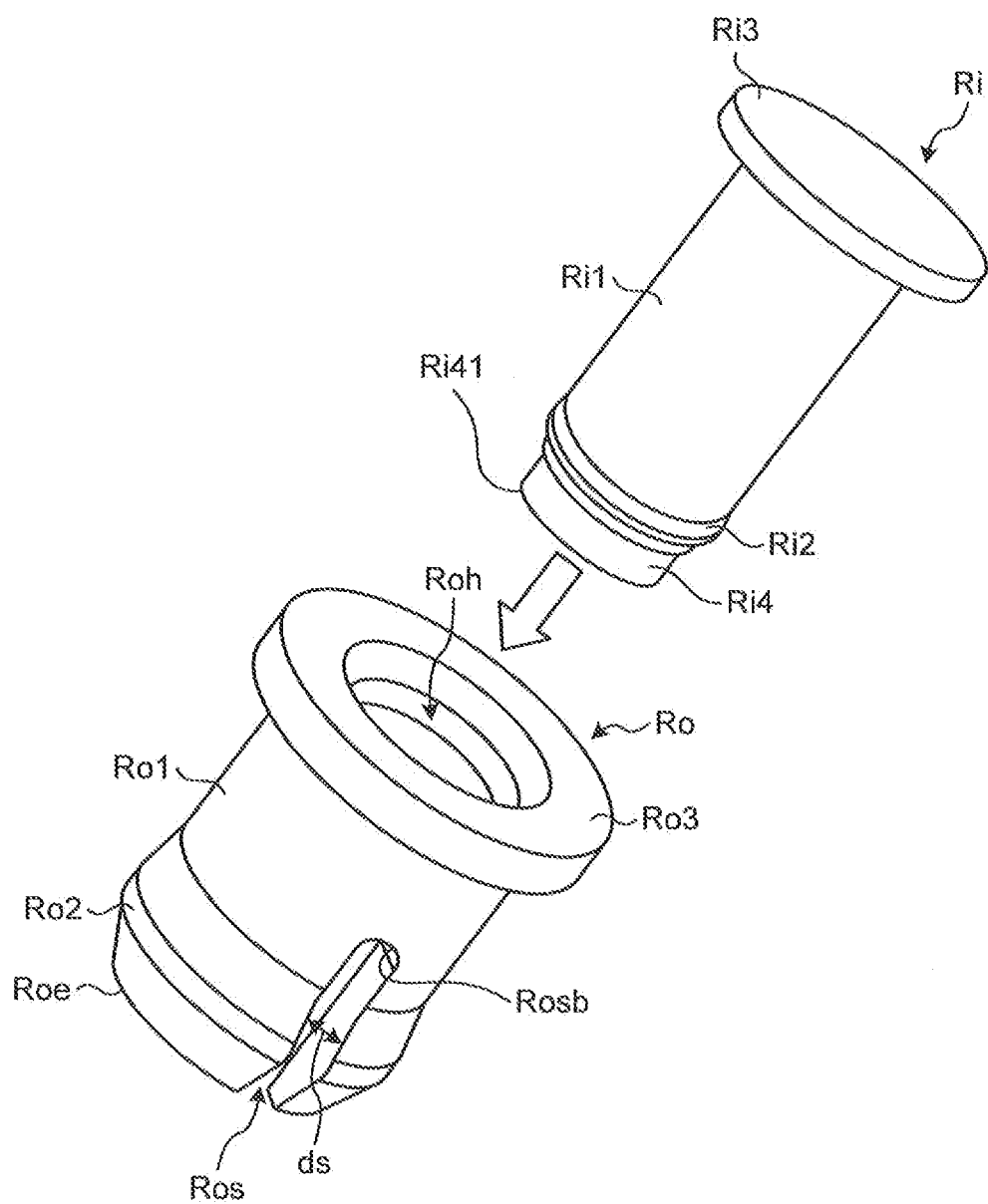
FIG. 60 is a perspective view illustrating the shear pin in a state before an inner pin according to the seventh embodiment is inserted into an outer pin.
Figure 61:
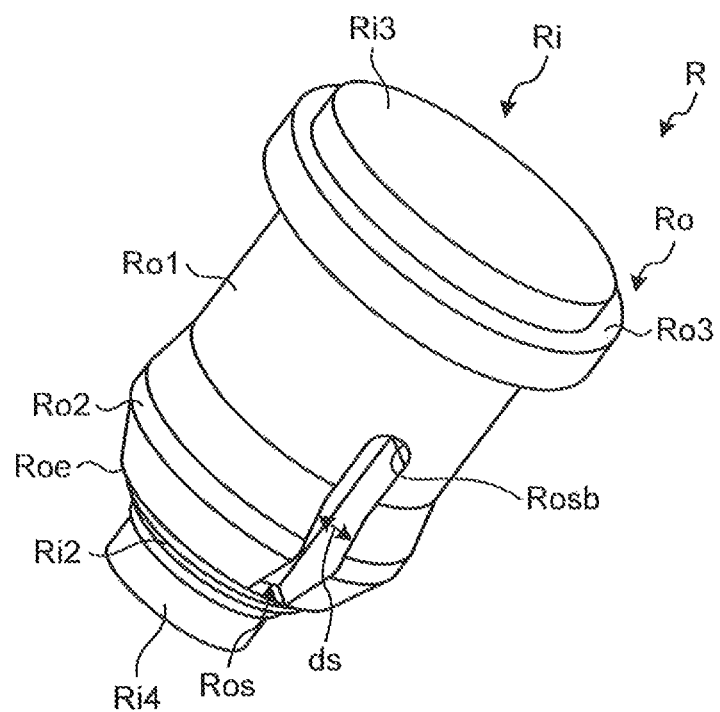
FIG. 61 is a perspective view illustrating the shear pin in a state after the inner pin according to the seventh embodiment is inserted into the outer pin.

FIG. 59 is an enlarged diagram illustrating the periphery of a shear pin of FIG. 57. FIG. 60 is a perspective view illustrating the shear pin in a state before an inner pin according to the seventh embodiment is inserted into an outer pin. FIG. 61 is a perspective view illustrating the shear pin in a state after the inner pin according to the seventh embodiment is inserted into the outer pin. In the seventh embodiment, the shear pin R includes an outer pin Ro and an inner pin Ri. The outer pin Ro and the inner pin Ri are formed of, for example, a resin such as polyacetal.

As illustrated in FIG. 59, the outer pin Ro is a cylindrical member that is inserted through the first hole 51h and the second hole 43h. The outer pin Ro includes, for example, a main body portion Ro1, a separation preventing portion Ro2, an outer flange portion Ro3, and a guide hole Roh. As illustrated in FIGS. 59 and 60, the main body portion Ro1 has a cylindrical shape, and is inserted through the first hole 51h and the second hole 43h. The separation preventing portion Ro2 is provided at one end of the main body portion Ro1 and is located at the inside of the inner column 51. The separation preventing portion Ro2 has a cylindrical shape, and has an outer periphery larger than the inner periphery of the first hole 51h and the inner periphery of the second hole 43h. Accordingly, since the separation preventing portion Ro2 contacts the inner wall of the inner column 51, it is possible to suppress the outer pin Ro from coming off from the first hole 51h and the second hole 43h. The outer flange portion Ro3 is provided at the other end of the main body portion Ro1, and is located at the outside of the inner column 51 in the radial direction in relation to the second hole 43$h$. The outer flange portion Ro3 has, for example, a disk shape, and has an outer periphery larger than the inner periphery of the first hole 51$h$ and the inner periphery of the second hole 43$h$. Accordingly, since the outer flange portion Ro3 contacts the bottom surface of the concave portion 45, it is possible to suppress the outer pin Ro from coming off from the first hole 51$h$ and the second hole 43$h$. The guide hole Roh is a penetration hole which penetrates an area from the outer flange portion Ro3 to the separation preventing portion Ro2.

In the seventh embodiment, the outer pin Ro is inserted into the first hole 51$h$ and the second hole 43$h$ by press-inserting. Since the outer pin Ro is inserted into the first hole 51$h$ and the second hole 43$h$, the first hole 51$h$ and the second hole 43$h$ are positioned. For example, the separation preventing portion Ro2 is inserted from the second hole 43$h$ into the first hole 51$h$ and the second hole 43$h$. The separation preventing portion Ro2 is formed so that the outer periphery at the end Roe opposite to the main body portion Ro1 is smaller than the inner periphery of the first hole 51$h$ and the inner periphery of the second hole 43$h$. Accordingly, the separation preventing portion Ro2 may be easily inserted into the second hole 43$h$.

In addition, the outer pin Ro may be inserted from the first hole 51$h$ into the first hole 51$h$ and the second hole 43$h$. Further, the outer pin Ro may be press-inserted after a rib or the like is provided in the outer wall of the main body portion Ro1.

As illustrated in FIGS. 60 and 61, the outer pin Ro includes one notch Ros which is formed from the separation preventing portion Ro2 toward the flange portion Ro3. When the separation preventing portion Ro2 is inserted into the second hole 43$h$, the width ds of the notch Ros in the circumferential direction of the outer pin Ro decreases, and hence the outer periphery of the separation preventing portion Ro2 decreases. Accordingly, the separation preventing portion Ro2 may be easily inserted through the first hole 51$h$ and the second hole 43$h$. In the description below, the width ds of the notch Ros in the circumferential direction of the outer pin Ro will be simply referred to as the width ds of the notch Ros.

In addition, the outer pin Ro may include a plurality of notches Ros. In the case where the plurality of notches Ros is provided, it is desirable to dispose the plurality of notches Ros at the same interval in the circumferential direction of the outer pin Ro.

In a state before the outer pin Ro is inserted through the first hole 51$h$ and the second hole 43$h$, the outer periphery of the main body portion Ro1 is larger than the inner periphery of the first hole 51$h$ and the inner periphery of the second hole 43$h$. Then, in a state where the outer pin Ro is inserted through the first hole 51$h$ and the second hole 43$h$, the main body portion Ro1 is elastically deformed, and hence the outer periphery of the main body portion Ro1 becomes the same as the inner periphery of the first hole 51$h$ and the inner periphery of the second hole 43$h$. Accordingly, the main body portion Ro1 presses the inner wall of the first hole 51$h$ and the inner wall of the second hole 43$h$. For this reason, a gap is not easily formed between the main body portion Ro1 and the inner wall of the first hole 51$h$ and a gap is not easily formed between the main body portion Ro1 and the inner wall of the second hole 43$h$. Accordingly, the play of the outer pin Ro is suppressed.

The inner pin Ri is a member that is inserted into the guide hole Roh of the outer pin Ro. In the description below, the outside in the radial direction of the guide hole Roh will be simply referred to as the outside in the radial direction. The inner pin Ri includes, for example, a body portion Ri1, a large diameter portion Ri2, an inner flange portion Ri3, and a guide portion Ri4. As illustrated in FIGS. 59 to 61, the body portion Ri1 is formed in a columnar shape and is inserted through the guide hole Roh. The large diameter portion Ri2 is provided at, for example, the inner end of the inner column 51 in the body portion Ri1. That is, the large diameter portion Ri2 is disposed at a position inside the inner column 51 and outside the guide hole Roh. The outer periphery of the large diameter portion Ri2 is larger than the inner periphery of the guide hole Roh. Accordingly, since the large diameter portion Ri2 contacts the edge of one end of the guide hole Roh, the inner pin Ri does not easily come off from the outer pin Ro. For example, the inner flange portion Ri3 is formed in a disk shape so as to be concentric with the body portion Ri1 and is provided at the end opposite to the large diameter portion Ri2 in the body portion Ri1. The inner flange portion Ri3 is disposed at a position inside the concave portion 45 and outside the guide hole Roh. The outer periphery of the inner flange portion Ri3 is larger than the inner periphery of the guide hole Roh. Accordingly, since the inner flange portion Ri3 contacts the edge of the other end of the guide hole Roh, the inner pin Ri does not easily come off from the outer pin Ro. For example, the guide portion Ri4 is formed in a columnar shape so as to be concentric with the body portion Ri1 and is provided at the end opposite to the body portion Ri1 in the large diameter portion Ri2. That is, the large diameter portion Ri2 is disposed between the body portion Ri1 and the guide portion Ri4. The outer periphery of the guide portion Ri4 is smaller than the outer periphery of the body portion Ri1. Further, as illustrated in FIG. 59, the distance 11 from the end Roe of the outer pin Ro to the front end of the guide portion Ri4 is smaller than the distance 12 from the end Roe to the input shaft 82$a$.

In addition, the guide hole Roh may include a stepped portion which is formed at the end so that the inner periphery is enlarged. In this case, since the large diameter portion Ri2 or the inner flange portion Ri3 contacts the edge of the stepped portion, the inner pin Ri is not easily projected from the end of the guide hole Roh.

In the seventh embodiment, the inner pin Ri is inserted from the guide portion Ri4 into the guide hole Roh. First, the guide portion Ri4 is inserted from the outer flange portion Ro3 into the guide hole Roh. Since the outer periphery of the guide portion Ri4 is smaller than the outer periphery of the body portion Ri1, a gap is formed between the guide portion Ri4 and the inner wall of the guide hole Roh. Accordingly, the guide portion Ri4 may easily enter the guide hole Roh. Subsequently, for example, the large diameter portion Ri2 contacts the edge of the guide hole Roh, and the inner pin Ri is press-inserted into the guide hole Roh due to the pressure applied to the inner pin Ri. That is, the inner pin Ri is press-inserted into the guide hole Roh. The inner pin Ri is press-inserted into the guide hole Roh while the guide portion Ri4 is inserted into the guide hole Roh in advance.

Figure 62:
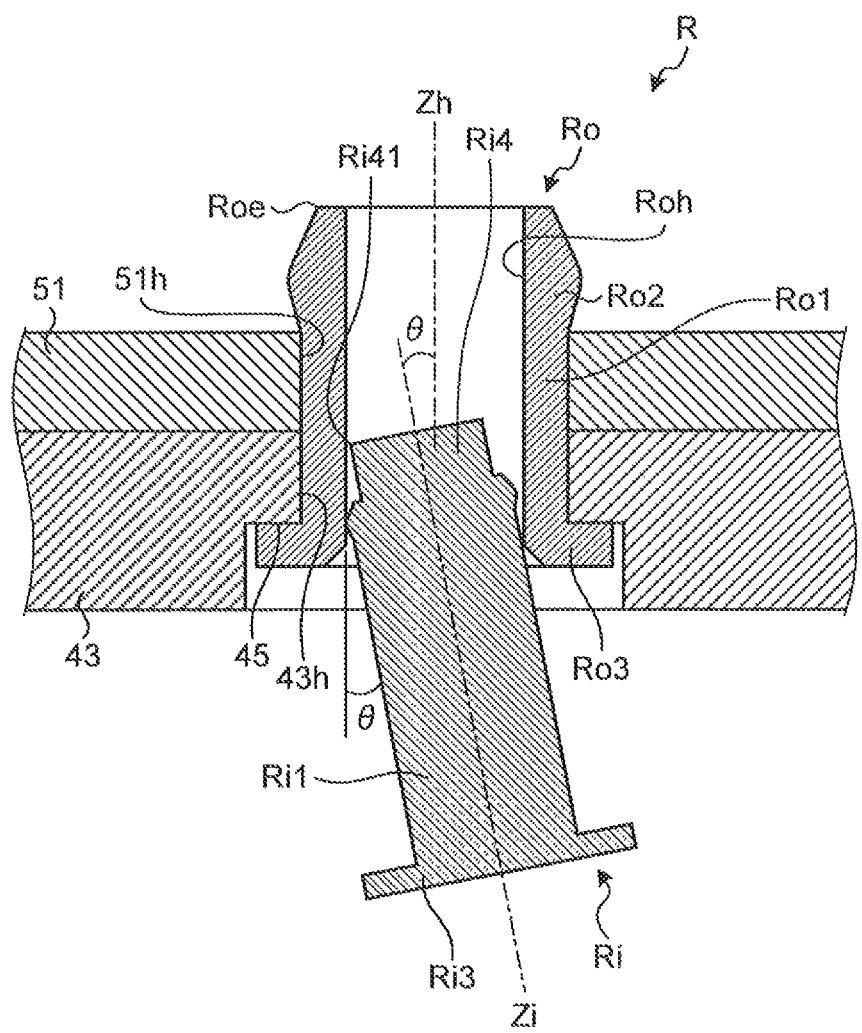
FIG. 62 is a diagram illustrating a case where the axis of the inner pin is inclined with respect to the axis of a guide hole.

FIG. 62 is a diagram illustrating a case where the axis of the inner pin is inclined with respect to the axis of the guide hole. As illustrated in FIG. 62, there is a possibility that the axis Zi of the inner pin Ri may be inclined with respect to the axis Zh of the guide hole Roh when the inner pin Ri is press-inserted into the guide hole Roh. That is, there is a possibility that the inner pin Ri may fall. However, in the seventh embodiment, an edge Ri41 of the guide portion Ri4 contacts the inner wall of the guide hole Roh even when the inner pin Ri falls. Accordingly, an angle θ formed between the axis Zi of the inner pin Ri and the axis Zh of the guide hole Roh, that is, an angle θ in which the inner pin Ri falls is regulated at a predetermined angle or less. Accordingly, it is possible to easily stabilize the posture of the inner pin Ri when the inner pin is press-inserted into the guide hole Roh.

In addition, it is desirable to perform a chamfering process on the edge Ri41 of the guide portion Ri4. For example, the chamfering process may be a chamfering process (a C-chamfering process) of cutting the cross-sectional shape in a line shape or a chamfering process (an R-chamfering process) of cutting the cross-sectional shape in a curve shape. Accordingly, the guide portion Ri4 easily enter the guide hole Roh when the inner pin Ri is inserted into the guide hole Roh.

In a state before the inner pin Ri is inserted into the guide hole Roh, the outer periphery of the body portion Ri1 is larger than the inner periphery of the guide hole Roh. Then, in a state where the body portion Ri1 is inserted through the guide hole Roh, the body portion Ri1 is elastically deformed, and hence the outer periphery of the body portion Ri1 becomes the same as the inner periphery of the guide hole Roh. Accordingly, the body portion Ri1 presses the inner wall of the guide hole Roh outward in the radial direction. For this reason, a gap is not easily formed between the body portion Ri1 and the inner wall of the guide hole Roh. Accordingly, the play of the inner pin Ri is suppressed.

When the body portion Ri1 presses the inner wall of the guide hole Roh outward in the radial direction, a force of widening the width ds of the notch Ros is applied to the outer pin Ro. Accordingly, friction forces generated in the outer pin Ro and the inner wall of the first hole 51h, and in the outer pin Ro and the inner wall of the second hole 43h, increase. Further, since the width ds of the notch Ros of the separation preventing portion Ro2 increases, the outer periphery of the separation preventing portion Ro2 increases. For this reason, the shear pin R obtained by integrating the outer pin Ro and the inner pin Ri is fixed to a position straddling the first hole 51h and the second hole 43h, and hence connects the inner column 51 and the inner column bracket 4 to each other.

Since the steering device 100 may be assembled by inserting the inner pin Ri after the first hole 51h and the second hole 43h are positioned by the outer pin Ro, the steering device may be easily assembled.

Further, since the distance 11 is smaller than the distance 12 as illustrated in FIG. 59, the guide portion Ri4 of the inner pin Ri is prevented from contacting the input shaft 82a. Accordingly, it is possible to suppress an increase in torque of the input shaft 82a due to a contact between the input shaft 82a and the guide portion Ri4.

Further, since the steering device 100 according to the seventh embodiment uses the shear pin R in the first hole 51h and the second hole 43h, there is no need to provide a device for charging a resinous member and a member for receiving the resinous member, compared to the case where the resinous member is charged into the first hole 51h and the second hole 43h. For this reason, the steering device 100 according to the seventh embodiment may be easily assembled.

When an excessive load is applied to the steering wheel 81, the load is transmitted to the inner column 51 through the input shaft 82a, and hence the inner column 51 is moved forward. Meanwhile, the inner column bracket 4 which is supported by the first telescopic friction plate 21 does not move. For this reason, since a shear force is applied to the shear pin R, the shear pin R is cut when the load exceeds the allowable shear force of the shear pin R. When the shear pin R is cut, the connection between the inner column 51 and the inner column bracket 4 is released. When the connection between the inner column 51 and the inner column bracket 4 is released, the inner column 51 is supported in the axial direction by a friction force generated between the inner column 51 and the outer column 54. Thus, when an excessive load is applied to the steering wheel due to the collision of the operator with respect to the steering wheel 81, a force for moving the inner column 51 decreases immediately after the excessive load is applied to the steering wheel, and hence impact is absorbed.

Further, even when the shear pin R is cut, the outer column 54 is supported by the outer column bracket 52 fixed to the vehicle body side member 13. Further, the inner column 51 is supported by the outer column 54. For this reason, even when the shear pin R is cut, the steering column 50 is not dropped.

Figure 63:
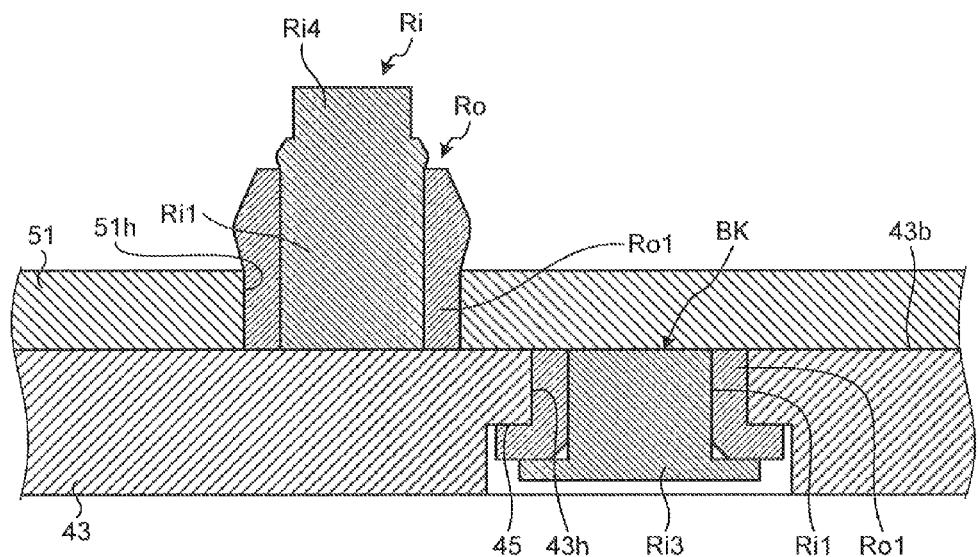
FIG. 63 is a diagram illustrating the cut shear pin.

FIG. 63 is a diagram illustrating the cut shear pin. As illustrated in FIG. 63, the shear pin R is cut at the cut surface BK. The cut surface BK is generated at a position straddling the first hole 51h and the second hole 43h in the shear pin R. In the cross-section illustrated in FIG. 63, the cut surface BK is located on the extension line of the outer wall of the inner column 51, that is, the extension line of the inner column side surface 43b of the leg portion 43. The outer pin Ro is cut at the main body portion Ro1, and the inner pin Ri is cut at the body portion Ri1. For this reason, the allowable shear force of the shear pin R depends on the cross-sectional area of the main body portion Ro1 and the cross-sectional area of the body portion Ri1 in the cut surface BK.

Figure 64:
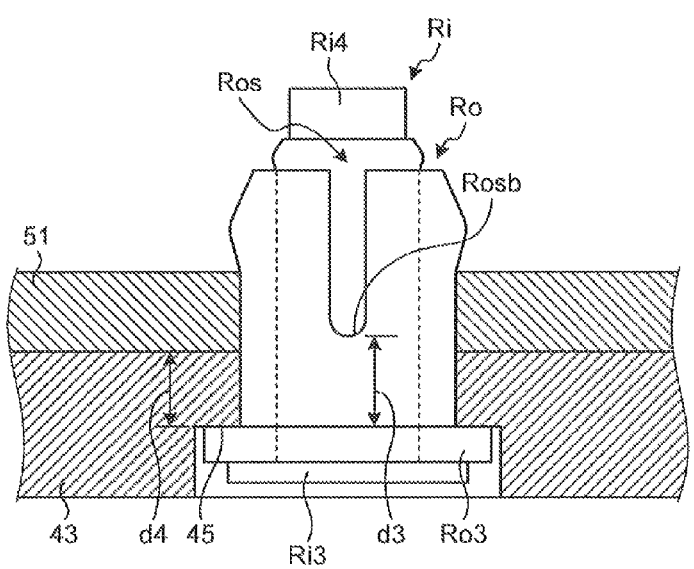
FIG. 64 is an enlarged diagram illustrating the periphery of the shear pin of FIG. 57 while illustrating only the shear pin as a side view.

FIG. 64 is an enlarged diagram illustrating the periphery of the shear pin of FIG. 57 while illustrating only the shear pin as a side view. As illustrated in FIG. 64, it is desirable that the distance d3, which is from the outer flange portion Ro3 to the front end Rosb of the notch Ros, is larger than the distance d4, which is from the outer flange portion Ro3 to the outer wall of the inner column 51. Accordingly, the notch Ros is not included in the cut surface BK used for cutting the shear pin R. For this reason, since a loss portion corresponding to the notch Ros disappears in the cross-section of the main body portion Ro1 in the cut surface BK, unevenness in the allowable shear force of the shear pin R is suppressed.

Further, it is desirable that the inner column 51 move straightly in the axial direction after the shear pin R is cut. When the movement direction of the inner column 51 forms an angle with respect to the axial direction of the outer column 54, the possibility that the movement of the inner column 51 is disturbed or the possibility that a friction force generated between the inner column 51 and the outer column 54 becomes larger than a predetermined value increases.

In the seventh embodiment, as illustrated in FIG. 58, the inner column bracket 4 is bonded to the first telescopic friction plates 21 disposed at both sides of the outer column 54. Accordingly, when an axial load is applied to the inner column bracket 4, a tightening force is applied to the inner column bracket 4 from both sides of the outer column 54. For this reason, it is possible to stabilize the posture of the inner column bracket 4 when the shear pin R is cut. Thus, the posture of the inner column 51 when the inner column starts to move may be easily maintained so as to be straight in the axial direction. Thus, the inner column 51 moves easily straightly in the axial direction.

Further, as illustrated in FIGS. 57 and 58, each of the first hole 51h and the second hole 43h is provided at two different positions in the axial direction. For this reason, the shear pin R is disposed at two different positions in the axial direction. If each of the first hole 51h and the second hole 43h is provided at one position, that is, the shear pin R is disposed at one position, there is a possibility that the inner column bracket 4 may rotate about the shear pin R. On the contrary, in the seventh embodiment, since the shear pin R is disposed at two different positions in the axial direction, the rotation of the inner column bracket 4 is suppressed. For this reason, it is possible to further stabilize the posture of the inner column bracket 4 when the shear pin R is cut.

Further, the first hole 51h and the second hole 43h are disposed at a position where the distance values from the first telescopic friction plates 21 disposed at both sides with the inner column bracket 4 interposed therebetween are equal to each other. Accordingly, since a more stable tightening force is applied from both sides of the outer column 54 to the inner column bracket 4 when an axial load is applied to the inner column bracket 4, it is possible to stabilize the posture of the inner column bracket 4 when the shear pin R is cut. Thus, when the inner column starts to move, the posture of the inner column 51 may be easily maintained so as to be straight in the axial direction. Thus, the inner column 51 may move more straightly in the axial direction.

Further, even when the inner column bracket 4 may not receive a stable tightening force from both sides of the outer column 54, since the leg portion 43 of the inner column bracket 4 is fitted into the slit so as to face the inner wall of the slit 54s, the inner column bracket 4 is guided by the slit 54s. Accordingly, it is possible to stabilize the posture of the inner column bracket 4 when the shear pin R is cut.

Further, as illustrated in FIG. 59, it is desirable that the depth d1 of the concave portion 45 be equal to or larger than the length d2 of the portion projected from the second hole 43h in the shear pin R. Accordingly, the shear pin R is not projected from the surface of the inner column bracket 4. For this reason, the steering device 100 may prevent the shear pin R from being broken by an external force.

In addition, the allowable shear force of the shear pin R may be adjusted by changing the number of the first holes 51h and the second holes 43h, the cross-sectional areas of the first hole 51h and the second hole 43h, and the material of the shear pin R. For example, each of the first hole 51h and the second hole 43h may be provided at one position or three or more positions. Further, the shear pin R may be formed of, for example, metal including non-ferrous metal or rubber.

A diagram illustrating a relation between a displacement amount of a steering column and a load necessary to move the steering column of the seventh embodiment is the same as FIG. 36.

In the seventh embodiment, the inner column 51 is supported in the axial direction by a first friction force, which is generated between the inner column and the outer column 54 by the tightening of the outer column bracket 52, and a second friction force, which is generated between the first telescopic friction plate 21 and the member (the outer column bracket 52, the second telescopic friction plate 22, and the outer column 54) contacting the first telescopic friction plate 21. The force F1 illustrated in FIG. 36 indicates the first friction force, and the force F3 indicates the sum of the first friction force and the second friction force. Further, the force F2 illustrated in FIG. 36 indicates the allowable shear force of the shear pin R. The force F2 is smaller than the force F3 and is larger than the force F1.

In the seventh embodiment, when a load of the force F2 or more is applied to the inner column 51, the shear pin R is cut and the inner column 51 is separated from the inner column bracket 4. Accordingly, since the connection between the inner column 51 and the first telescopic friction plate 21 is released, the second friction force is not applied to the inner column 51. For this reason, the inner column 51 moves in the axial direction while absorbing an impact by the first friction force after the shear pin R is cut. In the steering device 100 according to the seventh embodiment, when the first friction force is set to be small, the inner column 51 moves smoothly, and hence the operator may be easily protected from the secondary collision.

In the seventh embodiment, even when the setting value of the first friction force is small, the second friction force may compensate a degree in which the first friction force decreases among the force supporting the inner column 51 in the axial direction. For this reason, since the steering device 100 according to the seventh embodiment adjusts the setting value of the first friction force and the setting value of the second friction force, it is possible to suppress the inner column 51 from moving by the load applied in normal use and to more easily protect the operator from the secondary collision.

As described above, the steering device 100 according to the seventh embodiment includes the cylindrical inner column 51, which rotatably supports the input shaft 82a connected to the steering wheel 81 and has the first hole 51h opened therein, and the outer column 54 which is formed in a cylindrical shape for inserting at least a part of the inner column 51 thereinto and has the slit 54s formed by notching one insertion end of the inner column 51. Further, the steering device 100 includes the outer column bracket 52 which is fixed to the vehicle body side member 13 so as to support the outer column 54 and tightens the outer column 54 along with the telescopic friction plate (the first telescopic friction plate 21) as the plate material. Further, the steering device 100 includes the inner column bracket 4 which is supported by the telescopic friction plate (the first telescopic friction plate 21) and in which the second hole 43h is opened. Further, the steering device 100 includes the shear pin R which detachably connects the inner column 51 and the inner column bracket 4 to each other at a position straddling the first hole 51h and the second hole 43h. The shear pin R includes the outer pin Ro, which is a cylindrical member having the guide hole Roh penetrating an area from one end to the other end thereof and is inserted through the first hole 51h and the second hole 43h, and the inner pin Ri, which is inserted into the guide hole Roh. The inner pin Ri includes the body portion Ri1, which is inserted through the guide hole Roh and presses the inner wall of the guide hole Roh outward in the radial direction of the guide hole Roh, and the guide portion Ri4, which is provided at one end of the body portion Ri1 and has an outer periphery smaller than the outer periphery of the body portion Ri1.

Accordingly, in the steering device 100 according to the seventh embodiment, when an excessive load is applied to the steering wheel 81, the load is transmitted to the inner column 51 through the input shaft 82a, and hence the inner column 51 is moved forward. Meanwhile, the inner column bracket 4 which is supported by the first telescopic friction plate 21 does not move. For this reason, since a shear force is applied to the shear pin R, the shear pin R is cut when the load exceeds the allowable shear force of the shear pin R. When the shear pin R is cut, the connection between the inner column 51 and the inner column bracket 4 is released. When the connection between the inner column 51 and the inner column bracket 4 is released, the inner column 51 is supported in the axial direction by a friction force generated between the inner column 51 and the outer column 54. For this reason, the inner column 51 of the steering column 50 may move toward the front side of the vehicle body. Further, even when the shear pin R is cut, the outer column 54 is supported by the outer column bracket 52 fixed to the vehicle body side member 13. Further, the inner column 51 is supported by the outer column 54. For this reason, even when the shear pin R is cut, the steering column 50 is not dropped. Thus, the steering device 100 according to the seventh embodiment may suppress a problem in which the steering column 50 is dropped by the erroneous operation even when the setting value (the allowable shear force of the shear pin R) of the separation load, in which the steering column 50 moves toward the front side of the vehicle body, is decreased.

Further, when the inner column 51 and the inner column bracket 4 are connected by the shear pin R, the inner pin Ri is inserted into the guide hole Roh while the first hole 51h and the second hole 43h are positioned by the outer pin Ro. Since the outer periphery of the guide portion Ri4 is smaller than the outer periphery of the body portion Ri1, a gap is formed between the guide portion Ri4 and the inner wall of the guide hole Roh. Accordingly, the guide portion Ri4 may easily enter the guide hole Roh. For this reason, the inner pin Ri is press-inserted into the guide hole Roh while the guide portion Ri4 is inserted into the guide hole Roh in advance. When the inner pin Ri is press-inserted into the guide hole Roh, the edge Ri41 of the guide portion Ri4 contacts the inner wall of the guide hole Roh even when the inner pin Ri falls. Accordingly, an angle $\theta$ in which the inner pin Ri falls is regulated at a predetermined angle or less. Accordingly, it is possible to easily stabilize the posture of the inner pin Ri when the inner pin is press-inserted into the guide hole Roh. Thus, the steering device 100 according to the seventh embodiment may easily assemble the connection portion between the inner column 51 and the inner column bracket 4 which are detachably connected to each other.

In the steering device 100 according to the seventh embodiment, the inner pin Ri is formed so that the inner flange portion Ri3 having an outer periphery larger than the inner periphery of the guide hole Roh is provided at the other end (the end opposite to the guide portion Ri4) of the body portion Ri1. Accordingly, since the inner flange portion Ri3 contacts the edge of the guide hole Roh, the inner pin Ri does not easily come off from the outer pin Ro. Further, since the inner pin Ri includes the inner flange portion Ri3, an area in which a pressing force is applied to the inner pin Ri increases. For this reason, the inner pin Ri may be easily press-inserted into the guide hole Roh.

Further, in the steering device 100 according to the seventh embodiment, the inner pin Ri is formed so that the large diameter portion Ri2 having an outer periphery larger than the inner periphery of the guide hole Roh is provided between the body portion Ri1 and the guide portion Ri4. Accordingly, since the large diameter portion Ri2 contacts the edge of the guide hole Roh, the inner pin Ri does not easily come off from the outer pin Ro.

Further, in the steering device 100 according to the seventh embodiment, the outer pin Ro includes the cylindrical main body portion Ro1 which is inserted through the first hole 51h and the second hole 43h, the separation preventing portion Ro2 which is provided at one end of the main body portion Ro1 and has an outer periphery larger than the inner periphery of the first hole 51h and the inner periphery of the second hole 43h, and the notch Ros which is formed from the separation preventing portion Ro2 toward the other end of the main body portion Ro1. Accordingly, when the separation preventing portion Ro2 is inserted into the first hole 51h or the second hole 43h, the width ds of the notch Ros in the circumferential direction of the outer pin Ro decreases, and hence the outer periphery of the separation preventing portion Ro2 decreases. Accordingly, the separation preventing portion Ro2 may be easily inserted through the first hole 51h and the second hole 43h. For this reason, the outer pin Ro may be easily attached to the first hole 51h and the second hole 43h.

Further, in the steering device 100 according to the seventh embodiment, the outer pin Ro is formed so that the outer flange portion Ro3, which has an outer periphery larger than the inner periphery of the first hole 51h and the inner periphery of the second hole 43h, is provided at the other end (the end opposite to the separation preventing portion Ro2) of the main body portion Ro1. The distance d3, which is from the outer flange portion Ro3 to the front end Rosb of the notch Ros, is larger than the distance d4, which is from the outer flange portion Ro3 to the outer wall of the inner column 51. Accordingly, the notch Ros is not included in the cut surface BK used for cutting the shear pin R. For this reason, a loss portion corresponding to the notch Ros disappears in the cross-section of the main body portion Ro1 of the cut surface BK. Thus, the steering device 100 according to the seventh embodiment may easily suppress unevenness in the allowable shear force of the shear pin R.

Further, in the steering device 100 according to the seventh embodiment, the inner column bracket 4 includes the concave portion 45 at the surface opposite to the inner column side surface 43b facing the inner column 51. The second hole 43h is opened at a part of the bottom surface of the concave portion 45, and the depth d1 of the concave portion 45 is equal to or larger than the length d2 of the portion projected from the second hole 43h in the shear pin R. Accordingly, the shear pin R is not projected from the surface of the inner column bracket 4. For this reason, the steering device 100 may prevent the shear pin R from being broken by an external force.

Further, in the steering device 100 according to the seventh embodiment, the telescopic friction plate (the first telescopic friction plate 21) is disposed at both sides of the outer column 54. Accordingly, when an axial load is applied to the inner column bracket 4, a tightening force is applied to the inner column bracket 4 from both sides of the outer column 54. For this reason, it is possible to stabilize the posture of the inner column bracket 4 when the shear pin R is cut. Thus, when the inner column starts to move, the posture of the inner column 51 may be easily maintained so as to be straight in the axial direction. Thus, since the inner column 51 may easily move straightly in the axial direction, the steering device 100 may prevent a problem in which the movement of the inner column 51 is disturbed or a problem in which a friction force generated between the inner column 51 and the outer column 54 becomes larger than a predetermined value.

Further, in the steering device 100 according to the seventh embodiment, the telescopic friction plates (the first telescopic friction plates 21), which are disposed at both sides of the outer column 54, face each other with the inner column bracket 4 interposed therebetween, and the first hole 51h and the second hole 43h are disposed at a position where the distance values from the telescopic friction plates (the first telescopic friction plates 21), which face each other with the inner column bracket 4 interposed therebetween, are equal to each other. Accordingly, when an axial load is applied to the inner column bracket 4, since a more stable tightening force is applied from both sides of the outer column 54 to the inner column bracket 4, it is possible to stabilize the posture of the inner column bracket 4 when the shear pin R is cut. Thus, when the inner column 51 starts to move, the posture of the inner column 51 may be easily maintained so as to be straight in the axial direction. Thus, since the inner column 51 may easily move straightly in the axial direction, the steering device 100 may prevent a problem in which the movement of the inner column 51 is disturbed or a problem in which a friction force generated between the inner column 51 and the outer column 54 becomes larger than a predetermined value.

Further, in the steering device 100 according to the seventh embodiment, the outer column 54 is located at the front side of the vehicle body, includes the pivot bracket 55, and is formed so that the inner column 51 is inserted thereinto. Accordingly, the axis of the outer column 54 may be aligned to the axis of the inner column 51. For this reason, the outer column 54 may easily guide the inner column 51 when the inner column 51 moves in the axial direction. Thus, since the inner column 51 may easily move straightly in the axial direction, the steering device 100 may prevent a problem in which the movement of the inner column 51 is disturbed or a problem in which a friction force generated between the inner column 51 and the outer column 54 becomes larger than a predetermined value.

Further, as described above, the steering device 100 according to the seventh embodiment is formed by a member connection structure using the shear pin R. The member connection structure includes the first fixed member (the inner column 51) in which the first hole 51*h* is opened and the second fixed member (the inner column bracket 4) which is disposed adjacent to the first fixed member (the inner column 51) and in which the second hole 43*h* is opened. Further, the member connection structure includes the shear pin R, which connects the first fixed member (the inner column 51) and the second fixed member (the inner column bracket 4) to each other at a position straddling the first hole 51*h* and the second hole 43*h*, and which is cut at the cut surface BK of the boundary portion between the first fixed member (the inner column 51) and the second fixed member (the inner column bracket 4) by the movement of the first fixed member (the inner column 51) in the event of the secondary collision. The shear pin R includes the outer pin Ro, which is a cylindrical member having the guide hole Roh formed by penetrating an area from one end to the other end thereof and is inserted through the first hole 51*h* and the second hole 43*h*, and the inner pin Ri which is inserted into the guide hole Roh. The inner pin Ri includes the body portion Ri1 which is inserted through the guide hole Roh and presses the inner wall of the guide hole Roh outward in the radial direction of the guide hole Roh and the guide portion Ri4 which is provided at one end of the body portion Ri1 and has an outer periphery smaller than the outer periphery of the body portion Ri1.

Accordingly, when the first fixed member (the inner column 51) and the second fixed member (the inner column bracket 4) are connected to each other by the shear pin R, the inner pin Ri is inserted into the guide hole Roh while the first hole 51*h* and the second hole 43*h* are positioned by the outer pin Ro. Since the outer periphery of the guide portion Ri4 is smaller than the outer periphery of the body portion Ri1, a gap is formed between the guide portion Ri4 and the inner wall of the guide hole Roh. Accordingly, the guide portion Ri4 may easily enter the guide hole Roh. For this reason, the inner pin Ri is press-inserted into the guide hole Roh while the guide portion Ri4 is inserted into the guide hole Roh in advance. Even when the inner pin Ri falls when the inner pin Ri is press-inserted into the guide hole Roh, the edge Ri41 of the guide portion Ri4 contacts the inner wall of the guide hole Roh. Accordingly, an angle θ in which the inner pin Ri falls is regulated at a predetermined angle or less. Accordingly, it is possible to easily stabilize the posture of the inner pin Ri when the inner pin is press-inserted into the guide hole Roh. Thus, the member connection structure of the seventh embodiment may easily assemble the connection portion between the first fixed member (the inner column 51) and the second fixed member (the inner column bracket 4) which are detachably connected to each other.

In addition, the member connection structure may be used not only for the connection between the inner column 51 and the inner column bracket 4, but also for the connection between the other members. For example, the member connection structure may be used for the connection between the vehicle body side member 13 and the outer column bracket 52. The member connection structure is a separation member connecting member connection structure which connects members so that one member (the first fixed member) is separated from the other member (the second fixed member) in the event of the secondary collision.

First Modified Example of Seventh Embodiment

Figure 65:
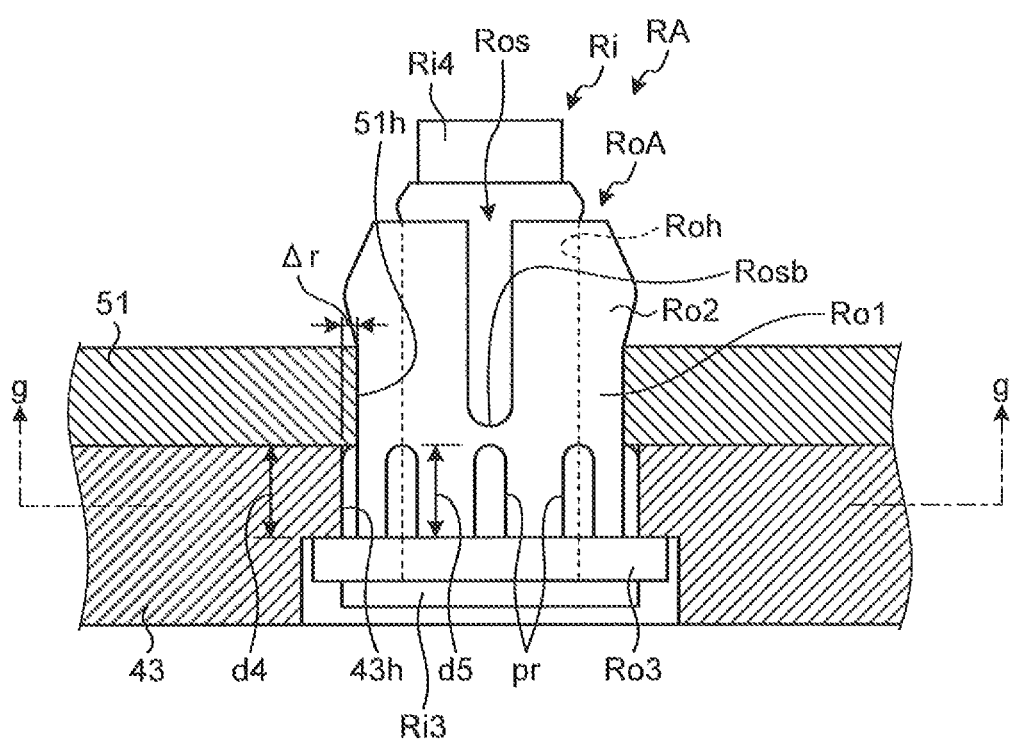
FIG. 65 is an enlarged diagram illustrating a shear pin according to a first modified example of the seventh embodiment while illustrating only the shear pin as a side view.
Figure 66:
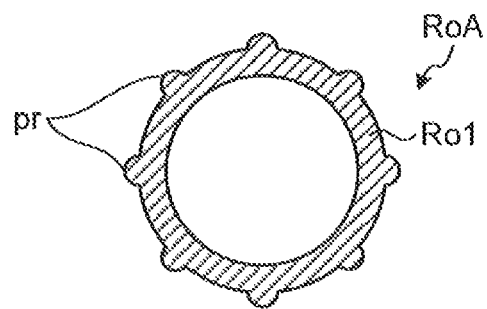
FIG. 66 is a cross-sectional view taken along the line g-g of FIG. 65.

FIG. 65 is an enlarged diagram illustrating the periphery of a shear pin according to a first modified example of the seventh embodiment while illustrating only the shear pin as a side view. FIG. 66 is a cross-sectional view taken along the line g-g of FIG. 65. The first modified example of the seventh embodiment is different from the above-described embodiment in that an outer pin RoA different from the outer pin Ro according to the embodiment is provided. In addition, the same reference signs will be given to the same components as those of the above-described embodiments, and the repetitive description thereof will not be presented.

As illustrated in FIG. 65, the outer pin RoA according to the first modified example of the seventh embodiment includes the protrusion pr which is provided in the outer wall of the main body portion Ro1. The protrusion pr protrudes outward in the radial direction of the guide hole Roh. The protrusion pr is an elastically deformable member, and is formed of, for example, rubber. The protrusion pr is formed in, for example, a line shape from the outer flange portion Ro3 toward the separation preventing portion Ro2. As illustrated in FIG. 66, the outer pin RoA includes eight protrusions pr. Eight protrusions pr are disposed at the same interval in the circumferential direction of the main body portion Ro1. In addition, the number of the protrusions pr of the outer pin RoA may not be eight, but may be seven or less or nine or more.

Even when a gap is formed between the main body portion Ro1 and the first hole 51*h* in a state before the inner pin Ri is inserted into the guide hole Roh, the width ds of the notch Ros increases when the inner pin Ri is inserted into the guide hole Roh, and hence the outer periphery of the portion facing the first hole 51*h* in the main body portion Ro1 increases. For this reason, the gap between the main body portion Ro1 and the first hole 51*h* may be easily filled. On the contrary, when a gap is formed between the main body portion Ro1 and the second hole 43*h* in a state before the inner pin Ri is inserted into the guide hole Roh, the outer periphery of the portion facing the second hole 43*h* in the main body portion Ro1 hardly increases even when the inner pin Ri is inserted into the guide hole Roh. For this reason, there is a possibility that the gap between the main body portion Ro1 and the second hole 43h may not be filled.

As illustrated in FIG. 65, when the inner periphery of the second hole 43h is larger than the inner periphery of the first hole 51h within the tolerance range, there is a possibility that a gap Δr may be formed between the main body portion Ro1 and the inner wall of the second hole 43h. There is a possibility that the gap Δr may cause the play of the shear pin RA. On the contrary, since the outer pin RoA according to the first modified example of the seventh embodiment includes the protrusion pr which is elastically deformable, the protrusion pr may fill the gap Δr. Accordingly, the protrusion pr may compensate a degree in which the outer periphery of the portion facing the second hole 43h in the main body portion Ro1 does not increase easily. For this reason, the steering device 100 according to the first modified example of the seventh embodiment may suppress the play of the shear pin RA.

As illustrated in FIG. 65, it is desirable that the length d5 of the protrusion pr be equal to the depth d4 of the second hole 43h. Accordingly, even when the inner periphery of the second hole 43h is larger than the inner periphery of the first hole 51h within the tolerance range, the gap Δr is filled in the entire length of the depth d4. For this reason, the steering device 100 according to the first modified example of the seventh embodiment may further suppress the play of the shear pin RA. In addition, the length d5 of the protrusion pr may be shorter or longer than the depth d4 of the second hole 43h.

As described above, in the steering device 100 according to the first modified example of the seventh embodiment, the outer pin RoA includes the protrusion pr which is provided in the outer wall of the main body portion Ro1 so as to be elastically deformable. Accordingly, the protrusion pr may fill a gap between the main body portion Ro1 and the inner wall of the first hole 51h or a gap Δr between the main body portion Ro1 and the inner wall of the second hole 43h. For this reason, the steering device 100 according to the first modified example of the seventh embodiment may suppress the play of the shear pin RA.

Second Modified Example of Seventh Embodiment

Figure 67:
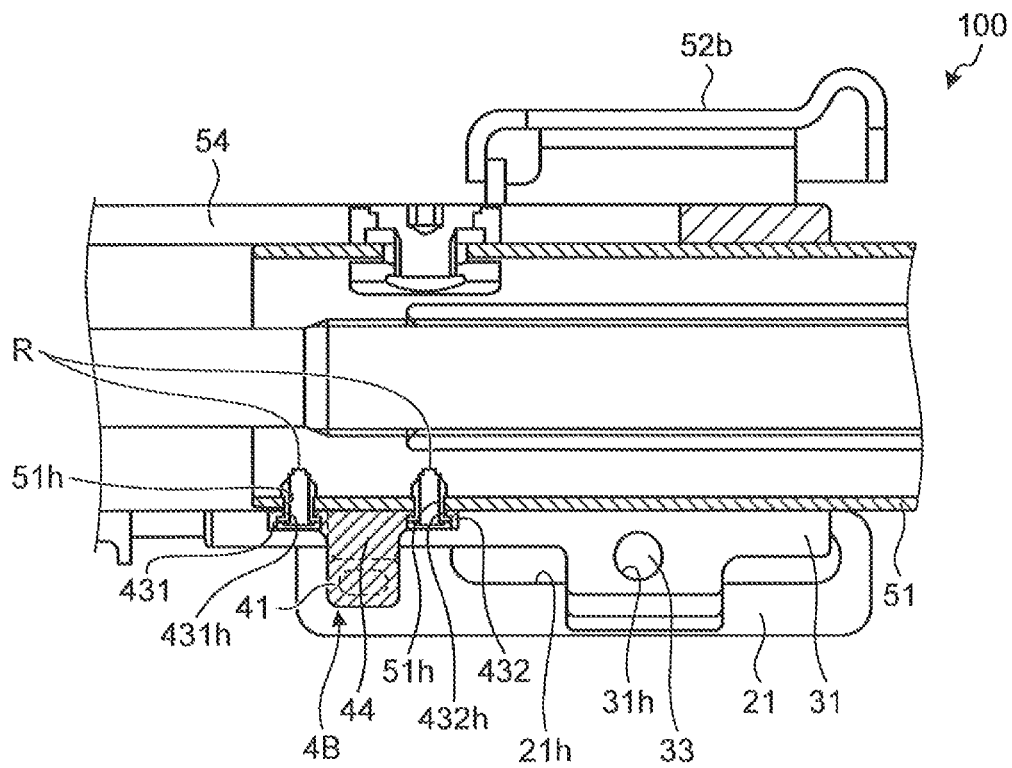
FIG. 67 is a cross-sectional view illustrating a steering device according to a second modified example of the seventh embodiment when taken along the line corresponding to the line e-e of FIG. 26.

FIG. 67 is a cross-sectional view illustrating a steering device according to a second modified example of the seventh embodiment when taken along the line corresponding to the line e-e of FIG. 26. The second modified example of the seventh embodiment is different from the above-described embodiment in that an inner column bracket 4B different from the inner column bracket 4 according to the seventh embodiment is provided.

As illustrated in FIG. 67, the inner column bracket 4B includes the leg portion 431 and the leg portion 432. The leg portion 431 is a plate-shaped portion which is formed forward from the end opposite to the arm portion 41 of the neck portion 44 and contacts the inner column 51. The leg portion 432 is a plate-shaped portion which is formed backward from the end opposite to the arm portion 41 of the neck portion 44 and contacts the inner column 51. The inner column side surfaces of the leg portions 431 and 432 are formed in a shape that follows the shape of the outer wall of the inner column 51. For example, each of the leg portions 431 and 432 includes one circular concave portion 45 in a surface opposite to the surface facing the inner column 51. A second hole 431h is opened in the bottom surface of the concave portion 45 of the leg portion 431. A second hole 432h is opened in the bottom surface of the concave portion 45 of the leg portion 432. The shear pin R is inserted at a position straddling the first hole 51h and the second hole 431h and a position straddling the first hole 51h and the second hole 432h, so that the inner column bracket 4B and the inner column 51 are detachably connected to each other.

The inner column bracket 4B includes the second holes 431h and 432h which are provided at the front side and the rear side with respect to the arm portion 41 as the support point of the first telescopic friction plate 21. Accordingly, the distance values from the arm portion 41 to the second holes 431h and 432h are shortened compared to the case where two second holes 43h are provided at the rear side of the arm portion 41 as in the seventh embodiment. For this reason, even when a load is applied to the first telescopic friction plate 21 and a moment exerted around the axis parallel to the length direction of the arm portion 41 is transmitted to the inner column bracket 4B, the moment applied to the shear pin R may be easily suppressed.

Further, the inner column bracket 4B may increase the distance between the second holes 431h and 432h compared to the case where two second holes 43h are provided at the rear side of the arm portion 41 as in the seventh embodiment. Accordingly, since the rotation of the inner column bracket 4B is suppressed, it is possible to stabilize the posture of the inner column bracket 4B when the shear pin R is cut. For this reason, unevenness in the allowable shear force of the shear pin R may be easily suppressed.

Third Modified Example of Seventh Embodiment

Figure 68:
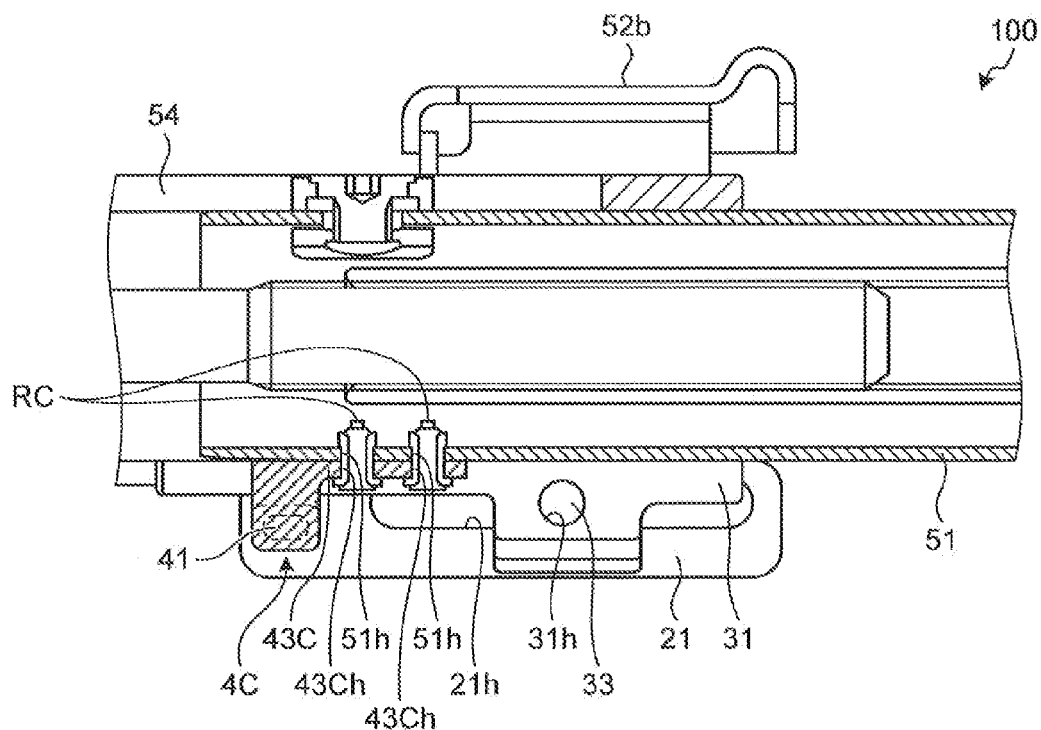
FIG. 68 is a cross-sectional view illustrating a steering device according to a third modified example of the seventh embodiment when taken along the line corresponding to the line e-e of FIG. 26.
Figure 69:
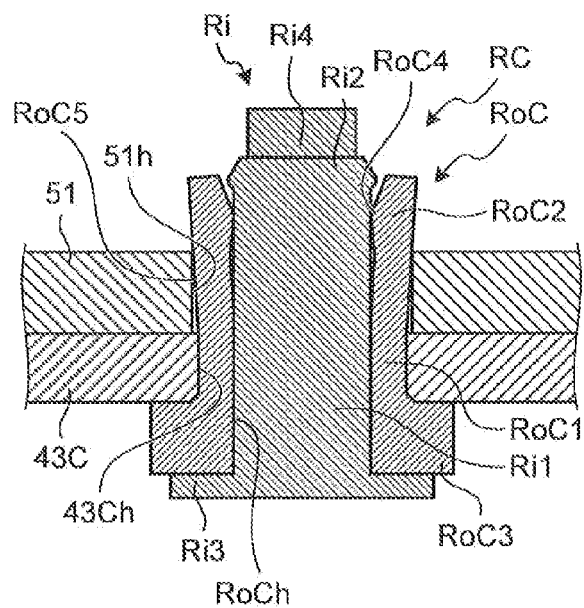
FIG. 69 is an enlarged diagram illustrating the periphery of a shear pin of FIG. 68.
Figure 70:
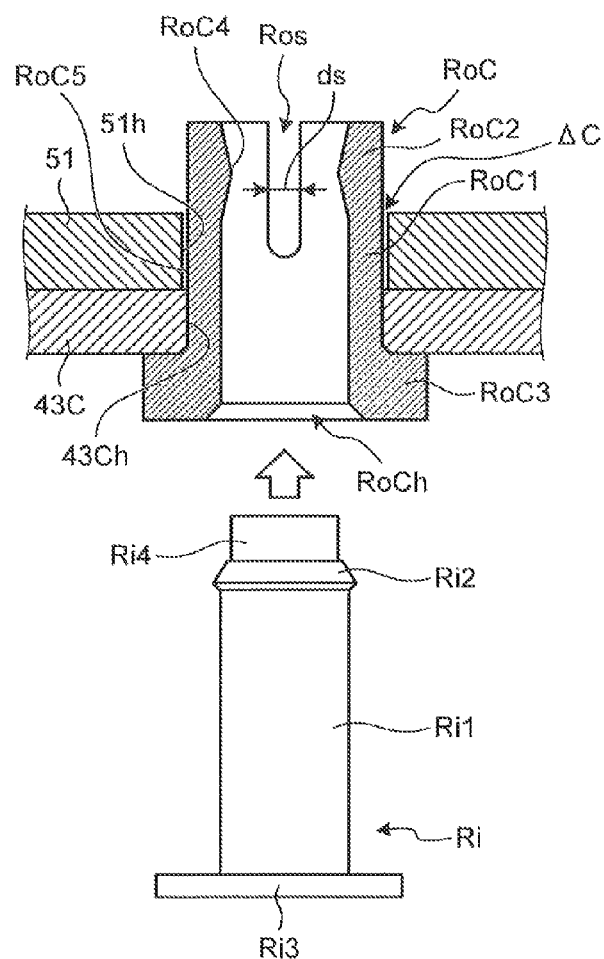
FIG. 70 is a perspective view illustrating the shear pin according to the third modified example of the seventh embodiment in a state before an inner pin is inserted into an outer pin.
Figure 71:
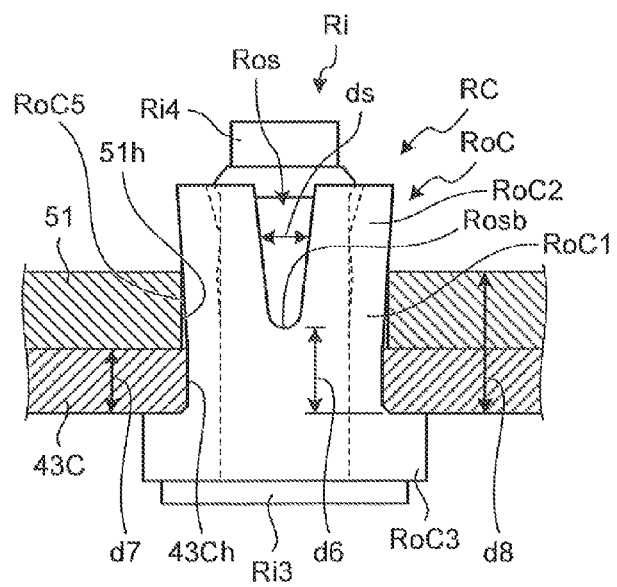
FIG. 71 is an enlarged diagram illustrating the periphery of the shear pin of FIG. 68 while illustrating only the shear pin as a side view.

FIG. 68 is a cross-sectional view illustrating a steering device according to a third modified example of the seventh embodiment when taken along the line corresponding to the line e-e of FIG. 26. FIG. 69 is an enlarged diagram illustrating the periphery of the shear pin of FIG. 68. FIG. 70 is a perspective view illustrating a shear pin according to the third modified example of the seventh embodiment in a state before an inner pin is inserted into an outer pin. FIG. 71 is an enlarged diagram illustrating the periphery of the shear pin of FIG. 68 while illustrating only the shear pin as a side view. The inner column bracket 4C according to the third modified example of the seventh embodiment includes the leg portion 43C different from the leg portion 43 according to the seventh embodiment. Further, the shear pin RC according to the third modified example of the seventh embodiment includes an outer pin RoC different from the outer pin Ro according to the seventh embodiment.

As illustrated in FIG. 68, the leg portion 43C according to the third modified example of the seventh embodiment includes, for example, two second holes 43Ch, but does not include a portion corresponding to the concave portion 45 of the leg portion 43 according to the embodiment. Accordingly, the inner column bracket 4C according to the third modified example of the seventh embodiment may be more easily manufactured since the number of manufacturing steps is smaller than that of the inner column bracket 4 according to the seventh embodiment. Further, as illustrated in FIGS. 69 and 70, the inner periphery of the first hole 51h is formed so as to be larger than the inner periphery of the second hole 43Ch. It is desirable that a difference between the inner periphery of the first hole 51h and the inner periphery of the second hole 43Ch be larger than a predetermined tolerance. With such a configuration, even when a manufacturing error of the first hole 51h and the second hole 43Ch occurs within the tolerance range, it is easy to maintain a state where the inner periphery of the first hole 51*h* is larger than the inner periphery of the second hole 43Ch.

In addition, the inner column bracket 4C may include the concave portion 45 of the leg portion 43 according to the seventh embodiment. With such a configuration, the steering device 100 may prevent the shear pin RC from being broken by an external force as described in the seventh embodiment.

As illustrated in FIG. 69, the shear pin RC includes the outer pin RoC and the inner pin Ri. The outer pin RoC is a cylindrical member that is inserted through the first hole 51*h* and the second hole 43Ch. For example, the outer pin RoC includes a main body portion RoC1, a separation preventing portion RoC2, an outer flange portion RoC3, and a guide hole RoCh. The main body portion RoC1 is formed in a cylindrical shape, and is inserted through the first hole 51*h* and the second hole 43Ch. The separation preventing portion RoC2 is provided at one end of the main body portion RoC1, and is located at the inside of the inner column 51. The outer flange portion RoC3 is provided at the other end of the main body portion RoC1, and is located at the outside in the radial direction of the inner column 51 in relation to the second hole 43Ch. The outer flange portion RoC3 has, for example, a disk shape and has an outer periphery larger than the inner periphery of the second hole 43Ch. Accordingly, since the outer flange portion RoC3 contacts the surface of the leg portion 43C, it is possible to suppress the outer pin RoC from coming off from the first hole 51*h* and the second hole 43Ch. The guide hole RoCh is a penetration hole that penetrates an area from the outer flange portion RoC3 to the separation preventing portion RoC2.

In a state where the outer pin RoC is inserted into the first hole 51*h* and the second hole 43Ch, the outer peripheries of the main body portion RoC1 and the separation preventing portion RoC2 are constant. For example, the outer peripheries are larger than the inner periphery of the second hole 43Ch and are smaller than the inner periphery of the first hole 51*h*. Then, the outer pin RoC is inserted into the first hole 51*h* and the second hole 43Ch by press-inserting. Accordingly, a friction force is generated by the contact between the outer wall of the main body portion RoC1 and the inner wall of the second hole 43Ch, and hence the outer pin RoC is attached to the second hole 43Ch as illustrated in FIG. 70. For this reason, the first hole 51*h* and the second hole 43Ch are positioned. Further, a gap ΔC is formed between the main body portion RoC1 of the outer pin RoC and the inner wall of the first hole 51*h*.

The outer pin RoC includes a convex portion RoC4 which is formed in the inner wall of the separation preventing portion RoC2 so as to be projected inward in the radial direction of the guide hole RoCh. For example, the convex portion RoC4 is formed in an annular shape. Accordingly, as illustrated in FIG. 70, in a state before the inner pin Ri is inserted into the outer pin RoC, the inner periphery of the separation preventing portion RoC2 is smaller than the inner periphery of the main body portion RoC1. Further, in a state before the inner pin Ri is inserted into the outer pin RoC, the outer periphery of the body portion Ri1 of the inner pin Ri is substantially equal to the inner periphery of the main body portion RoC1 or is larger than the inner periphery of the main body portion RoC1. The inner pin Ri is inserted into the guide hole RoCh by press-inserting. When the inner pin Ri is inserted into the guide hole RoCh and the inner pin Ri contacts the convex portion RoC4, a force exerted outward in the radial direction is applied to the separation preventing portion RoC2. Accordingly, the width ds of the notch Ros in the circumferential direction of the outer pin RoC is widened. For this reason, as illustrated in FIG. 71, in a state after the inner pin Ri is inserted into the outer pin RoC, the separation preventing portion RoC2 of the outer pin RoC has an outer periphery larger than the inner periphery of the first hole 51*h* and the inner periphery of the second hole 43Ch. Accordingly, since the separation preventing portion RoC2 contacts the inner wall of the inner column 51, it is possible to suppress the outer pin RoC from coming off from the first hole 51*h* and the second hole 43Ch.

Since the width ds of the notch Ros in the circumferential direction of the outer pin RoC is widened, the outer periphery of a first hole facing portion RoC5 facing the inner wall of the first hole 51*h* in the main body portion RoC1 of the outer pin RoC increases. Accordingly, the gap ΔC illustrated in FIG. 70 is filled, and hence at least a part of the first hole facing portion RoC5 contacts the inner wall of the first hole 51*h*. For this reason, the play of the shear pin RC in the radial direction of the guide hole RoCh is suppressed.

Since the inner periphery of the first hole 51*h* is larger than the inner periphery of the second hole 43Ch, the outer periphery of the first hole facing portion RoC5 is widened toward the separation preventing portion RoC2 by using the boundary between the first hole 51*h* and the second hole 43Ch as an origin. Accordingly, as illustrated in FIGS. 69 and 71, the first hole facing portion RoC5 is caught by the edge of the first hole 51*h* and the edge of the second hole 43Ch. For this reason, the play of the shear pin RC in the axial direction of the guide hole RoCh is suppressed.

Further, when the first hole 51*h* is opened in the inner column 51, burr is generated in the edge of the first hole 51*h* located at the inside of the inner column 51. The burr indicates an unnecessary protrusion which is generated in a processing surface during a cutting work, and a process of removing the burr is generally needed. However, in the third modified example of the seventh embodiment, since burr is generated in the edge of the first hole 51*h*, the first hole facing portion RoC5 is easily caught by the edge of the first hole 51*h*. For this reason, in the third modified example of the seventh embodiment, there is no need to remove the burr, and the play of the shear pin RC in the axial direction of the guide hole RoCh is easily suppressed due to the existence of the burr.

Further, as illustrated in FIG. 71, it is desirable that the distance d6 from the outer flange portion RoC3 to the front end Rosb of the notch Ros be smaller than the distance d8 from the outer flange portion RoC3 to the inner wall of the inner column 51. Accordingly, since the width ds of the notch Ros may be easily widened in the circumferential direction of the outer pin RoC, the outer periphery of the first hole facing portion RoC5 may be easily widened. For this reason, it is possible to further suppress the play of the shear pin RC in the radial direction of the guide hole RoCh and the play of the shear pin RC in the axial direction of the guide hole RoCh.

Further, as illustrated in FIG. 71, it is desirable that the distance d6 is larger than the distance d7 which is from the flange portion RoC3 to the outer wall of the inner column 51. Accordingly, the notch Ros is not included in the cut surface used for cutting the shear pin RC. For this reason, since a loss portion corresponding to the notch Ros disappears in the cross-section of the main body portion RoC1 at the cut surface, unevenness in the allowable shear force of the shear pin RC is suppressed. Here, the cut surface used for cutting the shear pin RC is a portion which corresponds to the cut surface BK illustrated in FIG. 63.

As described above, in the steering device 100 according to the third modified example of the seventh embodiment, the inner periphery of the first hole 51*h* is larger than the inner periphery of the second hole 43Ch. Further, the outer pin RoC includes the convex portion RoC4 which is formed in the inner wall of the separation preventing portion RoC2 so as to be projected inward in the radial direction of the guide hole RoCh. Accordingly, since the inner pin Ri presses the convex portion RoC4 outward in the radial direction of the guide hole RoCh, the width ds of the notch Ros in the circumferential direction of the outer pin RoC is widened. Accordingly, at least a part of the main body portion RoC1 of the outer pin RoC contacts the inner wall of the first hole 51h. For this reason, the play of the shear pin RC in the radial direction of the guide hole RoCh is suppressed. Further, since the inner periphery of the first hole 51h is larger than the inner periphery of the second hole 43Ch, the outer periphery of the main body portion RoC1 of the outer pin RoC is widened toward the separation preventing portion RoC2 by using the boundary between the first hole 51h and the second hole 43Ch as an origin. Accordingly, the main body portion RoC1 of the outer pin RoC is caught by the edge of the first hole 51h and the edge of the second hole 43Ch. For this reason, the play of the shear pin RC in the axial direction of the guide hole RoCh is also suppressed. Thus, the steering device 100 according to the third modified example of the seventh embodiment may suppress both the play of the shear pin RC in the radial direction of the guide hole RoCh and the play of the shear pin RC in the axial direction of the guide hole RoCh.

Further, in the steering device 100 according to the third modified example of the seventh embodiment, the outer pin RoC includes the outer flange portion RoC3 which is provided at the other end (the end opposite to the separation preventing portion RoC2) of the main body portion RoC1. The outer flange portion RoC3 has an outer periphery larger than the inner periphery of the first hole 51h and the inner periphery of the second hole 43Ch. The distance d6 from the outer flange portion RoC3 to the front end Rosb of the notch Ros is smaller than the distance d8 from the outer flange portion RoC3 to the inner wall of the inner column 51. Accordingly, since the width ds of the notch Ros in the circumferential direction of the outer pin RoC is more easily widened, the outer periphery of the main body portion RoC1 of the outer pin RoC is easily widened. For this reason, it is possible to further suppress the play of the shear pin RC in the radial direction of the guide hole RoCh and the play of the shear pin RC in the axial direction of the guide hole RoCh.

In the description above, the seventh embodiment and the first to third modified examples of the seventh embodiment have been described, but the shape of the shear pin R is not limited to the above-described examples. The entire shape of the inner pin Ri may not be essentially formed in the above-described columnar shape, and the entire shape of the outer pin Ro may not be essentially formed in the above-described cylindrical shape. For example, the cross-sectional shape obtained by cutting the inner pin Ri or the outer pin Ro in a plane perpendicular to the axial direction of the first hole 51h may be a polygonal shape such as a square shape.

REFERENCE SIGNS LIST 12, 13 VEHICLE BODY SIDE MEMBER
21 FIRST TELESCOPIC FRICTION PLATE
21h TELESCOPIC ADJUSTMENT HOLE
22 SECOND TELESCOPIC FRICTION PLATE
22a FRICTION PORTION
22b CONNECTION PORTION
22c CURVED PORTION
22h ROD PENETRATION HOLE
23h TILT ADJUSTMENT HOLE
31 ROD PENETRATION HOLE
31h ROD PENETRATION HOLE
33 ROD
4, 4B, 4C INNER COLUMN BRACKET
41 ARM PORTION
42 INSERTION PORTION
43, 431, 432, 43C LEG PORTION
43b INNER COLUMN SIDE SURFACE
43h, 431h, 432h, 43Ch SECOND HOLE
44 NECK PORTION
45 CONCAVE PORTION
50 STEERING COLUMN
51 INNER COLUMN
51h FIRST HOLE
52 OUTER COLUMN BRACKET
52a FRAME-SHAPED SUPPORT PORTION
52b ATTACHMENT PLATE PORTION
52h ATTACHMENT HOLE
53 MANIPULATION LEVER
54 OUTER COLUMN
54s SLIT
55 PIVOT BRACKET
55a ROTATION SHAFT
81 STEERING WHEEL
82 STEERING SHAFT
82a INPUT SHAFT
82b OUTPUT SHAFT
84 UNIVERSAL JOINT
85 LOWER SHAFT
86 UNIVERSAL JOINT
87 PINION SHAFT
100 STEERING DEVICE
101 STEERING HANDLE
102 RACK HOUSING
103 PINION
104 TIE ROD
105 FEMALE STEERING SHAFT
106 MALE STEERING SHAFT
107 CROSS JOINT
108 INTERMEDIATE SHAFT
109 CROSS JOINT
110 STEERING DEVICE
120 STEERING COLUMN APPARATUS
121 INNER COLUMN
122 OUTER COLUMN
123 TILT BRACKET
1231 VEHICLE BODY ATTACHMENT SIDE BRACKET
1232 PRESSING BRACKET
124 FIXED BRACKET
125 TELESCOPIC MULTIPLATE
126 TELESCOPIC MULTIPLATE
127 TILT LEVER
128 TILT BOLT HOLE
129 TIGHTENING MECHANISM
130 MANIPULATION PORTION
131 ROLLING BEARING
132 TILT BOLT
133 CAM LOCK MECHANISM
134 NUT
135 ROLLING BEARING
136 SEPARATION PREVENTING MECHANISM
137 SHEAR PIN
138 SHEAR PIN

139 INNER COLUMN CONTACT SURFACE
140 SHEAR PIN HOLE
141 SHEAR PIN HOLE
142 FIXED PORTION
143 FIXED PORTION
144 TRANSVERSE BEAM PORTION
145 COLUMN PORTION
146 MOUNTING PORTION
147 DISTANCE BRACKET
148 CAM AND GEAR MECHANISM
149 SHEAR PIN
150 SHEAR PIN
151 MOVABLE GEAR LOCK
152 FIXED GEAR LOCK
153 TILT BOLT CENTER PORTION
154 CAM MECHANISM
155 ECCENTRIC CAM
156 PRESSING BLOCK
157 PRESSING BLOCK
158 INNER PLATE
159 CONCAVE PORTION
160 FITTING PROTRUSION
161 FITTING HOLE
162 INJECTION PORT
BK CUT SURFACE
P, PA, PC SHEAR PIN
Pi INNER PIN
Pi1 BODY PORTION
Pi2 LARGE DIAMETER PORTION
Pie END PORTION
Po, PoA, PoC OUTER PIN
Po1, PoC1 MAIN BODY PORTION
Po2, PoC2 SEPARATION PREVENTING PORTION
Po3, PoC3 FLANGE PORTION
PoC4 CONVEX PORTION
PoC5 FIRST HOLE FACING PORTION
Poe END PORTION
Poh, PoCh GUIDE HOLE
Pos NOTCH
Posb FRONT END
pr PROTRUSION
Q, Q1, Q2, Q3, Q4 SHEAR PIN
Qi, QiA, QiB, QiC INNER PIN
Qi1 BODY PORTION
Qi11 FIRST LARGE DIAMETER PORTION
Qi12, Qi12C FIRST SMALL DIAMETER PORTION
Qi2 PROTRUSION PORTION
Qi3 INNER FLANGE PORTION
Qi4 GUIDE PORTION
Qo, QoA OUTER PIN
Qo1 MAIN BODY PORTION
Qo11 SECOND LARGE DIAMETER PORTION
Qo12 SECOND SMALL DIAMETER PORTION
Qo2 SEPARATION PREVENTING PORTION
Qo3 OUTER FLANGE PORTION
Qoh GUIDE HOLE
Qos NOTCH
Qosb FRONT END
R, RA, RC SHEAR PIN
Ri INNER PIN
Ri1 BODY PORTION
Ri2 LARGE DIAMETER PORTION
Ri3 INNER FLANGE PORTION
Ri4 GUIDE PORTION
Ro, RoA, RoC OUTER PIN
Ro1, RoC1 MAIN BODY PORTION
Ro2, RoC2 SEPARATION PREVENTING PORTION
Ro3, RoC3 OUTER FLANGE PORTION
RoC4 CONVEX PORTION
RoC5 FIRST HOLE FACING PORTION
Roh, RoCh GUIDE HOLE
Ros NOTCH
Rosb FRONT END
VB VEHICLE BODY
Zr ROTATION AXIS

The invention claimed is:
1. A steering device comprising:
a cylindrical inner column having a first hole opened therein, the cylindrical inner column rotatably supporting an input shaft connected to a steering wheel;
an outer column having a cylindrical shape into which at least a part of the inner column is inserted and having a slit at one insertion side end of the inner column;
an outer column bracket fixed to a vehicle body side member to support the outer column and to tighten the outer column along with a telescopic friction plate having a plate shape;
an inner column bracket having a second hole opened therein, the inner column supported by the telescopic friction plate; and
a shear pin provided at a position straddling the first hole and the second hole, and the shear pin detachably connecting the inner column and the inner column bracket to each other.
2. The steering device according to claim 1,
wherein the shear pin includes an outer pin and an inner pin, the outer pin is a cylindrical member having a guide hole penetrating an area from one end to the other end thereof and is inserted through the first hole and the second hole, and the inner pin is inserted through the guide hole and biases an inner wall of the guide hole outward in the radial direction of the guide hole.
3. The steering device according to claim 2,
wherein the inner pin includes a columnar body portion that biases the inner wall of the guide hole outward in the radial direction of the guide hole and a large diameter portion that is provided at both ends of the body portion and has an outer periphery larger than an inner periphery of the guide hole.
4. The steering device according to claim 2,
wherein the outer pin includes a cylindrical main body portion that is inserted through the first hole and the second hole, a separation preventing portion that is provided at one end of the main body portion and has an outer periphery larger than an inner periphery of the first hole and an inner periphery of the second hole, and a notch that is formed from the separation preventing portion toward the other end of the main body portion.
5. The steering device according to claim 4,
wherein the outer pin includes a flange portion that is provided at the other end of the main body portion and has an outer periphery larger than the inner periphery of the first hole and the inner periphery of the second hole, and
a distance from the flange portion to the front end of the notch is larger than a distance from the flange portion to an outer wall of the inner column.
6. The steering device according to claim 4,
wherein the outer pin includes an elastically deformable protrusion that is provided in an outer wall of the main body portion so as to be projected outward in the radial direction of the guide hole.

7. The steering device according to claim 4, wherein the inner periphery of the first hole is larger than the inner periphery of the second hole, and the outer pin includes a convex portion that is provided in an inner wall of the separation preventing portion so as to be projected inward in the radial direction of the guide hole.

8. The steering device according to claim 7, wherein the outer pin includes a flange portion that is provided at the other end of the main body portion and has an outer periphery larger than the inner periphery of the first hole and the inner periphery of the second hole, and a distance from the flange portion to the front end of the notch is smaller than a distance from the flange portion to an inner wall of the inner column.

9. The steering device according to claim 1, wherein the inner column bracket includes a concave portion that is provided in a surface opposite to the surface facing the inner column, the second hole is opened in a part of a bottom surface of the concave portion, and the depth of the concave portion is equal to or larger than the depth of a portion projected from the second hole in the shear pin.

10. The steering device according to claim 1, wherein the telescopic friction plate is disposed at both sides of the outer column.

11. The steering device according to claim 10, wherein the telescopic friction plates disposed at both sides of the outer column face each other with the inner column bracket interposed therebetween, and the first hole and the second hole are disposed at a position where the distance values from the telescopic friction plates facing each other with the inner column bracket interposed therebetween are equal to each other.

12. The steering device according to claim 1, wherein the outer column is located at the front side of a vehicle body, includes a pivot bracket, and is formed so that the detached inner column is inserted thereinto.

13. The steering device according to claim 1, wherein the shear pin includes an outer pin that is a cylindrical member having a guide hole penetrating an area from one end to the other end thereof and is inserted through the first hole and the second hole, and an inner pin that is inserted into the guide hole, the inner pin includes a body portion that is inserted through the guide hole, and the body portion includes a first large diameter portion that presses an inner wall of the guide hole outward in the radial direction of the guide hole and a first small diameter portion that is disposed at a position straddling the first hole and the second hole and has an outer periphery smaller than an outer periphery of the first large diameter portion.

14. The steering device according to claim 13, wherein the outer pin includes a main body portion that is inserted through the first hole and the second hole, and the main body portion includes a second large diameter portion that presses inner walls of the first hole and the second hole and a second small diameter portion that is disposed at a position straddling the first hole and the second hole and has an outer periphery smaller than an outer periphery of the second large diameter portion.

15. The steering device according to claim 1, wherein the shear pin includes an outer pin that is a cylindrical member having a guide hole penetrating an area from one end to the other end thereof and is inserted through the first hole and the second hole, and an inner pin that is inserted into the guide hole, and the inner pin includes a body portion that is inserted through the guide hole and presses an inner wall of the guide hole outward in the radial direction of the guide hole and a guide portion that is provided at one end of the body portion and has an outer periphery smaller than an outer periphery of the body portion.

* * * * *